United States Patent
Mlsna et al.

(10) Patent No.: US 9,648,842 B1
(45) Date of Patent: May 16, 2017

(54) EXTERNALLY MONITORED AND CONTROLLED MILKING APPLICATOR

(71) Applicants: Phil G. Mlsna, Sparta, WI (US); Herbert L Burfield, Onalaska, WI (US); Michael G. Wettstein, Holmen, WI (US); Thomas J Niemiec, Franklin, WI (US)

(72) Inventors: Phil G. Mlsna, Sparta, WI (US); Herbert L Burfield, Onalaska, WI (US); Michael G. Wettstein, Holmen, WI (US); Thomas J Niemiec, Franklin, WI (US)

(*) Notice: Subject to any disclaimer, the term of this patent is extended or adjusted under 35 U.S.C. 154(b) by 81 days.

(21) Appl. No.: 14/120,768

(22) Filed: Jun. 25, 2014

Related U.S. Application Data

(60) Provisional application No. 61/957,157, filed on Jun. 25, 2013.

(51) Int. Cl.
*A01J 7/04* (2006.01)

(52) U.S. Cl.
CPC .............. *A01J 7/04* (2013.01); *Y10S 901/43* (2013.01)

(58) Field of Classification Search
CPC ................................. A01J 7/04; Y10S 901/43
See application file for complete search history.

(56) References Cited

U.S. PATENT DOCUMENTS

| 3,261,046 A | * | 7/1966 | Massaglia | A22C 17/08 |
| | | | | 15/3.1 |
| 4,010,714 A | * | 3/1977 | Notsuki | A01K 1/0613 |
| | | | | 119/14.03 |
| 4,034,713 A | * | 7/1977 | Umbaugh | A01J 7/04 |
| | | | | 119/14.02 |
| 4,763,605 A | * | 8/1988 | Braum | A01K 1/12 |
| | | | | 119/14.02 |

(Continued)

FOREIGN PATENT DOCUMENTS

| IT | EP 0399132 A1 | * 11/1990 | ................ A01J 7/04 |
| WO | 9904623 A1 | 2/1999 | |
| WO | 9927772 | 6/1999 | |

OTHER PUBLICATIONS

Puli Sistem F-50 Publication; 2005.

(Continued)

*Primary Examiner* — Monica Williams
*Assistant Examiner* — Morgan Barlow
(74) *Attorney, Agent, or Firm* — M. Paul Hendrickson

(57) ABSTRACT

A hand-held animal treating applicator equipped with a treatment zone having a forward entryway and top side entryway communicating onto horizontally aligned counter-rotating brushes provides exceptional efficacy in cleaning and sanitizing milk producing teats. The brush rotational control and chemical solution application conditions for the appropriate on-site treatment may automatically adjusted to precise reproducible treatment conditions monitored and controlled by a PLC. The brushes are easily coupled and (Continued)

uncoupled at the treatment site. Variable speed DC motors provide individualized cleaning and rotational brush control at each milking site applicator and chemical solution supplied to the applicators can be tailored for application to a unique teat treatment zone.

40 Claims, 38 Drawing Sheets

(56) References Cited

U.S. PATENT DOCUMENTS

| | | | |
|---|---|---|---|
| 5,211,132 A * | 5/1993 | Farina | A01J 7/04 119/664 |
| 5,235,937 A | 8/1993 | Farina et al. | |
| 5,355,833 A * | 10/1994 | Legrain | A01K 9/00 119/51.02 |
| 5,383,423 A | 1/1995 | van der Lely | |
| 6,155,204 A | 12/2000 | van der Lely et al. | |
| 6,189,486 B1 | 2/2001 | Lindholm | |
| 6,318,299 B1 * | 11/2001 | Birk | A01J 7/04 119/651 |
| 6,321,682 B1 * | 11/2001 | Eriksson | A01J 5/007 119/14.08 |
| 6,321,688 B1 | 11/2001 | Eriksson | |
| 6,325,021 B1 | 12/2001 | Farina | |
| 6,343,566 B1 * | 2/2002 | Eriksson | A01J 7/04 119/14.01 |
| 6,357,387 B1 * | 3/2002 | Johannesson | A01J 5/0175 119/14.1 |
| 6,626,130 B1 * | 9/2003 | Eriksson | A01J 7/025 119/651 |
| 6,651,589 B2 * | 11/2003 | Greeson | A01K 13/003 119/656 |
| 6,935,271 B2 | 8/2005 | Edison | |
| 7,165,510 B2 * | 1/2007 | Hakes | A61D 1/02 119/652 |
| 7,882,802 B2 * | 2/2011 | Van Den Berg | A01J 7/04 119/14.02 |
| 8,402,920 B2 | 3/2013 | Dole et al. | |
| 8,622,026 B1 | 1/2014 | Dole | |
| 8,869,747 B2 | 10/2014 | Dole | |
| 2002/0185071 A1 * | 12/2002 | Guo | A01J 7/04 119/14.47 |
| 2007/0175405 A1 | 8/2007 | Vecchia | |
| 2008/0314324 A1 * | 12/2008 | Pettersson | A01J 5/0175 119/14.08 |
| 2012/0067288 A1 | 3/2012 | Dole et al. | |

OTHER PUBLICATIONS

Puli Sistem F-60 Manual; p. 27, Oct. 5, 2009.
Jensen, Morten Lindgaard—DeLaval Publication (Milkproduction.com) Robotic Milking: Farm Test—the cow's time spent in the milking robot. Jan. 9, 2012.
Wijbrand Ouweltjes MSc. "Demands and opportunities for operational management support" Operational management on farms with automatic milking systems (Applied Research, Animal Sciences group Wageningen UR), Feb. 2004 pp. 1, 2, 3, 5, 7, 12, 17, 20, 23, 24, 26, 30, 31.

* cited by examiner

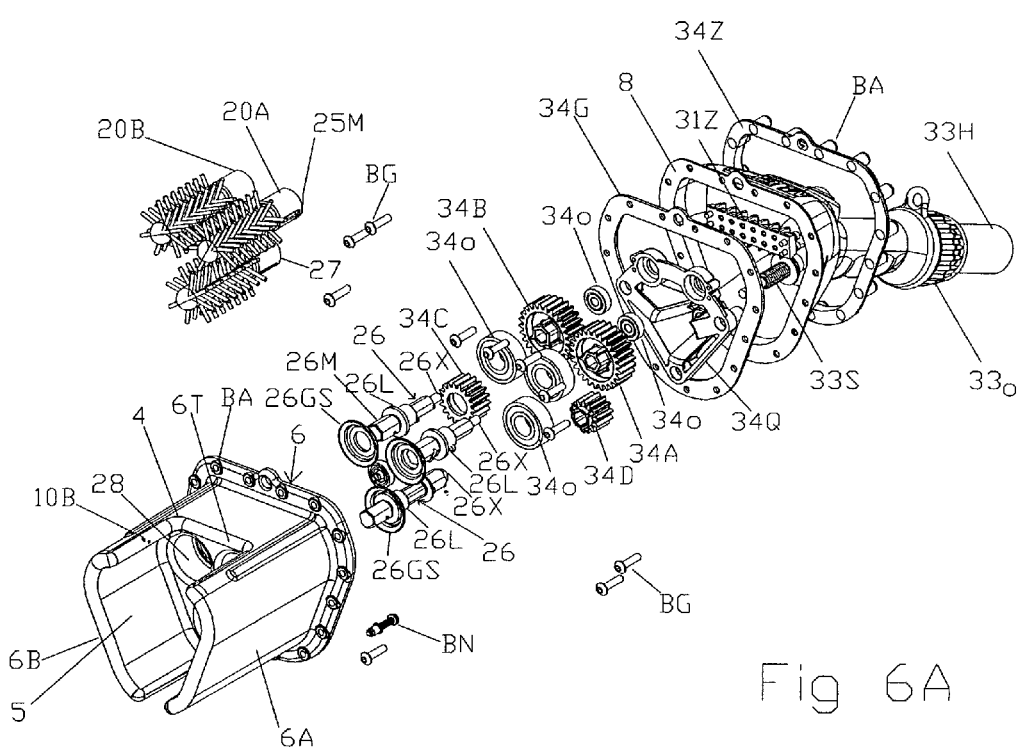

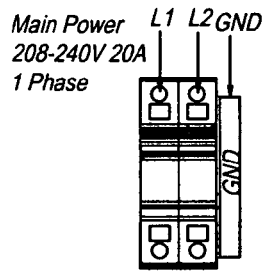

Main Power L1 L2 GND
208-240V 20A
1 Phase

| Field Terminations - Low Voltage | | |
|---|---|---|
| Term | Description | Wire # |
| A1 | Water treatment chem flow meter (black 0 VDC) | 10.08A |
| A2 | Water treatment chem flow meter (red 24 VDC) | 10.10A |
| A3 | Water treatment chem flow meter (brown SIGNAL) | X2 |
| B1 | Wash chemical flow meter (black 0 VDC) | 10.08A |
| B2 | Wash chemical flow meter (red 24 VDC) | 10.10A |
| B3 | Wash chemical flow meter (brown SIGNAL) | X1 |
| C1 | Wash water flow meter (black 0 VDC) | 10.08A |
| C2 | Wash water flow meter (red 24 VDC) | 10.10A |
| C3 | Wash water flow meter (brown SIGNAL) | X0 |
| D1 | Cow cooling holding area photo eye (24 VDC) | 10.10A |
| D2 | Cow cooling holding area photo eye (0 VDC) | 10.08A |
| D3 | Cow cooling holding area photo eye (SIGNAL) | X11 |
| E1 | Cow cooling photo eye #1 (24 VDC) | 10.10A |
| E2 | Cow cooling photo eye #1 (0 VDC) | 10.08A |
| E3 | Cow cooling photo eye #1 (SIGNAL) | X12 |
| F1 | Cow cooling photo eye #2 (24 VDC) | 10.10A |
| F2 | Cow cooling photo eye #2 (0 VDC) | 10.08A |
| F3 | Cow cooling photo eye #2 (SIGNAL) | X13 |
| G1 | Water treatment water flow meter (24 VDC) | 10.10A |
| G2 | Water treatment water flow meter (0 VDC) | 10.08A |
| G3 | Water treatment flow meter (SIGNAL) | 1 |
| H1 | Spare | |
| H2 | Spare | |
| H3 | Spare | |
| J1 | Spare | |
| J2 | Spare | |
| J3 | Spare | |
| K1 | Wash water temperature | CH1+ |
| K2 | Wash water temperature | CH1- |
| L1 | Holding area temperature | CH2+ |
| L2 | Holding area temperature | CH2- |
| M1 | Outside air temperature | CH3+ |
| M2 | Outside air temperature | CH3- |
| N1 | Remote beacon audible alarm 24VDC 250mA max (SIGNAL) | Y10 |
| N2 | Remote beacon audible alarm 24VDC 250mA max (0 VDC) | 10.08A |
| P1 | Spare | |
| P2 | Spare | |
| Q1 | Spare | |
| Q2 | Spare | |

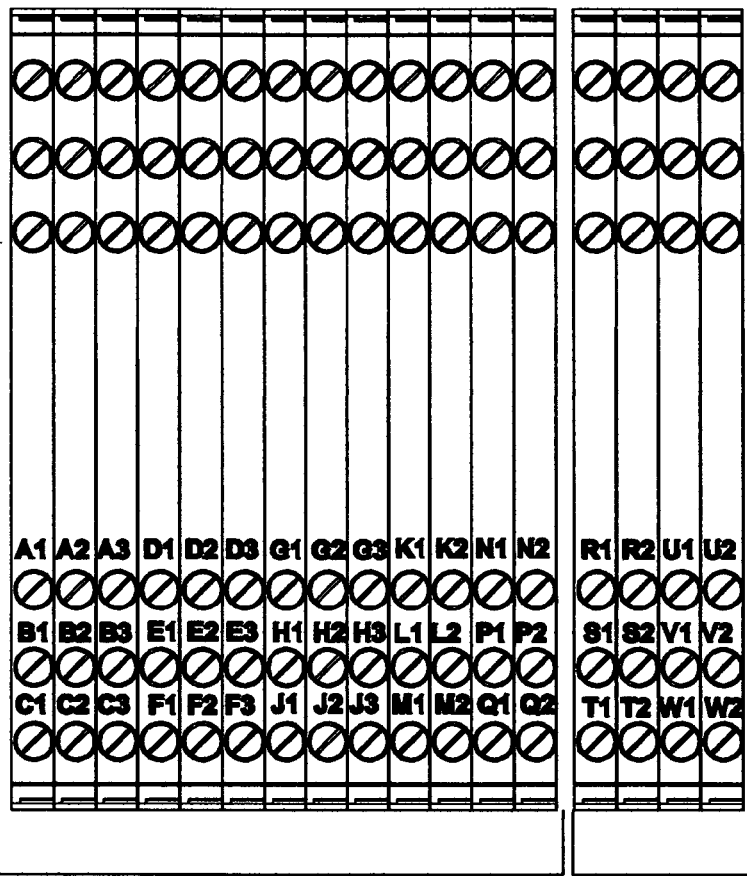

*Field Wiring: Screw Terminal Block*

FIG. 34B

| Field Terminations - Line Voltage | | |
|---|---|---|
| Term | Description | Wire # |
| R1 | Wash solution chem pump 204V 8A MAX | 11.06A |
| R2 | Wash solution chem pump 204V 8A MAX | 11.07A |
| S1 | Water treatment chem pum 240V 8A MAX | 11.33 |
| S2 | Water treatment chem pum 240V 8A MAX | 11.33A |
| T1 | Spare | |
| T2 | Spare | |
| U1 | Cow cooling holding area sole noid | 11.34 |
| U2 | Cow cooling holding area sole noid | 11.34A |
| V1 | Cow cooling return lane #1 sole noid | 11.35 |
| V2 | Cow cooling return lane #1 sole noid | 11.35A |
| W1 | Cow cooling return lane #2 sole noid | 11.36 |
| W2 | Cow cooling return lane #2 sole noid | 11.36A |

FIG. 34C

| Multi-Pole Connector Terminations | | M4E | | | |
|---|---|---|---|---|---|
| Description | Pin # | Brush #1 | Brush #2 | Brush #3 | Brush #1 |
| Motor A- | 1 | 11.24 | 12.04 | 12.16 | 12.24 |
| Pre-wash solenoid | 2 | Y4 | Y5 | Y6 | Y7 |
| Pre-wash trigger | 3 | X4 | X5 | X6 | X7 |
| Motor A+ | 4 | 11.23 | 12.03 | 12.15 | 12.23 |
| 24VDC Common | 5 | 10.08A | 10.08A | 10.08A | 10.08A |
| 24VDC | 6 | 10.10A | 10.10A | 10.10A | 10.10A |
| Spare | 7 | NC | NC | NC | NC |
| Spare | 8 | NC | NC | NC | NC |
| Ground | GND | GREEN | GREEN | GREEN | GREEN |

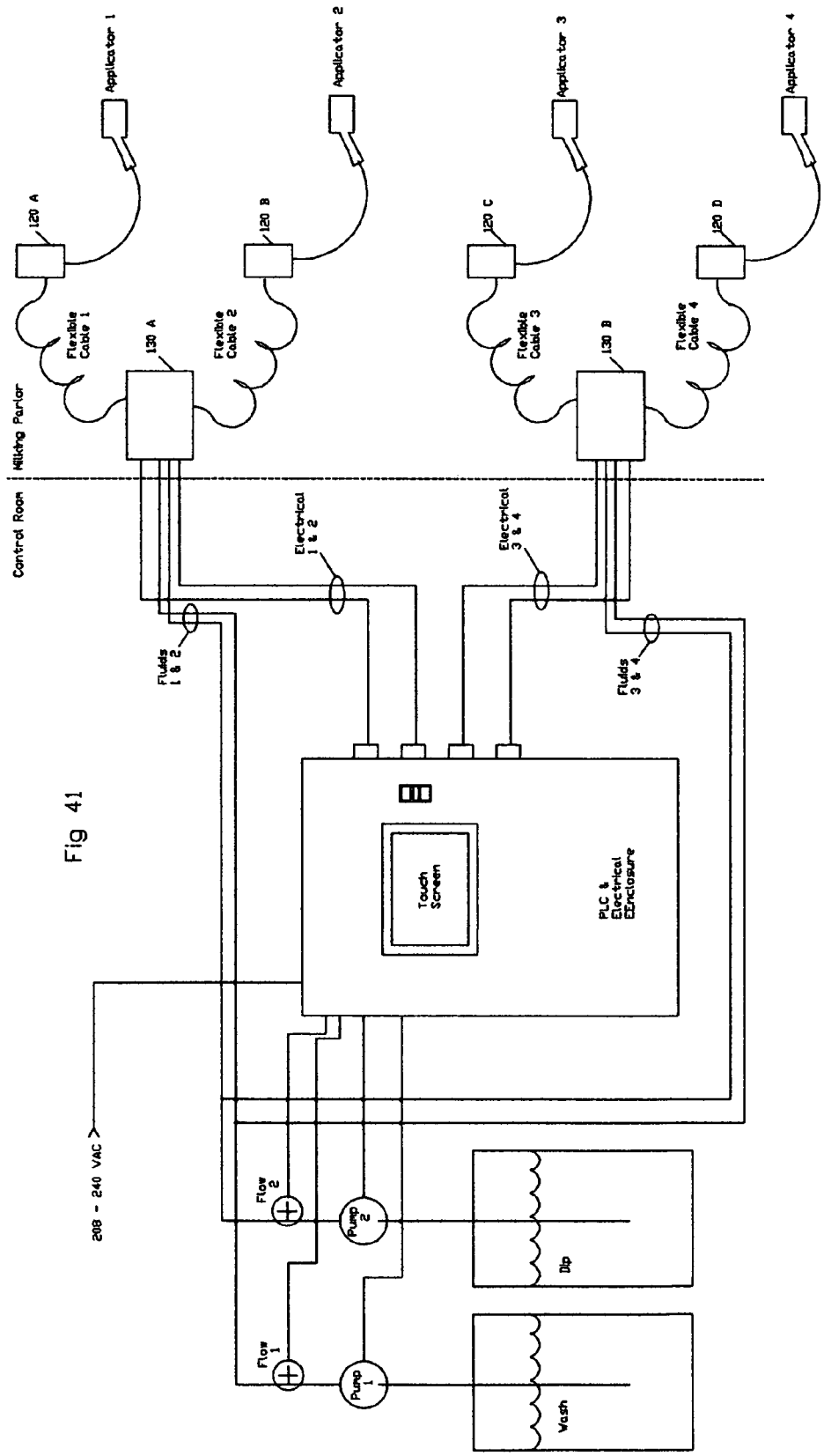

EXTERNALLY MONITORED AND CONTROLLED MILKING APPLICATOR

CROSS-REFERENCE TO RELATED APPLICATION

This application is a non-provisional application of provisional application 61/957,157 filed Jun. 25, 2013, the contents of which are incorporated herein and made a part of this application in their entirety.

FIELD OF INVENTION

The present invention relates to a treatment unit and system; and more particularly to a unique applicator suitable for rendering treatment to milk producing animals by remote control and the method of its use.

BACKGROUND OF INVENTION

Modern day milking parlors are equipped to easily handle milking herds numbering in the thousands. Some of these parlors are equipped to conduct continuous milking operations, often milking each cow up to three times a day. It is of paramount importance that a dairy milking operation undertakes proper sanitization throughout the entire milking cycle for each cow including before milking (pre-treatment) and after milking (post-treatment) to insure optimum and safe milk production. Failure to implement proper and meticulous milking care can have costly repercussions upon the entire milking operation and over-all health of the milking herd. On occasions, an entire milk tank load of what would normally pass as grade A milk will be rejected because of a high bacterial count or other milk contaminates. This becomes costly for the milk producer.

A major contributing source of infectious milk contamination and dairy herd infections resides in the particular precautions which the milk producer undertakes to prevent these problems from arising. Unfortunately under current practices, the on-site milking operator primarily determines whether or not these precautions have been properly implemented. Accordingly, the precautions undertaken by the milking operator at the milking station or sites has a direct bearing on whether or not unhealthful milk contamination arises or herd bacterial infection spreads amongst the dairy herd. How and what safeguards the milking operator actually undertakes at the pre-milking treatment and the post milking treatment sites constitutes the essential safeguard in preventing infectious bacteria from contaminating the milk and the herd. Unattended precautions are often hidden or obscured from a milking manager awareness and therefore cannot be identified or timely rectified. Under current operations there exists no recorded data which tracks the milking record of a particular milking cow and the precise conditions under which the cow was prepared for milking, milked and post treated. There also does not exist a hand-held applicator which allows the herdsman or manager to actually control the precise procedure for the conduct of a desired treatment at the milking site. Having this information available and the means to implement treatment changes by the herdsman is indispensable to the optimization of milk production. In essence, the current systems leave the manager overseer at the mercy of the milking operator to conduct the proper milking treatment. These difficulties arise primarily because the milking manager cannot operationally monitor and regulate the precise treatment conducted at each milking site.

The prior art discloses many different types of hand-held teat cleaning devices (often referred to as an applicator) and systems associated therewith. Exemplary teat cleaning applicator disclosures include U.S. Pat. No. 5,235,937 to Farina et al. and U.S. Pat. No. 6,325,021 B1 to Farina. The Farina patent publication discloses a cleaning cup having a top side teat entryway and a pair of vertically positioned roller brushes rotating in opposite directions towards the teat which upon trigger switching dispenses a cleaning solution into the cleaning cup for cleansing with brushing. The Farina et al. patent similarly discloses a cleaning cup with a conventional top side teat entryway for reportedly washing, disinfecting, drying, and simulating teat milking. The Farina et al. cup relies upon a pair of oppositely rotating brushes rotationally positioned so as to pull the teat downward into a spinning cylindrical brush to clean the teat.

Another patent application publication 2007/0175405 A1 to Vecchia discloses a hand-held washing cup applicator having two counter rotating brushes and a single lower brush centered between the two upper brushes. A switch in the handle manually triggers the rotating brush and wash solution admitted to the cup. Washing of a cow teat involves vertically inserting the teat at the top side entryway. Teat cleaning is accomplished in a traditional manner by moving the cup upwardly and downwardly until teat cleaning is completed. This device may be reportedly used for pre-milking teat cleaning and sanitizing by manually triggering the applicator.

Patent application publication No. 2012-0067288 A1 Dole et al. discloses a device for cleaning teats of milk-producing animals housed in a parlor were in the teats are cleaned or disinfected prior to the milking operation. The system includes an external aqueous chlorine dioxide disinfectant solution source conducted for triggering by a hand-held applicator equipped with one or more scrubbing elements positioned for engaging a teat of the milk-producing animal. The hand-held applicator is remotely connected to a tank holding disinfecting solution. The hand-held applicator traditionally relies upon a vertical teat feed and cleaning of the milk-producing animal teats.

U.S. Pat. No. 6,321,688 to Ericksson also discloses a conventional vertical entryway teat cleaning device equipped with a pair of counter rotating brushes which orbit about the teat to effectuate cleaning. Other publication depicting prior hand-held devices, applicators or systems include No. 99/04623 to Farina and European publication No. 1,030,549 to Birk.

The prior art is essentially devoid of a programmed master control center (e.g. personal logic controller often identified as PLC) which actually monitors and controls the precise processing conditions conducted by an operator at a milking site. Even more remote from the current state of the art is PLC monitoring and controlling site which may be operated at any remote site from the actual milking site to effectuate changes in the precise type of treatment administered at the milking site.

As evidenced by the aforementioned, the milking parlor sanitation problems have failed to be alleviated by the manner whereby the treatments have been traditionally conducted. The milking operation becomes repetitively tedious and monotonous even to the most experienced on-site milking operator which in turn often leads to inattention and dereliction of milking duties. Conventional hand-held teat applicators are equipped with a top side teat entryway, the use of which also necessitates repetitive wrist twisting, coupled with repetitive upward and downward movements which can readily lead to fatigue of the operator's arms and wrists, and often cause serious cases of tendonitis. The milking overseers or herdsman problems become compounded because certain operator may simply be lazy or wishes to cut corners on the prescribed procedural steps essential for the effective bovine teat and bag treatments. Unfortunately, there exists no means for the milking herd owner, herdsman, manger or overseer to monitor and actually control the precise treatment to be administered to each cow at the milking site.

The problems associated with the current use of hand-held pre- and post-treatment applicators primarily arises because the on-site parlor operator manually triggers the prescribed treatment protocol from beginning to end. This places a complete reliance upon each on-site milking operator to appropriately conduct each treatment for each cow under the precise optimum treatment conditions. In essence, this leaves the managing herdsman at the mercy of each individual operator at the milking treatment site. There accordingly exists a need for a hand-held bovine treatment applicator in which the operator merely triggers the applicator whereupon the triggered applicator, rather than the operator, prescribes the teat treatment conditions. The ability to regulate, monitor and control the precise conduct of the sanitizing solutions (including temperature, ejection periods, pressures, concentrations, brushing times, brush type, brush rotational speeds, etc.), the operational use of the rotating brushes in the cleansing, sanitizing, and drying of the teats by the brushes (including pre-milking stimulation, teat premilking, sanitization scrubbing times, drying intervals, postmilking treatments such iodine dipping etc.) by the head herdsman are particularly important factors which remain unregulated by current usage and design of all current hand-held applicators, all of which prior art defects are corrected by the embodiments of the present invention.

The prior art has heretofore failed to provide a combination of rotating teat cleansing bristled rollers confined within a hand-held applicators capable of effectively cleaning and sanitizing bovine teats in a horizontally positioned pass therethrough. All of the existing commercial systems rely upon a top sided teat entryway within a boxed-like case typically equipped with rotating polyolefin bristled brushes positioned below the teat top entryway within a cupped receptacle. These prior hand-held applicators also rely upon a downward and upward motion (as opposed to horizontal movement) using roller brushes rotating at a constant rotational speed. There currently exists no hand-held teat treatment applicator capable of any mode of operation other than placing the bovine teat onto a top open-faced canister type applicator necessitating a wrist twisting, up and down motion by the operator. The applicators currently in use do not permit an operator to change brush types during the milking operation. There also does not exist a bristled rotating roller brush system capable of horizontally receiving a bovine teat and channeling the teat to an optimum centrally disposed treatment section while maintaining the teat in an optimum sanitation and cleansing position. The present invention affords such advantages and many others over the prior art hand-held applicators.

The prior art hand-held bovine teat cleaning devices are further plagued with a host of other problems which have seriously hampered their effective adaptation by modern day milking operations. The drive gear mechanism of these conventional units rely upon a gear system which provides no effective means for protecting the gears from external contamination or gear stripping. This leads to premature gear damage, costly repair and milking interruptions due to applicator down time. There exists a need to correct these defects. Moreover, the frequent need for brush and gear replacement typically entails costly and time consuming manual labor to simply replace the damaged or worn out brushes or gears. These conventional hand-held applicators necessitate in essence a complete disassembly of the gear and chassis system to simply replace the worn out brushes. Since the need for gear and brush replacements is frequent and sometimes unexpected, an orderly milking operation can be placed in complete disarray when an applicator brush needs replacement. The unique embodiments of applicant's hand-held applicator include roller brush shafts equipped with self-locking shaft tips mating onto a locking power drive source which allows for an expeditious replacement of worn or ineffective roller brushes.

Other features affording distinctive advantages over the current ineffective hand-held applicators include annular seals in juxtaposition to the roller shaft, snap on or a quick-lock which insures proper brush and shaft alignment to the power drive source and seals the gear system against damaging external contamination. A further unique applicator feature provided by this invention includes brush rollers which may be rotated at any desired preset rotational speed as opposed to current devices which operate only at a constant RPM. This feature is particularly useful since different types of treatments often require different rotational speeds.

The typical hand-held applicators also often rely upon cylindrical roller equipped with tufts of polyolefin filaments (e.g. polypropylene) operationally positioned in an overlapping or intermeshing relationship ostensibly to compensate and aid in the teat cleansing procedure. These factors in combination with an inability to selective prescribe a wide range of variable rotational speeds to fit on-site conditions inherently create adverse environmental conditions ill-suited for effective hygienic bovine teat and bag treatment. The present hand-held applicator utilizes softer and more resilient brush tufts operationally rotated under prescribed and controlled rotational speeds to meet on-site conditions which significantly enhance the usefulness and hygienic efficacy of the teat treatments.

SUMMARY OF THE INVENTION

The present invention provides a unique comprehensive system and an applicator especially useful in preserving a healthy milking herd and preventing bacteria along with other harmful contaminants from entering the milk production stream. The unique applicator and the unique manner whereby it may be effectively used afford the milking overseer or owner an ability to monitor control and regulate the milking operation in a manner heretofore impossible. The invention is capable of providing both an effective pre- and post-milking teat treatment under controlled and optimized conditions to insure operational efficiency and sanitization of each teat and each cow as well as maintaining a healthful herd. Unlike existing hand-held applicators equipped with gear drive brushes prone to premature gear drive failures, the present applicator gear drive mechanism provides an efficient and extremely durable sealed drive system adapted for prolonged usage. In contrast to current teat applicators necessarily requiring a complete disassembly of the housing and brush drive simply to replace the brushes, the treatment brushes and applicator herein are equipped with self-locking, self-setting and self-unlocking brush shafts which may be readily and independently replaced by the on-site milking operator.

Also of great importance to any milk producer is the ability to actually monitor and control the teat pre-treatment and post-treatment operations. The unique applicator as provided herein will upon triggering by an on-site milking operator send an identifying command signal to a software programmed master control board (e.g. PLC, etc.) which then relays back an appropriate operational signal command to control and monitor the necessary operational procedural applications to be conducted by the hand-held applicator. This allows a managing milk producer (as opposed to the on-site operator) to actually control and monitor the use of each applicator and the milking operation as being conducted, and undertake the appropriate corrective milking operation as may be required from time to time. The hardware and software also provides a built in system to monitor and regulate the supply source (e.g. power, chemical solution, preps, etc.) treatment solution concentrations (pre and post), equalize sanitizing solution pressures for all milking units (e.g. applicators), the pre-treatment and post-treatment solution temperatures, brush running time control for wash, post dipping, and drying intervals, the rotational brush speeds, etc. and many other unique and desirable monitoring and control attributes heretofore not feasible with current hand-held applicators. The entire control of the milking operation may be programmed into a master control board or PLC and maybe to provide a standardized treatment. It may be selectively programmed to alter its normal sequence to account the specific needs of database identified or tagged cow presenting itself at the milking station.

The ability to control and prescribe the appropriate chemical solution treatment duration, the desired constant chemical solution concentrate, the chemical treatment pressure and temperature, brushing texture and rotational speeds to match specific field conditions or apply a standardized treatment are amongst those significant factors which reflect in a substantial savings in milking time, operator's stamina and sanitizing consistencies throughout the entire milking operation and stations, as well as controlling the chemical treatment expenses needed to perform the necessary treatment tasks. Another important benefit of the present invention pertains to the ease by which the operator may easily change brushes at the working station without requiring any substantial operational down time. Existing applicators require the applicators to be actually removed from the milking operation simply to replace commonly occurring or excessively worn or damaged brushes. This replacement cannot be currently done at the milking site since current applicators necessitate a complete disassembly of the gear case and gear assembly to simply replace brushes. In contrast, the present applicator provides readily installable and replaceable brushes easily removable and replaced at the milking work site. This is an important feature because it also allows for the use of the most suitable brush as may be periodically required by each cow under the current milking conditions. For example a cow with a teat or bag injury may require a more gentle treatment (including a reduced RPM) which may be most appropriately be best suited by using a softer and gentler and slower types of brush at the milking site. Different textured brushes with marking indicating their bristle texture (e.g. color coding) allows a milking operator to correctly change the brush type at the milking site. These replaceable brush features also alleviates the need for duplicate on-site applicators.

BRIEF DESCRIPTION OF THE FIGURES

FIG. 6A is an unassembled isometric view of the applicator shown in FIGS. 1 and 2.

FIG. 34A is an electrician connection guide referencing a main power source and the various low voltage for the various electronic circuitry connections to their respective field terminations including an indexed descriptive tabulation of with their respective connection points.

FIG. 34B depicts an electrician connection guide indexing the field terminations of line voltage for various operational electrical functions of the hand-held applicator.

FIG. 34C depicts a field wiring screw terminal block indexed for connection to the corresponding indexed listings of FIGS. 34A and 34B.

FIG. 41 is a schematic flow sheet depicting the operation of four applicators monitored and controlled by a PLC.

DETAILED DESCRIPTION OF THE INVENTION

Figure 1:
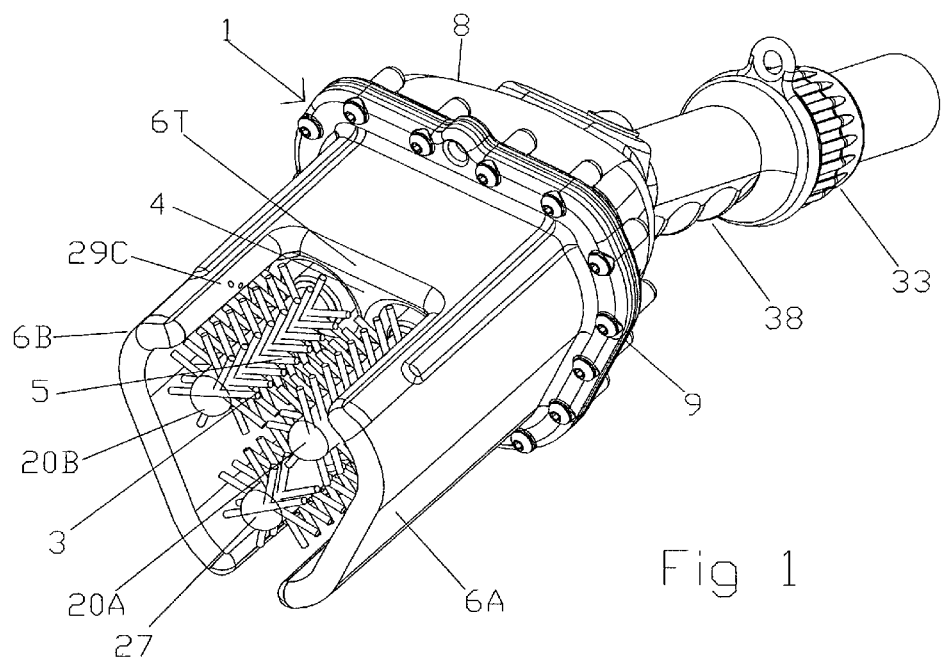
FIG. 1 is a front side view of an applicator of this invention.

With reference to accompanying drawing and our co-pending provisional application Ser. No. 61/957,157, there is provided a hand-held applicator 1 combination for animal treatment suitably for controlled and monitored administration by a master control center 40, with the combination 1 comprising:
   A) a treatment zone 3 having an open faced top entryway 4 and an open faced forward entryway 5 for horizontally receiving and treating animal milk producing teats within said treatment zone 3;
   B) a pair of juxtapositioned cantilevered upper roller brushes (generally referenced as 20) aligned along a horizontal axis to said top entryway 4 with each of said upper brushes (20A & 20B) being equipped with bristle tufts 21 comprised of a plurality filaments 23 circumferentially positioned about a brush shaft 25 and positioned thereupon so as to allow for inwardly guiding of entering teat within the treatment zone 3;
   C) a lower cantilevered roller brush 27 equipped with lower brush tufts 21 aligned horizontally beneath the upper brushes (20A & 20B) to provide a brushing action upon a lower margin of the entering teat T;
   D) at least one outlet 10 for introducing a desired treatment agent to the treatment zone 3 with said injection port outlet 10 including a conduit 29C communicating onto an external treatment agent source 29E;
   E) a triggering member 31 indexed to transmit an indexed signal to a master control center 40 for a desired type of treatment to be administered within the treatment zone 3 by said applicator 1,
   F) a variable speed power drive source 33 delivering rotational power at a desired rotational speed to shafted brush gears 34A, 34B & 34C housed within a sealed gear housing 35 so as to thereby operationally drive the upper brushes 20A&20B and lower brush 27 at the desired operational rotational speed; and
   G) a master control center 40 activated upon receiving the indexed signal by the triggering member 31 transmits operational signal commands to the applicator 1 for conducting the desired type of treatment by the hand-held applicator 1 within the treatment zone 3.

Figure 2:
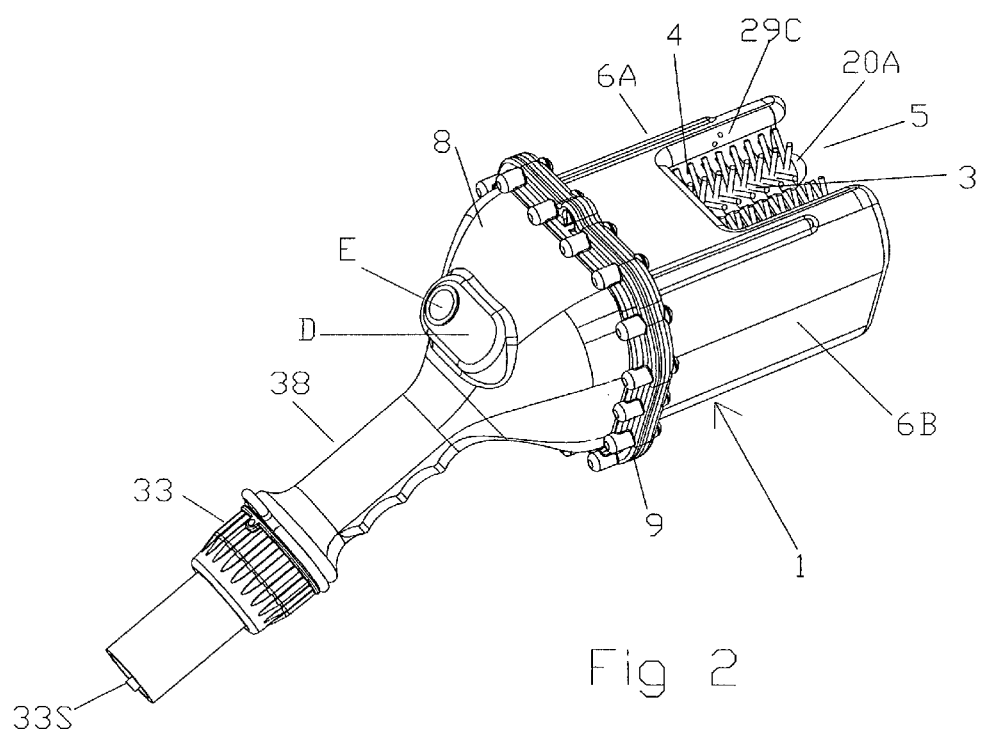
FIG. 2 is a rear view of FIG. 1.
Figure 3:
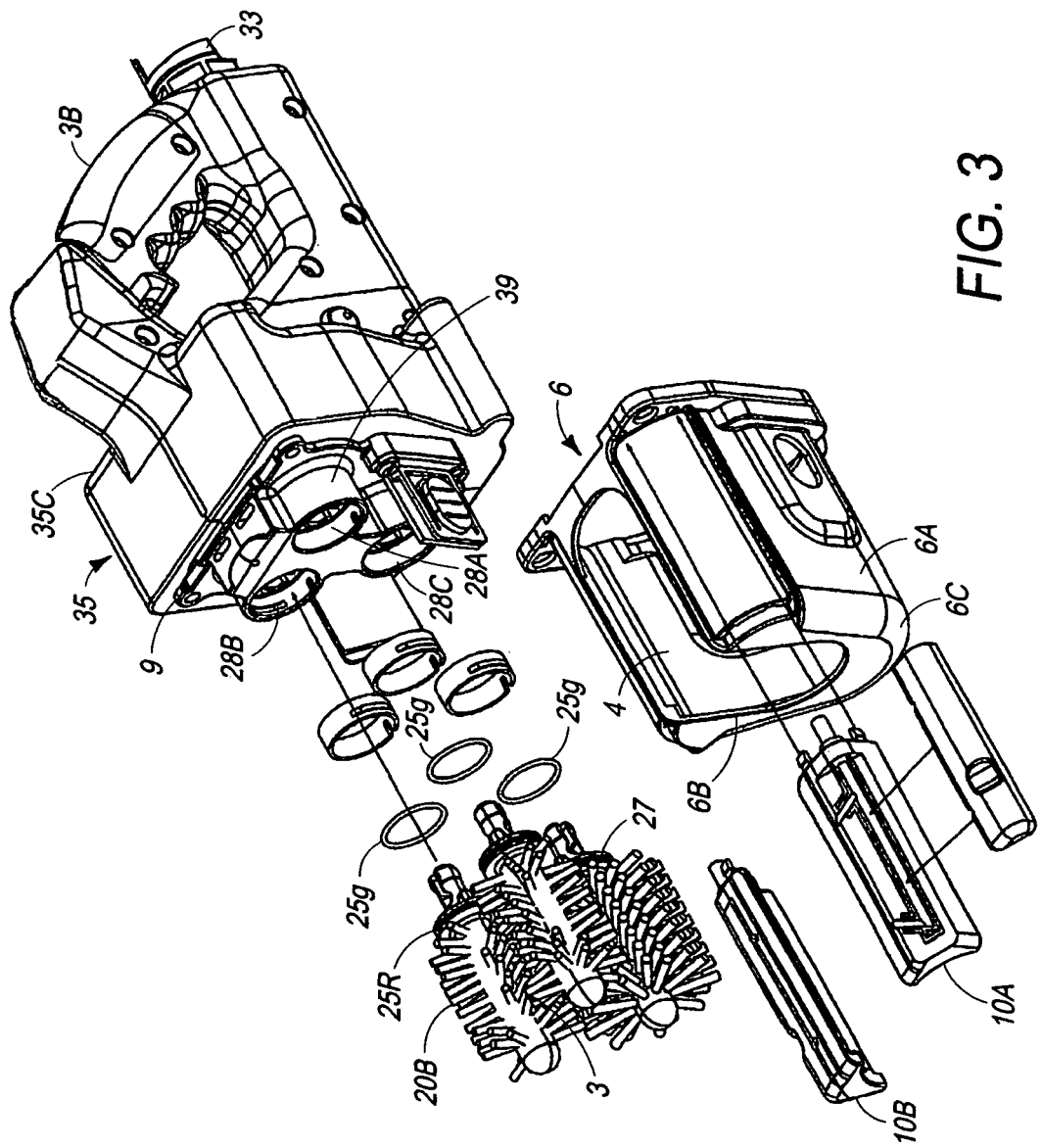
FIG. 3 is a partially disassembled side view of another applicator of this invention equipped with multiple switches adapted to indicate the specific type of treatment to be conducted in a treatment zone of the applicator.

As illustrated in FIGS. 1-3, the depicted hand-held applicator 1 may be provided in as a compact ergonomically applicator 1 housed within sectionalized and detachable chassis sections (e.g. treatment and gear housings 6 & 8) and equipped with a manipulating handle 38, at least one treating agent conduit 29C for supplying a desired treating agent solution to the treatment zone 3, an external power source 33 for providing rotational power and communicating lines (e.g. electrical) linking the applicator to a master control center 40 for the monitoring and controlling of the treatments to be conducted by the applicator 1. The applicator 1 may be automated or alternatively manually operated either of which operation takes advantage of the unique ability of the applicator 1 to horizontally receive and engage an animal's teat as opposed to the ineffective conventional vertical up and down top fed units.

Figure 6:
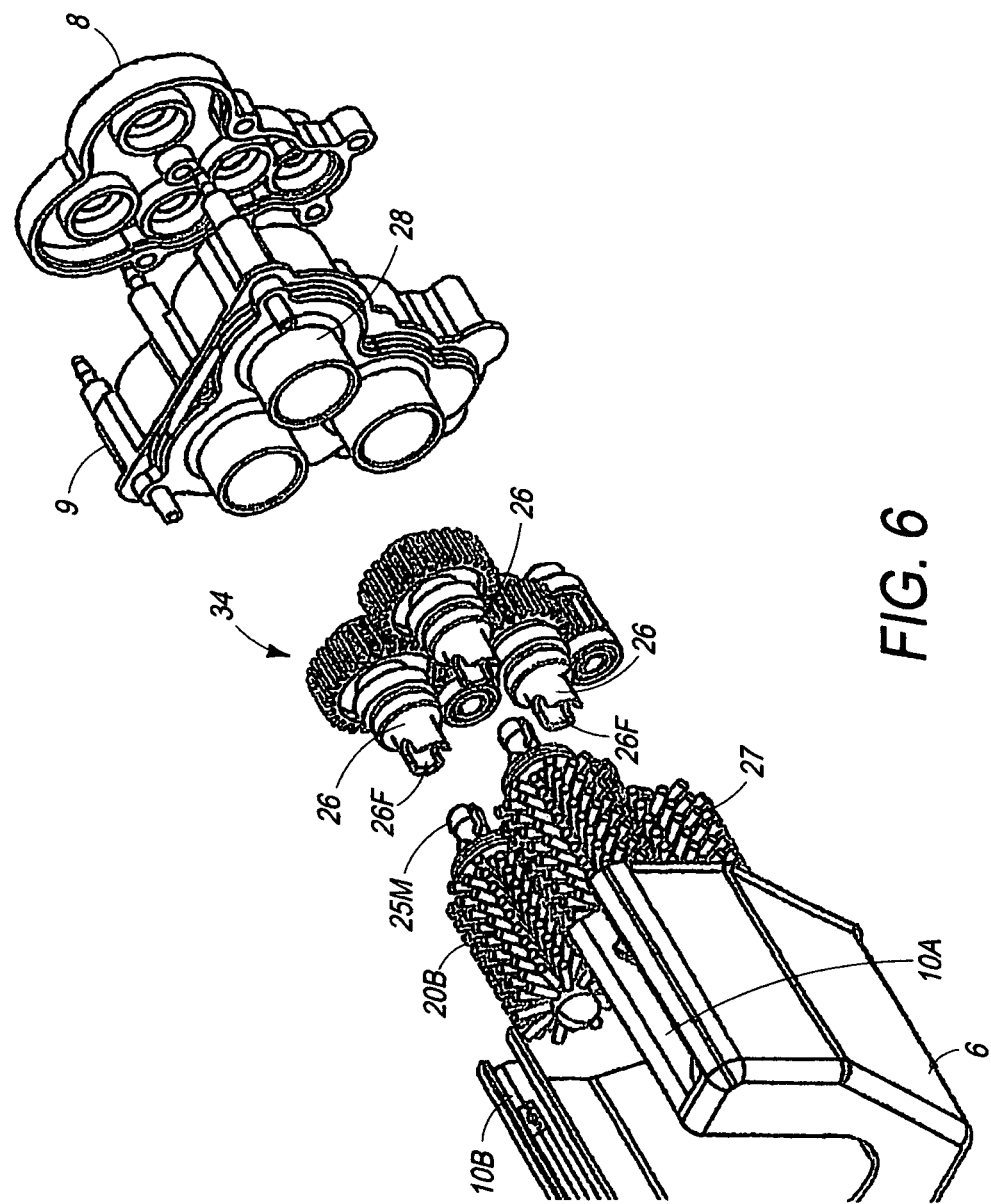
FIG. 6 is a partially disassembled view of the applicator of FIG. 3 showing in greater detail the quick attach and detachable brush couplers, the brush splash shields, brush gear shafts, gear assembly and protective encasements.

The brush housing section 6 housing the treatment zone 3 of the applicator 1 includes an atypical forwardly entryway opening 5 for horizontally receiving a milk producing teat. This front entryway 5 provides significant advantages over the prior art systems by substantially reducing the necessary time and manipulative movements needed to thoroughly clean and sanitize teats. It may be further observed that the depicted brush housing section 6 (e.g. see FIGS. 6 & 8) may be designed to snap securely onto its shielding position while also providing removability features such as by a release pin which secures and releases the brush housing section 6 from its port side mount. The more open forwardly entryway 5 of the applicator 1 depicted by FIGS. 1, 2, and 6A provides direct brush 20A, 20B & 27 accessibility, allowing for brush replacement without needing to remove a housing 6. In a robotic applicator 1, the brushes 20A, 20B & 27 may be constructed of a more open structure.

The applicator 1 provides a distinctly different mode of operation in its operational use in a milking operation. The applicator 1 has a unique treatment zone 3 including a forwardly openly disposed entryway 5 and a top entryway 4 channeled so as to allow a teat T undergoing treatment to horizontally pass onto cantilevered horizontally aligned counter-rotating brushes 20A, 20B & 27. The manner in which the animal teats T are treated results in an unexpectedly thorough antiseptic and constant brushing action of the teats T within a treatment zone 3. Unlike traditional applicators customarily equipped with only top teat entryway for only top side teat receiving designed only to provide an up and down teat treatment, applicants' applicator 1 includes a forwardly positioned entryway 5 in cooperative alignment with horizontally aligned cantilevered brushes (20A, 20B & 27) collectively providing an open pathway for horizontally receiving and treating of teats T within the treatment zone. By horizontally aligning the treating brushes (20A, 20B & 27) to a horizontal teat treatment within a treatment zone 3 (rather than the conventional vertical limited treatment area), the efficacy of the teat treatment by the applicator 1 becomes significantly more thorough and antiseptic than conventional applicator treatments. The total operative treating area served by the treatment zone 3 horizontal rotating brushes herein constitutes a significantly greater operative treatment area than that achievable with other conventional applicators. The treatment zone 3 embraces a brushing area within the applicator 1 served by longitudinal length of the counter rotating upper brushes 20A & 20B and a lower brush 27. The teat treatment and the manipulative alignment of the applicator substantially reduces both arm and wrist fatigue as well as many of other commonly occurring operator maladies (e.g. tendonitis) directly associated with the use of current hand-held applicators. This alignment also substantially reduces the required movements needed to more effectively complete any given treatment while also significantly increasing treatment efficacy and speed. The applicator 1 is also provided with a top entryway 4 which by reason of positioning of the brushes (20A, 20B & 27) and characteristics thereof allows the operator to use either entryway (4 or 5) in the desired horizontal treatment procedure of teats. The open top structure also allows for a front entryway 5 of the teat and its unobstructed horizontal inward movement resulting in a more thorough and continuous longitudinal brushing or cleaning surface contact before exiting the treatment zone 3.

The teat treatment may be effectuated by substantially straight line or in wave movements within the treatment zone 3. The multiple open entryways provided by the treatment zone 3 allows for multiple axis teat treatment as opposed to the prior art single axial vertical teat treatment (i.e. up and down). This becomes an important factor in administering certain types of treatments. For example, the type of motion needed for effective teat washing, milking stimulation, drying and post dipping are most effectively conducted by applying different multi-directional wave-like movements which cannot be manipulatively achieved by a simple conventional vertical up and down movements. The multiple axial treatment movements herein may be specifically applied in an optimum manner by each operator for each desired treatment under a timed sequence and such other operational conditions as best suited for an indexed type of treatment being conducted with the hand-held applicator 1.

All of the aforementioned features are designed to significantly reduce an operator's arm and wrist movements as well as the total number of operative movements and the level of occupational stress. This enables the milking operator to remain more safely and longer at the work site and conduct teat treatment upon two of the four utter teats by a single pass or swipe through the treatment zone 3 serviced by brushes 20A, 20B & 27. Since two of the teats T are typically in planar aligned irrespective of which approach is taken, two teats T can be handled, if desired, upon one swipe. In contrast, the brushing, up and down operational requirements of conventional applicators are slow, ineffective and injurious to the operator's health.

With conventional applicators 1, a minimum of twelve linear movements are required to treat one utter as opposed to only two linear movements per utter treatment when using the present applicator 1. In contrast to prior art applicators, the time and motion saving attributes of the present applicator 1 may be readily discerned upon the basis of teat alignment and how the present applicator 1 may be used. The forward and rearward teats T of a milk producing animal utters permit two teats T to be processed or treated along six possible straight teat treatment planes. These manipulative operational planes include the left and right rear teats, the left and right forward teats, the left rear and left front, the right rear and right front and the two diagonal cross over planes of left rear and right front, and right rear and left front teats. These six planes of alignment allow the operator to cover two of a cow's four utter teats T in a single pass for a total of two linear passes per cow. Comparatively, the old cup style applicators require at least three operative movements (i.e. placement to teat followed by up and down plus twisting for minimal cleaning) for each teat T which constitutes a minimum total of twelve distinct motions for each utter treatment notwithstanding the usual need for additional repetitive up and down motions to compensate for ineffective brushing. In contrast, only two forwardly motions are needed to effectuate a treatment application per cow using the unique applicator 1 of this invention. Although at first glance this may appear inconsequential, it amounts to a substantial time saving and a fatigue reducing factor when applied to the current mega size milking herds. Comparatively, this amounts to six thousand more motions versus only two-thousand motions for each thousand of treated cows. These factors plus the elimination of persistent stressful twisting motions required by prior art applicators significantly decreases the chances of operator fatigue, and injury risk such as tendonitis. Since cows are often milked three times in one day, the operator strain and time becomes a multiple factor. Thus, the present invention affords significant time saving, effortless and injury free operation over the current applicators. Even more surprising is the more highly effective cleaning and sanitizing treatments which are effectuated by the treating zone 3.

Figure 8:
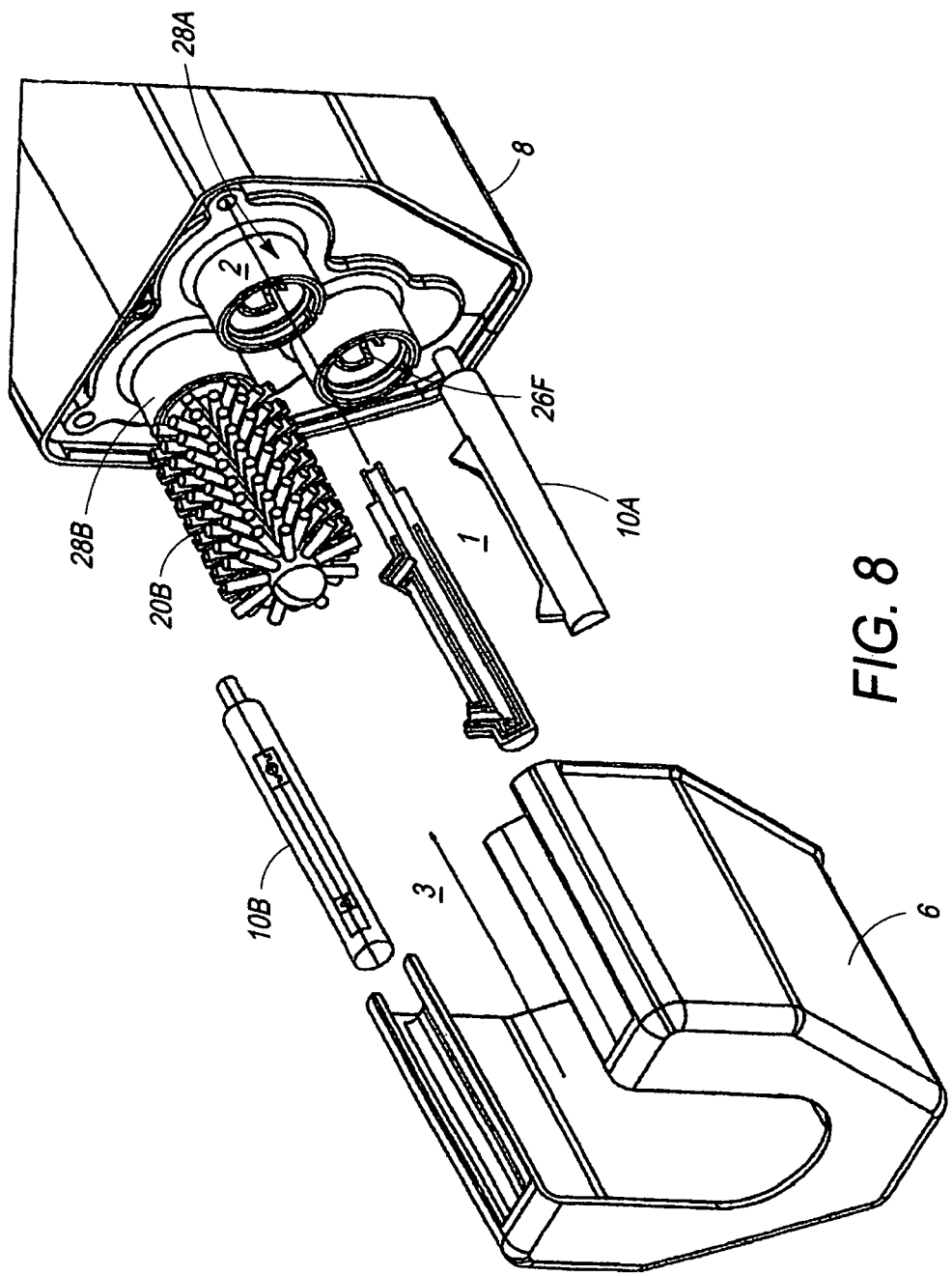
FIG. 8 is another partially disassembled view depicting in greater detail the treatment zone of the applicator shown in FIG. 3.
Figure 9:
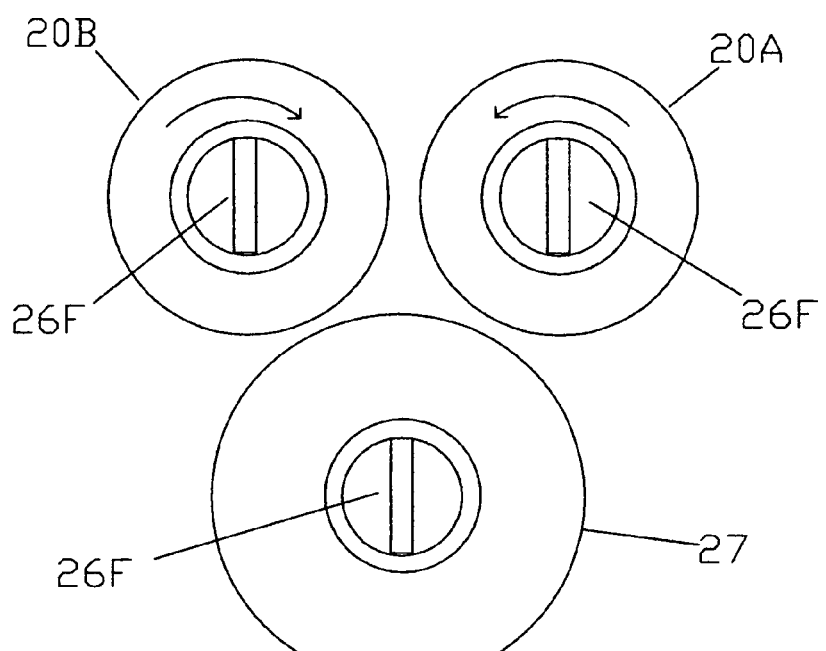
FIG. 9 is a coupling end cross-sectional view illustrating the rotational brush pattern and a brushing clearance for brushes fitted with detachable and attachable brush shaft coupler.
Figure 10:
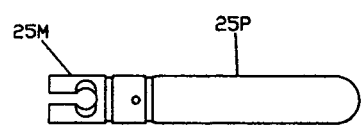
FIG. 10 is a side view of a brushless upper brush shaft shown in FIG. 3.
Figure 11:
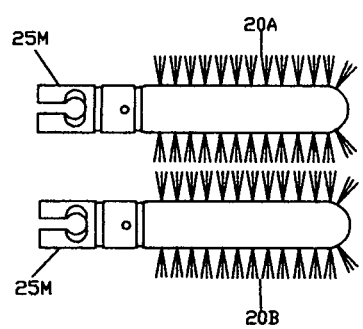
FIG. 11 is a top view of paired upper tufted brush shafts equipped with the shaft shown in FIG. 10.
Figure 12:
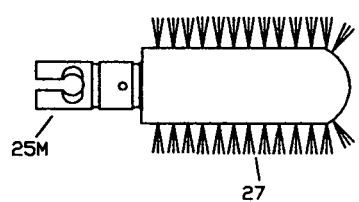
FIG. 12 is a side view of the bottom brush depicted by FIG. 9.

The applicator 1 includes a treatment agent outlet (generally prefixed by 10) which administers the desired treatment agent 29 to the treatment zone 3. As illustrated by FIGS. 6 and 8, the brush housing section 6 covering the treatment zone 3 is depicted as being fitted with horizontally aligned treatment spray assemblies 10A & 10B mounted to the back side panel wall 6B and front side panel wall 6A bordering onto the open top entryway 4 and a front entryway 5. In the applicator 1 depicted by FIGS. 1, 2, and 6A, the conduits and spray ejectors designated as 10A & 10B of FIGS. 6 and 8 are molded into the treatment zone housing 6 structure which shows only the conduit 29C outlet.

The chemical ejection or solution ports 10A & 10B of FIGS. 2 and 8 are shown as being horizontally aligned along the top margin of side protective shielding panels 6A and 6B. The solution ejection ports 10A & 10B are designed to apply the desired treatment agent (e.g. chemical solutions) at a desired designated constant pressure, timed sequence and concentration onto upper brushes 20A & 20B for the desired treatment triggered to be conducted within the treatment zone 3. One of the solution ejection port 10A may deliver one type of chemical treatment and the other port 10B may be used for applying another type of treatment from another chemical solution source (generally prefixed by 29). For example injection port 10A may be used for as a pre-milking wash and sanitizing solution source 29 while the other solution ejection port 10B may be used for a post-milking (iodine solution) chemical solution treatment source. In the design of FIGS. 1 and 2 applicator 1, the chemical solution conduits 29C are equipped with the fluid spray nozzles structurally molded within the splash shielding side panels 6A & 6B. A common single conduit 29C may also be used to communicate multiple chemical solutions from multiple chemical solution sources to the applicator 1 using a wash flush to clean residual chemicals between different applications.

The present invention relies upon variable speed counter-rotating brushes 20A, 20B & 27 which have not been used or recognized as applicable to hand-held applicator use. This becomes an important feature since the brush rotational speed can be effectively adapted to fit on-site milking conditions and thereby avoid teat and bag injury and unsanitized teats. By varying rotational speed, the particular needs of a milking herd or a specific cow or environmental considerations (e.g. excessively dirty teats or bags require a more vigorous brushing and sanitizing verses relatively cleaner conditions) may be effectively accommodated. This also allows for a lower speed and gentler brushing and sanitizing procedure while also permitting, if needed, more aggressive treatments.

The applicator 1 may be provided with one or more triggering members 31 which are used to designates a particular type of treatment (e.g. pre- or post) to be applied and, if desired, involve customized treatment for a specific cow or teat under treatment. If desired, the applicator 1 with a programmed treatment may be programmed to identify a specific tagged cow and administer the appropriate treatment simply upon applying the applicator 1 onto the teat of the animal presented at the milking station. All of these features may be programmed into the master control center 40. However, if desired, full control of the treatment may also be conducted at the milking station by the milking operator with the appropriate application conditions being displayed, if desired, on an on-site monitor.

A triggering indices 31 initiates a signal for the commencement of a desired predetermined treatment task suitably programmed and controlled by the master control center 40. The hand-held applicator 1 may accordingly include one or multiple switches (generally designated as 31) such as a brush drive switch 31, a post dip switch 31, a pre-treatment switch 31, a dip spray switch 31, an on and off switch 31, a wash spray on and off switch 31, a test button, a menu keyed switch 31, etc. or any combination thereof along, if desired, on-site for monitoring of the procedure conducted by the on-site operator etc. The applicator 1 as shown in FIGS. 1 and 2 depicts a single switch 31 used for a prewash and prep milking treatment. As disclosed in our provisional application, the applicator 1 may be equipped with multiple switches 31 programmed to conduct one or more tasks with applicator 1. The manner in which each type of treatment is effectuated will most appropriately be initiated by an on-site operator triggering the desired treatment whereupon the PLC 40 commences signaling commands and controls all of the treatment conditions conducted within the treatment zone 3 except for the manual movement manipulations conducted by the operator. The applicator switch 31 may include any type of switch such as a toggle type switch 31 with single or multiple switch positioning reflecting the desired treatment, button switches 31 such as a touch screen switches 31 as disclosed in our co-pending provisional application Ser. No. 61/957,157 and any other type of activating switch 31.

The unique applicator 1 herein may also be effectively used by manual control without the aid of a PLC 40. Although the Figures and enclosures are primarily directed to a hand-held applicator 1, the embodiments herein may also be applied to a robotic applicator 1 monitored and controlled by a master control center 40 (e.g. PLC, circuit board, computer, microchips, smart phones, etc.). The manipulative applicator movements of an on-site operator are adaptable to a robotic applicator 1 equipped with robotic controls, arms, sensors, and robotic suspension systems etc. to simulate the manual operational use of the hand-held applicator 1. The same PLC 40 control and monitored system of the hand-held applicator 1 will also apply to robotic applicator 1 in addition to those needed for the robotic manipulation.

The applicator 1 in combination with the PLC 40 allows the milking manager to control and monitor precisely how each treatment to each cow should actually be conducted within the treatment zone 3 and, if desired, an ability to regulate the entire course of the treatment conducted within the treatment zone 3 by the applicator 1 at the milking site. In a typical milking operation there exist a host of factors which need to be taken into account for each cow presenting itself for milking. Each individual cow may be conventionally tagged with electronic tags which identify a specific cow and its needs for which the PLC 40 may effectively maintain a data base for the specific treatment to be administered to each specific cow.

Figure 40:
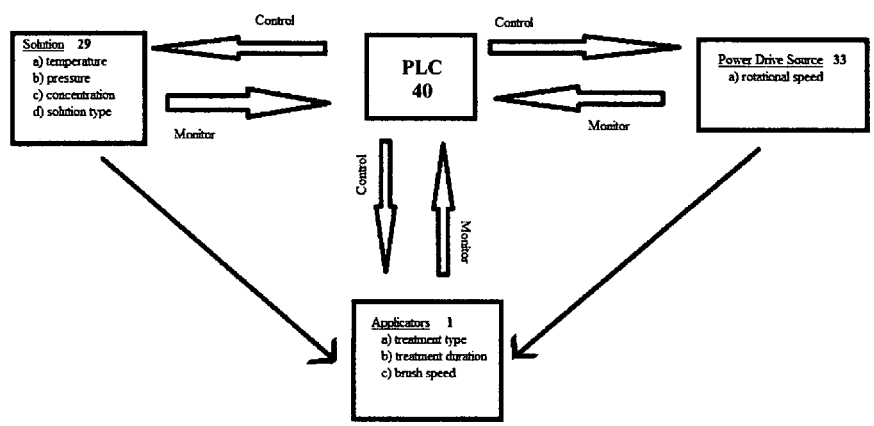
FIG. 40 depicts in block diagram showing the interrelationship of a personal computer in the monitoring and control of brush speed, the treatment agent or treatment solution sources and the type of treatment as applied by the applicators.

The applicator 1 may be in direct operational communication with a master control center 40 (e.g. often referred to as PLC) equipped with the necessary software to monitor, create a suitable database and regulate or control (e.g. power source 33, and chemical treatment source 29 as illustrated by FIGS. 40 and 41) and thereby effectuate a predetermined prescribed manner of application treatment at the treatment zone 3. Thus, a predetermined timed sequence and the termination of each treatment step within the treatment zone 3 may be monitored and controlled as desirably required to effectuate an effective, safe, productive and healthful, milk producing operation. The treatment zone 3 is particularly applicable to the diverse treatments conducted upon milk producing animal teats such as dairy cows. Conventional hand-held applicator systems are typically limited to operating no more than two applicators operating off a common chemical solution source 29. In contrast, the present system is capable of easily handling up to four applicator stations from a common in-line solution source 29 with each being under individual control by one master control center 40. Effective use of in-line pressure sensors, in combination with a PLC command center 40 sending or transmitting pressure regulating signals to a pressurized source 60 (e.g. pump) and an in-line manifold 61 equalizes solution pressure as supplied to each individual applicator 1 at multiple applicator sites thus providing a controlled and precise application pressure of the desired chemical solution to each treatment zone 3. This is in contrast to the erratic and essentially unregulated pressure control experienced with conventional multiple applicators operating off a single centralized chemical source.

FIG. 41 is a schematic flow sheet depicting the operational running of four applicators 1 connected to two chemical solution sources 29 identified as a wash (pre-milking teat treatment) and a dip (a post milking teat treatment) monitored and controlled by a touch screen PLC 40 at an off-site control room. A separate in-line pump, in-line positive flow meter and chemical solution conduits 29C for each solution source delivers the desired chemical solutions to valve control boxes (identified as 120A & 120B) which valve and ultimately control the chemical solution valved to each of the applicators 1 which are identified as applicators 1, 2, 3 & 4. It will be observed the PLC 40 monitors and regulators both in-line pumps and both in-line positive flow regulators leading to valve control boxes 120A & 120B. The PLC 40 also monitors and controls the amount of chemical solution and time period the valved chemical solution 29C is admitted to each of the applicators 1, 2, 3 & 4. Each of the valved chemical solutions are then conducted through a common flexible cable 33C (identified as 1, 2, 3, & 4) which also includes the electrical power wiring and PLC wiring for monitoring and controlling the 24 DC variable speed motors at motor control boxes 120A, 120B, 120C &120D. The flexible drive cable 33C individually serving each of the applicators 1, 2, 3, & 4 and the chemical solution conduit 29C are each housed in a common flexible cable which services each applicator (1, 2, 3 & 4) to provide the treatment conditions as prescribed by the PLC 40. The sole obligation of the on-site operator resides in applying the manual manipulation of the hand-held applicator 1. In an applicator 1 robotically controlled, the robot conducts the manual manipulation.

The encasement of the applicator 1 may typically include two detachable covering sections namely a drive assembly housing section 8 equipped with a handle 38 and a gear box assembly 34 and a brush treatment housing section 6 housing the treatment zone 3. The drive housing section 8 may suitably house the drive mechanism 33 as well as one or more operational switches 31 which designate the particular type of treatment to be conducted by the applicator 1. The drive housing 8 and the brush housing 6 may be designed for easy assembly and disassembly to provide an easy on-site access for cleaning and repair.

The hand-held applicator 1 may be constructed of any strong, impact resistant and durable material (e.g. metals, plastics, composites, etc.) shaped or molded to provide the desired structure and weight for the hand-held applicator 1. The brush housing section 6, sealing barrier 9, gear housing cover section 8, brush gear shaft shroud 39, the applicator handle section 38, the gear shaft bearing seats 34U and other necessary components for the design of the hand-held applicator 1 may collectively or separately be provided as molded pieces of a unitary construction. Molded metallic, plastic and composite materials possessing sufficient rigidity, durability and impact resistance are particularly well suited for the construction. The molded polycarbonates characteristically possess high strength impact resistant, high torque, chemical resistance, acceptable weight, a low thermal and electrical conductance and high durability which characteristics are especially useful for the molding of housing sections 6 & 8 as well as molded brush shafts 25 and drive shafts 26 uniquely fitted with the coupling and uncoupling features plus other parts of the applicator 1. The housing sections 6 & 8 may be injected molded incorporating other useful features such as treating agent conduits 29C, brush shaft ports 28A, 28B & 28C, the drive shaft 26, cable drive retainers, journal boxes 34U for seating the gear bearings 34*o*, switch mounts 34, a barrier panel 9, etc. and a handle 38 for housings for the inputting drive cable 33C, solution conduits 29C and electrical lines 33E linked to the PLC 40.

The gear assembly housing unit 8 suitably proceeds a rearwardly extending handle 38 which an on-site operator manually manipulates the applicator 1 under the treatment conditions as may be prescribed by the programmed master control center 40. In animal teat treatments, the manual locomotive mode of treatment conducted by the on-site operator consists essentially of passing the teat T through the brushing action of the treatment zone 3 after triggering the desired treatment. The handle 38 may include a positive pistol grip type handle or a goose neck handle 38 design as shown in FIGS. 1, 2 and 6A or any other appropriate design to facilitate manipulative control of the applicator 1. The handle 38 may optionally include a thumb or finger impressions. The applicator 1 may be provided in a compact size easily measuring 6 inches or less in length, weighing two pounds or less (notwithstanding its sturdy construction) making it easy to handle and manipulate.

The treatment zone 3 may include a detachable brush housing 6 (which may be comprised of a single molded piece) comprised of a front side panel 6A, a rear side panel 6B and a base support 6C collectively defining a frontal entry 5 and a top entryway 4. An uncoupling protective housing 6 or open protective housing 6 permits easy removal so as to afford access to the brushes 20A, 20B & 27 for cleaning or replacement. The treatment zone housing 6 of the applicator 1 shown in FIGS. 1, 2 and 6A has a sufficiently open structure for brush replacement without needing the housing 6 to be removed.

The depicted front side 6A and rear side 6B panels of the depicted treatment zone housing 6 generally afford sufficient splash protection so that the bridging bottom base support 6C may be eliminated. However, the bridging base support 6C depending upon design assists in adding strength and continuity to the molded forward housing piece 6. As depicted, the base support 6C may be of an open structure allowing waste solutions to freely drain onto the parlor floor. If desired, the base support 6C may be equipped to recycle the treatment agent to the treatment source 29E for reuse. Since the partitioning panel 9 for the applicator 1 shown in FIGS. 1, 2 and 3 is of a single piece molded construction with the treatment zone housing 6, the base support 6C beneath the rotating brushes 20A, 20B & 27 may be partially or completely eliminated.

Figure 4:
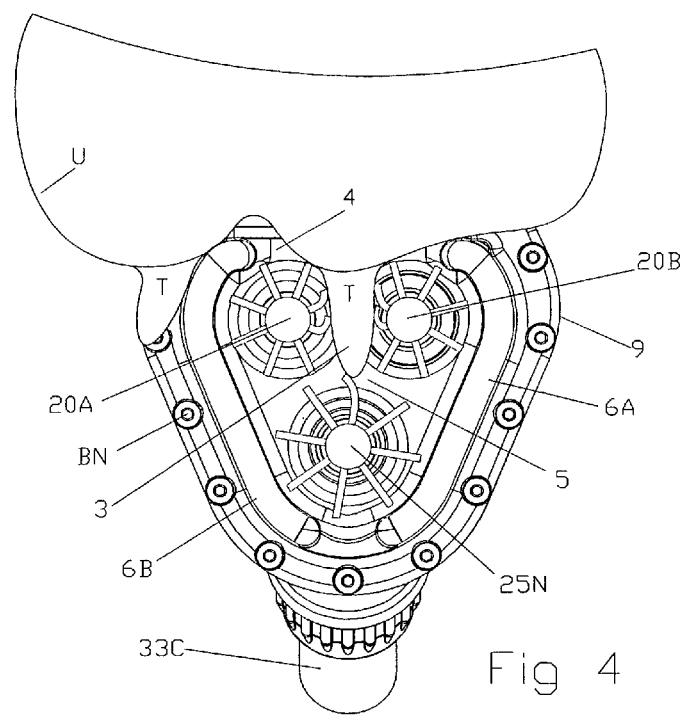
FIG. 4 is a frontal view of the applicator of this invention depicting a brush housing having a protective splash shield, a forwardly teat entryway and a top side teat entryway with a cow teat being treated within the applicator of FIGS. 1 and 2.
Figure 5:
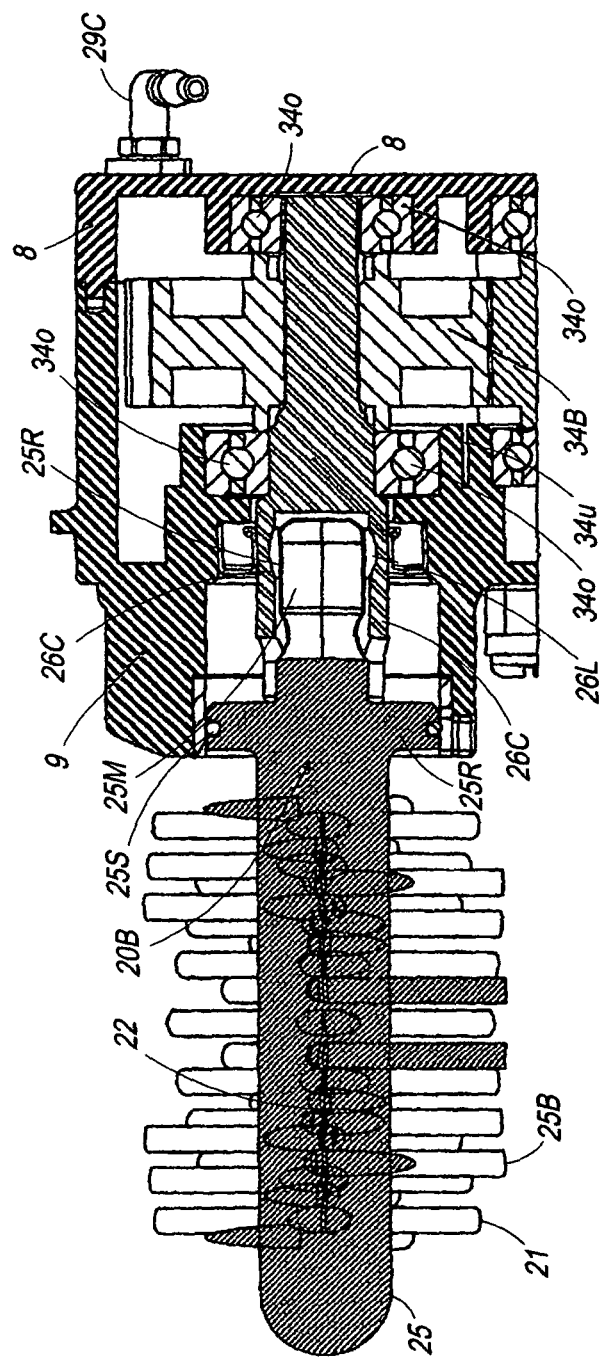
FIG. 5 is a partial longitudinal cross-sectional view showing in part the internal workings of the applicator shown in FIG. 3.

The counter rotational movement and horizontal positioning of the upper brushes 20A & 20B uniquely guides and moves an entering teat T horizontally inwardly within the rotating brushes 20A, 20B & 27 to maximize the teat cleansing and sanitizing treatment within the treatment zone 3. This also applies to other such treatments which may be appropriately conducted within the treatment zone 3. During treatment, the teats T entering the treatment zone 3 appropriately pass within the rotating horizontally aligned brushes 20A & 20B. Upper brushes 20A & 20B equipped with entryway patterned tufts 21 may effectively be used to assist an entering teat T onto the horizontal rotational path movement and the gripping brushing action of the upper brushes 20A & 20B. Once the teat T becomes seated within the rotating brushes 20A & 20B as illustrated by FIG. 4, the teat T is easily guided by the rotating brushes 20A & 20B to its exiting guide 6T.

Effective horizontal guiding of a teat T along the longitudinal axis of upper brushes 20A & 20B may be effectively achieved by patterning a leading portion or more of the brush tufts 21 so that the counter rotating upper brushes (20A & 20B) more easily positionally guide the teat T onto the horizontal brushing action of brushes 20A & 20B and the teat existing guide 6T. The contoured tufts 21 of the upper brushes 20A & 20B may include either a partial or complete, straight or diagonally set of tufts 21 aligned to form a pathway 22 of least resistance about the leading brush surface initially contacting upon an entering teat T which causes a teat T entering from the forwardly entryway 5 (as well as top entryway 4) to be rotationally brushed inwardly and aided in an inwardly movement along the longitudinal horizontal axis of brushes 20A & 20B to the teat exiting juncture 6T. By creating a contoured tuft or more pliable tuft entryway, the rotating upper brushes 20A & 20B may thereby effectively position the entering teat T to become more readily operatively engaged onto the gripping rotating brushes 20A & 20B and thereby facilitate the horizontal treatment and guiding of the teat T to its exiting point. A contoured or softer textured patterned tuft entryway pathway of an inch or less will be generally sufficient to place the teat T within a brush zone of the counter-rotating upper brushes 20A & 20B to create a teat gripping brush action which assists in the horizontal movement of the teat T through the treatment zone 3. A gentle teat T entry creates a more soothing and safer environment. As the teat T moves inwardly, the entrained teat T becomes thoroughly and completely engaged to a maximized brush treatment by brushes 20A, 20B & 27. The patterned tuft entryway contributes to the ease by which the teat T engages the brushing action thus reducing the manual force applied during teat entry.

Since the brush gripping and horizontal movement typically commences upon seating of the teat T between the counter-rotating upper brushes 20A & 20B, the patterned tuft entryway 21 initiates longitudinally the commencing teat engaging movement. The rotating upper brush patterned tuft action need not longitudinally extend across the in-line upper brush length. A short patterned tuft entryway at the brush entryway end measuring less than one inch and even shorter (e.g. ½ inch), with the appropriate tufted pattern will, in general sufficiently allow the upper brushes 20A & 20B to gripping action to take over and horizontally move the teat T along its horizontal teat treatment pathway. The patterned entryway pathway 22 may be effectuated by tuft cross-sectional size, tuft stiffness and softness, the number of tuft filaments 23, tuft lengths, tuft arrangement upon the brush 20A & 20B, etc. which are factors reflecting in the ease in which a teat T initially becomes engaged with the upper brush (20A & 20B) action.

Figure 24:
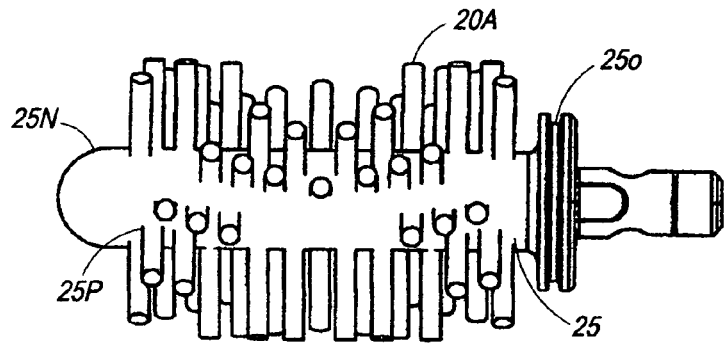
FIG. 24 is an isometric top side view of an upper brush equipped with a brush tuft of a patterned design with the male coupler being depicted in a compressed unlatching position.

The brushing action upon a teat T may also be assisted by placement of the left hand upper brush 20A and the right hand upper brush 20B in a predetermined rotational tuft pattern and tuft alignment so that upon each rotational movement of the upper brushes 20A & 20B will matingly and collectively provide the desired rotational tuft pathway 22 for ease of teat passageway therethrough without sacrificing sanitation. When the upper brushes 20A & 20B have patterned tufted valleys 22 there is also need to register paired rotationally alignment and matched so as to effectuate this desired result of providing a sufficient valleyed pathway 22 to effectuate teat treatment therewithin. As illustrated by FIG. 24, the brush tufts 21 may be arranged in a chevron design or other inwardly moving entryway tuft design wherein each of the upper brushes 20A & 20B have mating and complementary tuft patterns in an interfacing juxtaposition contour so as to conjointly form the desired valleyed pathway 22 therebetween. Similarly, the brush tufts 21 may be arranged in a rotationally diagonally receding tuft alignment which due to the off-set rotational tuft alignment may be used and assist in horizontal teat movement while creating a gentler rotational brush treatment so as to thoroughly and completely brush each teat. Alternatively, softer textured tufts 21 positioned in a rotationally registering positions on each of the upper brushes 20A & 20B operated in timed sequence may create a similar operative function as the shorter or absence of tufts 21 in the valleyed pattern of a patterned valley 22 of the FIG. 29 type. The use of the patterned symmetry may be operationally accomplished by setting the left hand and right hand brushes 20A & 20B at a predetermined rotational setting for a timed rotational alignment of both upper brushes 20A & 20B such as disclosed herein.

The brush tufts 21 may accordingly be positioned in such a manner that a horizontally entering teat T becomes positioned between a registering rotational teat pathway provided by the upper brushes 20A & 20B while undergoing their counter rotational movement within the treatment zone 3. By spacing the tufts 21 so as to form a diagonally aligned valley 22 or channel 22 juxtapostionally trailing the teat brush entryway, a desired inwardly movement of the teat T may also be effectuated. A leading brush tufted entryway pattern created by diagonally positioning tufts 21 of different sized tufts 21 such as using shorter tufts 21, absence of tufts 21 or softer texture may also be used to create the valleyed pathway 22. The pair of counter rotating upper brushes 20A & 20B with the tufted valley 22 rotationally form a synchronized teat T receiving valley 22 which in turn provides a particular highly effective brush combination for optimizing cleansing or treatment under minimal stress conditions to the treated teat T.

Brush alignment of upper brushes 20A & 20B in rotational alignment creates a sequenced rotational movement wherein the brushes 20A & 20B with their valleyed tufts 22 thereto rotate in a timed and mating rotational sequence. Thus, when brushes 20A & 20B are properly aligned for rotation, their rotation creates a valleyed pathway 22 for horizontal guidance of the teat T through the treatment zone 3. Each of the depicted upper brushes 20A & 20B may for example, include two valleyed pathways 22 longitudinally extending across at least a portion of the leading brushing surface of the upper brushes 20A & 20B.

FIGS. 2 and 20-23 depict upper brushes 20A & 20B equipped with an alternative tufted pattern depicting diagonally aligned and laterally disposed brush tufts 21 which in a predetermined brush alignment operational use serve to create a chevron type of tufted design. It may be visualized that the rotationally leading tufts 21 and the trailing brush tufts 21 form a bed or valleyed pathway 22 gently moving the teat T along highly effective brushing surfaces. The tufts 21 on one side of the brush pathway 22 are arranged so as to incline to a peak within the bristled brush region and then descent to the level of the entryway tufts on the opposite or exiting brush end. The tufts 21 on the opposite side of the valleyed pathway 22 follow the same mating ascending and descending pattern while rotationally maintaining a valleyed tuft spacing. Illustratively, the outer entryway tufts 21 form the rotational leading tuft 21 edge while the three inwardly positioned tufts 21 of the leading rotational side form a peak tuft 21 with those opposite therefrom form the valley bed 22. The tufts 21 on each valley side correspondingly ascend and descend to rotationally create a teat pathway 22 for the treated teat T. The valleyed teat pathway 22 depicted therein may typically measure from about 10 mm to about 30 mm apart and most typically from about 15 mm to about 25 mm. In the depicted upper brush rollers 20A & 20B, each of the brushes are provided with two chevron designs of paired tufts 21, each of which is adapted to provide a valleyed pathway 22 enclosure for receiving an entering teat T and moving the teat inwardly within the treatment zone 3 furnished by the counter rotating upper brushes 20A & 20B.

It has been observed that even when using the conventional type of tufted applicator brushes, the treatment zone 3 herein provides unexpectedly superior brushing action over conventional applicators. The unique horizontal brushing movement of tufts 21 helps to center an entering teat T and maintain the teat T at the desired horizontal treatment axis irrespective as to where the teat T enters the treatment zone 3. Experimental comparative tests with straight brush tufts 21 longitudinally aligned to the brush shaft 25 reveal a high degree of efficacy in teat cleaning and sanitizing to provide teats T essentially bacterial free and clean on a single pass through the treatment zone 3 whereas conventional top entry brushes of the same brush and tuft construction fail to provide comparable results notwithstanding uncommonly extra repetitious up and down movements with a conventional applicator 1. Such results may be achieved with or without a valleyed tuft design which evidences the superiority of the applicator 1 in brushing efficacy.

The upper brush rollers 20A & 20B as well as lower brush 27 are operationally positioned in a non-meshing juxtaposition (i.e. non-contacting) in contrast to the most commonly used practice of intermeshing or contacting rotating brushes. This positioning of brushes provides greater brush longevity and provides a healthier teat treatment environment. Modern herds are breed to be high milk producers with more slender and shorter teats T which typically measure about 1 inch to about 2 inch length. The tufts 21 of the upper brushes 20A & 20B and the lower brush 27 should be of sufficient length to permit a thorough brushing and treatment of the teats T within the treatment zone 3. Typical tuft heights may range from about 0.1 cm to about 0.2 cm and most typically may range from about 13 mm to about 18 mm in length as measured from the brush shaft 25.

As customarily known, brush tufts 21 are comprised of a multiplicity of filaments 23 emanating from a common anchoring aperture 25T. These tufts 21 are typically composed of a bundle or cluster of brush filaments 23. In several of the drawings, the tufts 21 have been depicted for illustrative purposes as a single strand when in fact each of the brush tufts 21 are comprised of a multiplicity of filaments 23 anchored to the brush shaft 25. The tufts 21 of the upper brushes 20A & 20B and the lower brush 27 generally contain sufficient number of tuft sizes and bristle stiffnesses to impart the desired cleansing action within the treatment zone 3. The tufts 21 are typically of a circular or oblong cross-sectional form with a cross-sectional tuft diameter typically ranging from about 2 mm to about 10 mm and most typically from about 4 mm to about 8 mm. The bristles or filaments 23 forming the brush tufts 21 herein will desirably have a compositional make-up and filament character which gently and effectively brushes teats T.

The applicator 1 herein accordingly affords the use of a softer and gentler brush tufts 21 to provide a more complete brushing treatment. Particularly effective bristled tufts 21 for bristled brushes 20A, 20B & 27 may include brush type nylon filaments 23 adapted to provide a gentle brushing action within the treatment zone 3, but yet providing sufficient stiffness, flexibility and durability to provide the necessary cleansing treatment action. Brush grade nylon filaments 23 which are not injurious to teats without being too fine or too coarse to effectuate the desired treatment may be used for this purpose.

The polymeric composition of the filament 23, the diameter as well as tuft 21 size (cross-sectional and height) may be effectively chosen for the particular conditions (e.g. bag or udder U conditions) under which the brushes 20A, 20B & 27 are to be used. As indicated, brushes 20A, 20B & 27 may be readily be replaced by the operator at the milking site to accommodate any change in milking conditions. Also as the filament 23 or tuft 21 circumferences increase, the increased diameter size tends to increase brush rigidly or stiffness, but to a lesser degree than would normally arise with the stiffer brush filaments 23 such as a polypropylene filament. The tuft placement will also have a textural effect upon the tuft texture with more closely packed or denser clustering of the tufts 21 and filaments 23 tending to provide a stiffer brushing action. Such factors may be used to an advantage with nylon based filaments 23 or any other appropriate filament 23 since the filaments 23 individually and collectively tend to maintain a desired degree of flexibility for effective brushing treatment within the applicator 1. In operational use, the dirty teats T will generally need stiffer brush filaments 23 whereas the cleaner teats T need the finer or softer textured brushes. The brushes 20A, 20B & 27 may be coded or otherwise marked to indicate brush texture as well as their proper replacement position.

The lower brush 27 is operatively positioned below the upper brushes 20A & 20B. As illustrated by FIG. 4, the lower brush 27 serves to brush the lower portion (e.g. tip) of the teat T while upper brushes 20A & 20B brush above the teat tip T. The lower brush 27 may appropriately have a longer tuft length (e.g. about 15 mm to about 30 mm) than the tuft length of the upper brushes 20A & 20B. The lower brush 27 may be positioned in alignment at a slightly off-set rotational position, relative to a bisecting vertical axial vortex of the upper brushes 20A & 20B (e.g. by about 1 degrees to about 10 degrees). Depending upon brush type, the off-set positioning can be utilized to facilitate teat movement towards the exiting brush end.

The horizontal upper brushes 20A & 20B and the lower brush 27 positioning and their cooperative brushing characteristics provide several distinct advantages over conventional hand-held applicators. Unlike conventional hand-held applicators which typically become ineffective when subjected to diverse teat sizes, the present applicator 1 allows for multi-sized teats (e.g. various shapes, cross-sectional and length sizes) to be effectively treated with a diverse range of treatments as administered by the present applicator 1. These results are accomplished at a significantly higher degree of safety, healthfulness and cleansing efficacy. Comparative to conventional hand-held applicators 1, the animal teats T are more thoroughly cleaned, sanitized, dried, prepped for milking and post sanitized.

It will be further observed from FIGS. 7 and 16-23, that the mounting end of each brush shaft 25 may include a pair of molded bar keys 25B set at 180° angular degrees apart which matingly keys 25B onto a female key accepting members or key slots 26K carried by counter-rotating gear shafts (26). By placing the bar keys 25B of the right hand brush 20A and the left hand brush 20B onto the corresponding female key slots 26K, a precise registered rotational alignment of the brushes 20A & 20B may be accordingly accomplished for each brush mounting. The brushes 20A, 20B & 27 may be designed to provide a stress point breakaway or power source 33 stoppage so as to prevent applicator damage and injurious treatment to a teat T.

The brush shaft 25 and gear axle shaft 26L depicted by FIG. 6A reverses the coupling arrangement. The hexagonal female socket 25M includes within one of the sidewalls a cantilevered hook tipped tab 25T. The rearwardly portion of the female socket 25F which provides the cantilevered support thereof. Tab 25T is depicted as being of a rectangular shape which matingly engages upon a registering planar flighting 26R provided by the hexagonal shaped shaft 26M. The gear shaft 26 and brush shaft 25 are constructed of a high strength plastic material possessing excellent memory characteristics (e.g. compression and rebounding) such as a polycarbonate. The hexagonal gear shaft 26 includes a rectangular flighted rib 26R having a transverse latching notch 26K which engages onto the hook portion of the hook tipped tab 25T. Pushing the brush shaft 25 sufficiently inwardly latches the female 25R and the male coupler 26M together. An outwardly pulling force unlatches couplers 25F & 26M to provide an expedient means or replacing brushes 20A, 20B & 27 at the work site.

Figure 7:
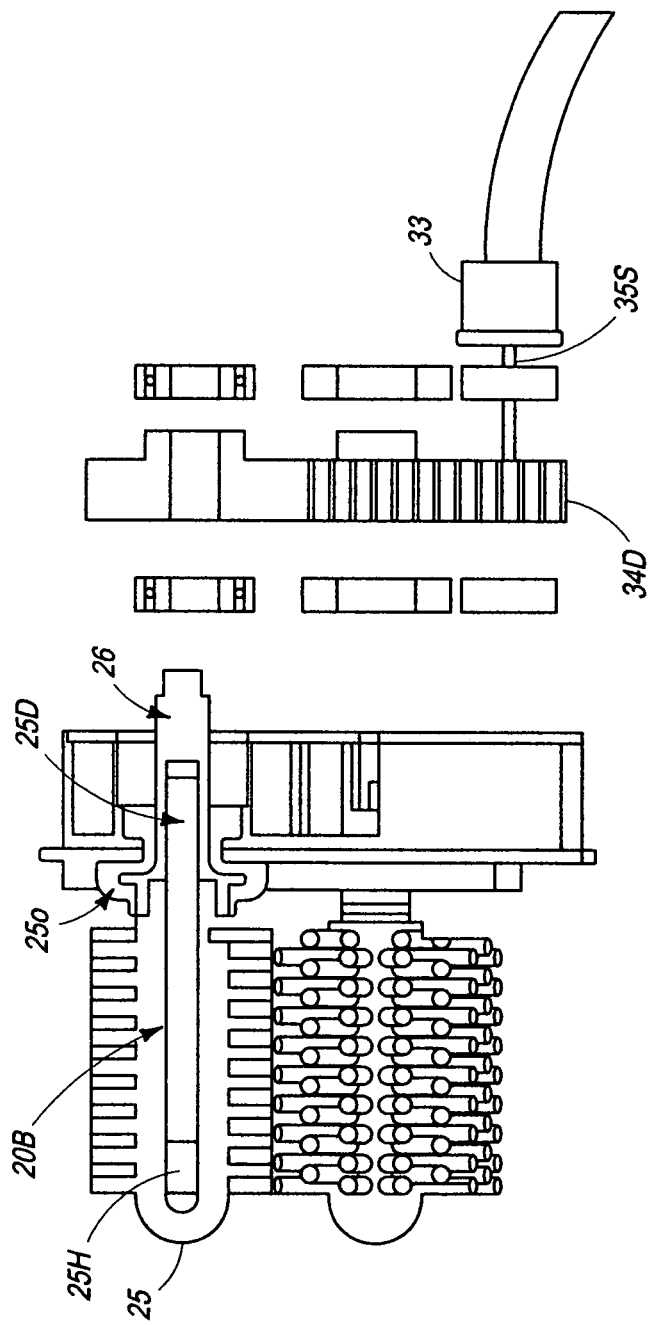
FIG. 7 is a bisecting cross-sectional view of a partially disassembled view of the applicator depicted by FIG. 3 structurally showing supports for a bisected free standing brush shaft.

The cantilevered brushes 20A, 20B & 27 require substantial structural support by both the brush shafts 25 and the gear shafts 26. With particular reference to FIGS. 5, 6A, 7 and 10-13, the structures of roller brushes 20A, 20B & 27 therein are depicted as a brush shaft (generally prefixed by 25) of a stiff shaft structure having an outer moldable shaft sheath 25P (e.g. plastic), an inner supportive steel dowel pin 25D to add structural shaft strength and a brush coupling and dismounting uncoupling male shaft end 25M (FIGS. 10-13). The outer brush shaft 25 construction as depicted in FIG. 7 includes a molded plastic encasement 25P about the brush shaft end of brushes 20A, 20B & 27 which serves as an anchoring encasement tuft mount 25T for anchoring brush tufts 21. The molded plastic encasement 25P has a hollow plastic shaft core section 2511 housing dowel pin 25D. The coupling shaft end 25M includes a compressible plastic latching male coupler 25M and a shaft alignment bar key 25B with an O-ring seating rim 25o for sealing the rotating shafts 25 from the gear assembly 34. In the manufacture thereof, the steel dowel pin 25D may be appropriately centered within a plastic mold cavity and the entire brush plastic shaft assembly 25P including a seating rim 25o, the plastic shaft 25P equipped with tuft mounts 25T, the shaft male coupling and uncoupling section 25M and the alignment bar keys 25B may then be molded together as a unitary piece. As may be observed from FIG. 7, the dowel pin 25D is shown as extending onto the brush shaft latching and unlatching coupling section 25M to provide the necessary strength and rigidity thereto. Each of the brush shafts 25 includes a plurality of tuft mounting apertures 25T arranged about the brush shaft circumference to provide a desired patterned arrangement 22 of tufts 21 for brushes 20A, 20B & 27. The nose shaft 25 has an open-faced, rounded plastic nose cone end 25N which gently guides an entering teat T between the brushes 20A, 20B & 27 while the opposite brush shaft end is equipped with a self-locking male fitting 25M which mates onto a corresponding female coupler 26F operationally attached to the gear shafts 26.

With reference to FIGS. 5-7, 9-12 and 20-27, the self-locking and unlocking male shaft coupling fittings 25M are depicted as including two parallel plastic flexing appendages 25MA & 25MB each of which is equipped with an outwardly terminal positioned latching arcuate ribs 25R. The pair of flexible appendages 25MA & 25MB rest in parallel alignment with each other to create a separating gap therebetween. The terminal ends of the flexible appendages 25MA & 25MB are shown as being equipped with a semi spherical seating rib 25R. The appendages 25MA & 25MB are made of a plastic material possessing good memory characteristics (i.e. compression and rebounding properties). When the appendages 25MA & 25MB are compressed inwardly, the appendage seating rib 25R will be compressed together sufficiently to correspondly slide within chamfered slot 26R within a hollowed cylindrical chamber 26C (shown in FIGS. 16 and 17) containing a détente chamfered recessed slot 26R. The latching is accordingly effectuated by the seating of ribs 25R onto chamfered slot 26R. An outwardly pulling force causes the springed male appendages 25MA & 25MB to compress together allowing ribs 25R to slide free of chamfered annular recess 26R to uncouple the brush shaft 25 from the female coupler 26F. The coupling and decoupling feature renders the brush rollers 20A, 20B & 27 readily replaceable. These unique features coupled with proper indexing also to insure that a desired proper predetermined rotational alignment for upper brushes 20A & 20B is achieved.

The depicted female coupler 26F of FIG. 7 is shown in greater detail in FIGS. 16-19 with the phantom lines depict the hollow chamber 26C which serves to couple appendages 25MA & 25MB of the male coupler 25M thereto. As may be observed from the isometric side view of FIG. 16, the concaved contoured and chamfered slotted section 26R as defined by the phantom lines of the female coupling end (e.g. see FIGS. 16 and 17) serve to seat and couple the male ribbed section 25R thereto. Conversely, as may be perceived from the Figures that an outwardly pulling upon the brush shaft 25 compresses appendage 25MA & 25MB sufficiently to unseat the male ribbed section 25R from female recessed section 26R.

Unlike conventional brushes, the rotating brush rollers 20A, 20B & 27 are free standing of a cantilevered structure supported only at one shaft end by the coupling gear shaft 26 which is rotationally axled onto gears 34A, 34B & 34C. This cantilevered structure necessitates extra precautions so as to fortify the weight bearing rigidity and strength of the open-ended, free standing gear shafts 26. Structural support for each of the free standing brush shafts 25 is accordingly provided by paired supportive shaft bearings 34B seated within the journal boxes 34U which may be structurally molded directly into the molded gear box housing 8.

Each of the three outwardly extending gear drive shafts 26 of gears 34A, 34B & 34C rotationally drive each of the corresponding brush shafts 25 for brushes 20A, 20B & 27. The leading and trailing sections of gear drive shafts 26 include axles 26L & 26X adjacently positioned to gears 34A, 34B & 34C. Shaft axles 26L & 26X are rotationally stabilized by axle bearing 26B (e.g. brass, ball or roller, antifriction, etc. preferably of a sealed self-lubricating type) housed within a bearing seat 26U which may be pressed, molded or otherwise affixed are secured to the molded gear housing 35. Such factors contribute to a secure and rigidly supported cantilevered gear shaft 26 having a stabilizing bearing support on both gearing sides of their respective gears 34A, 34B & 34C.

Figure 16:
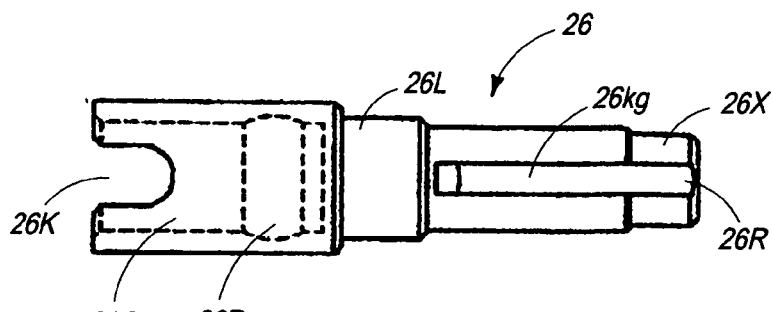
FIG. 16 is a top view of a gear shaft equipped with a female coupler for an on-site quick attachment with phantom lines defining the hollowed female chamber of the coupler.
Figure 17:
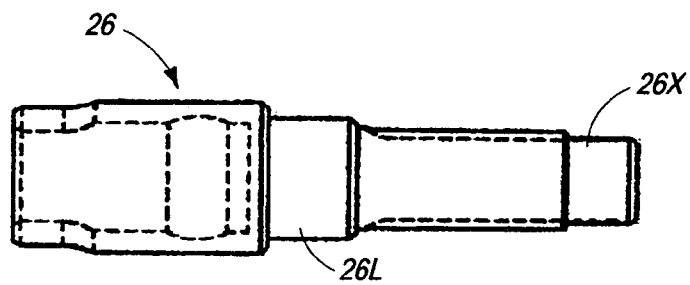
FIG. 17 is a top view of FIG. 16.
Figure 18:
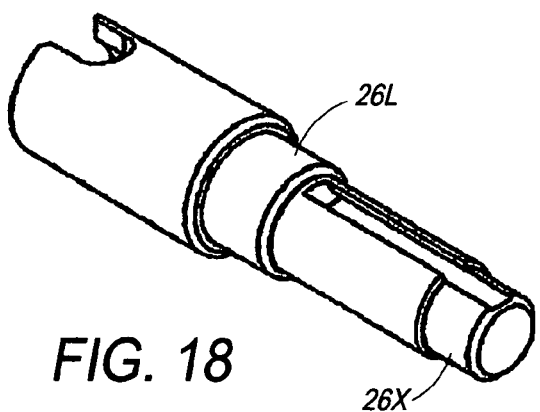
FIG. 18 is an isometric rear side view of FIG. 16.
Figure 19:
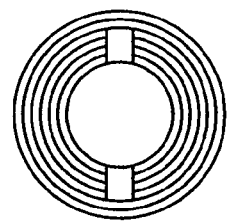
FIG. 19 depicts an end view of the axle shaft of FIG. 18.
Figure 20:
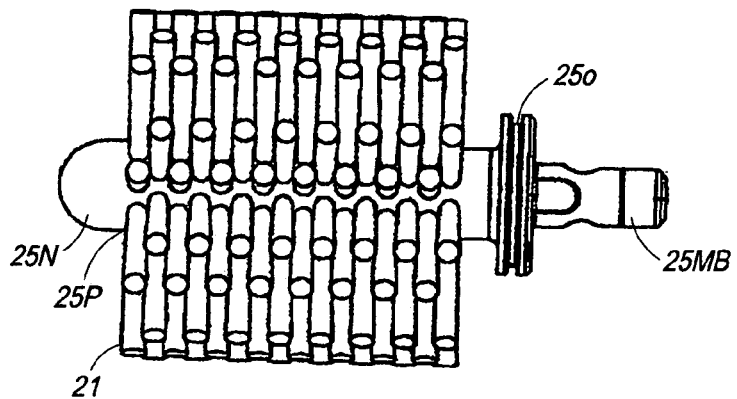
FIG. 20 is an isometric top view of an upper brush showing the male coupler positioned in a coupling position.
Figure 21:
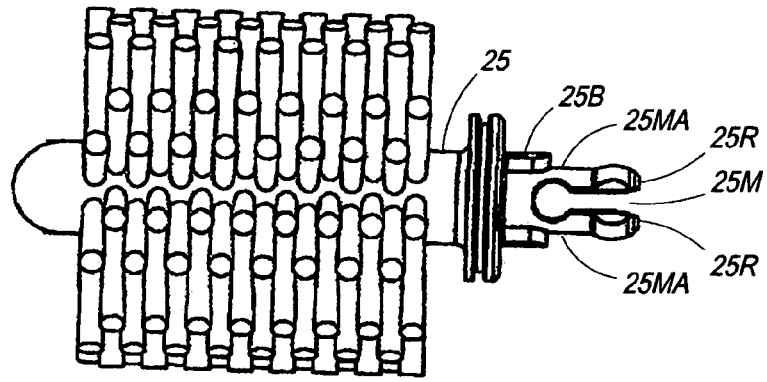
FIG. 21 is an isometric view of FIG. 20 illustrating the male coupler in the uncoupled position.
Figure 22:
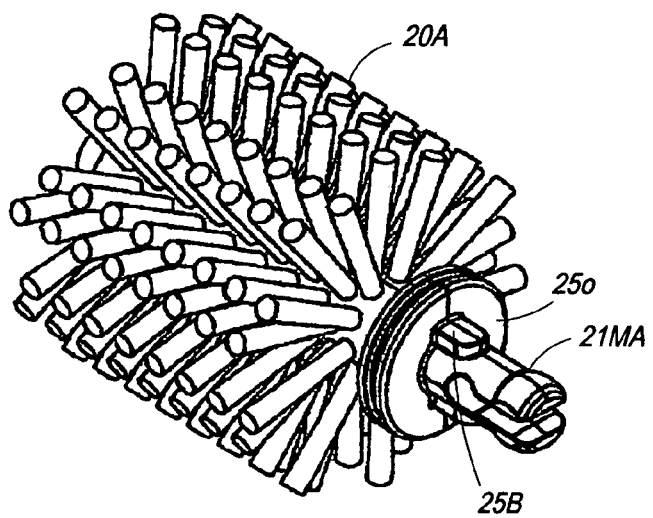
FIG. 22 is a rear side view of an isometric drawing of FIG. 21.
Figure 23:
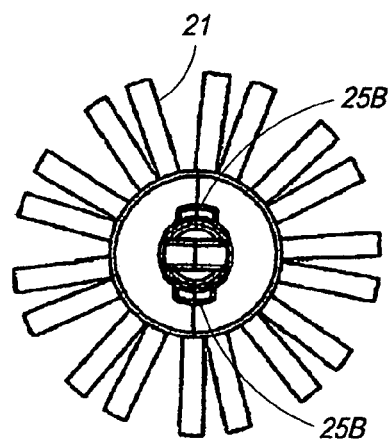
FIG. 23 is an isometric rear view of FIG. 22.

With particular reference to FIGS. 5, 6A, 7 and 14, the gear driven shafts 26 for driving brushes 20A, 20B & 27 are depicted as being seated onto bearing supports 34U positioned on both the leading and trailing sides of each of the brush drive gears 34A, 34B &34C. This arrangement provides a highly sturdy cantilevered support to the gear drive shaft 26 which in turn structurally supports the coupled cantilevered rotating brushes 20A, 20B & 27. The coupling gear shaft 26 depicted by FIGS. 16-18 show shaft axles 26L & 26X being rotationally seated by gear shaft bearings 34o on both sides of each gear. Placement of fixed shaft bearings 34o and shaft axles 26L & 26X juxtapositional to each of the brush drive gears 34A, 34B & 34C provides a solid rotating gear shaft structure capable of supporting the horizontally positioned, cantilevered brushes 20A, 20B & 27. As may be further observed from FIGS. 16 and 18, the gear shaft 26 is provided with a key slot 26KG for keying gears 34A, 34B & 34C to their respective shafts 26.

In the FIGS. 5, 7-9 and 14 gear assembly depicting the dimensional sizes, gear ratios, and positioning of each gear shaft 26 within the gear assembly 34 contributes toward the proper rotational positioning for brushes 20A, 20B & 27 as well as further contributing to the desired variable brush speed when connected to the variable power drive source 33. The gears 34A, 34B & 34C may be of any durable gear construction such as those plastic gears (e.g. nylon, polycarbonate, etc.) commonly used in other gear construction as well as the metallic gears such as steel, bronze alloy, aluminum etc. possessing sufficient strength and durability for gear use.

Figure 13:
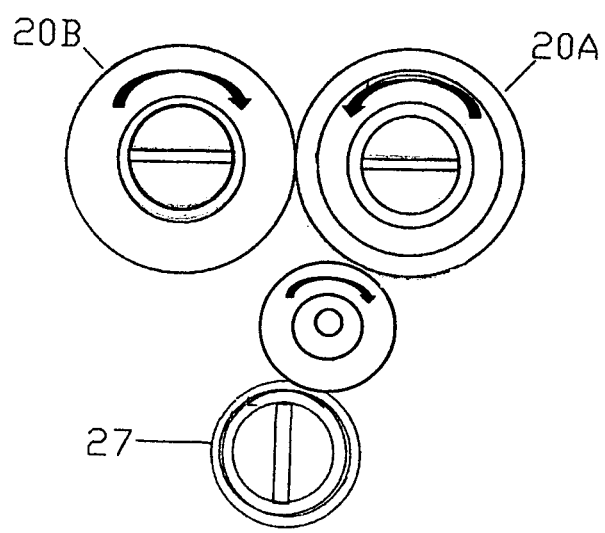
FIG. 13 depicts a rotation pattern of the gears driving the brushes depicted in FIG. 9.
Figure 14:
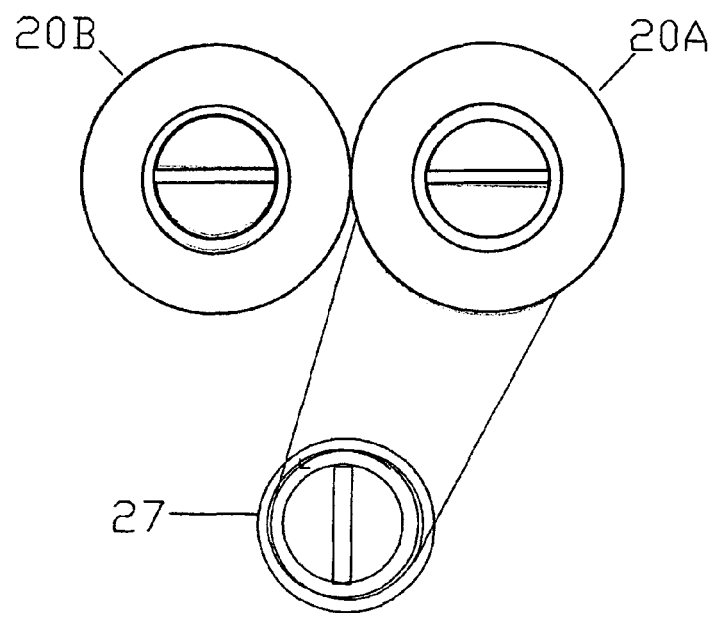
FIG. 14 depicts a frontal view of an alternative belt driven brush assembly.
Figure 15:
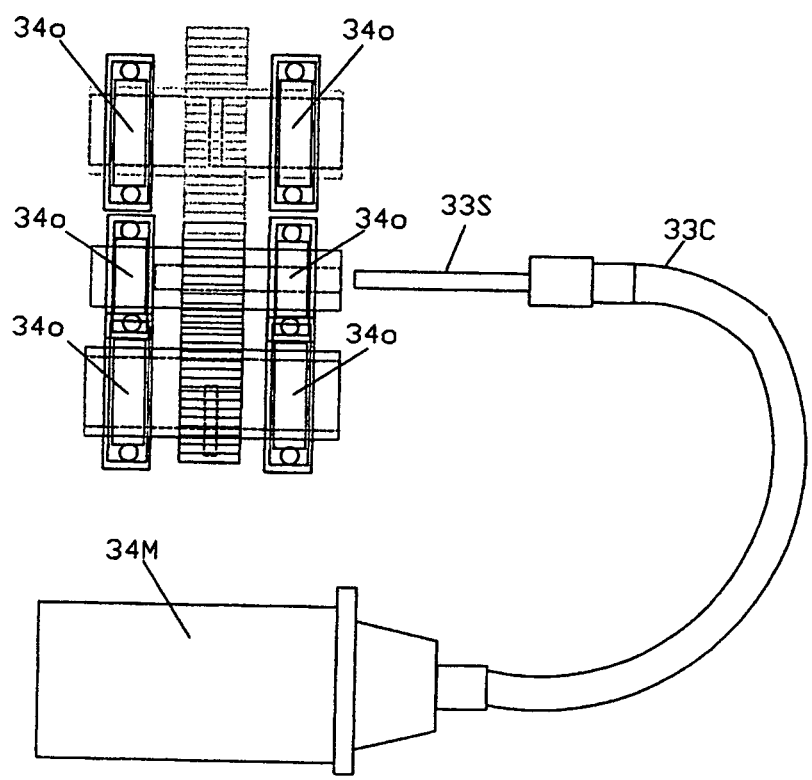
FIG. 15 is an upper view of the gear assembly showing gears and gear shafts equipped with fixed shaft roller bearings, a preceding and trailing axle on each of the shaft gears to provide free standing support to the brush shafts driven by the depicted flexible cable and a power source.

The drive gears 34A, 34B & 34C may be driven in any suitable manner which counter drives upper brushes 20A & 20B. FIGS. 13-15 depict different drive gear patterns for driving the brush drive gears 34A, 34B & 34C. The depicted patterns include directly applying rotational power 33 to the lower brush gear 34C to drive gears 34A & 34B, a separate drive gear 34 for driving the brush gears (34A, 34B & 34C) and another alternative of a belt linking the lower brush gear 34C and upper brush gear 34C to drive gear upper brush gear 34A. Other gear driving means creating the desired operational counter rotational movements (e.g. rack system, rotating cylinders, etc.) may also be used. The depicted gear system allows the intermeshing brush gears 34A, 34B & 34C to provide the desired counter rotational brushing movements.

The power drive source 33 as depicted by FIG. 14 shows a flexible cable conduit 33C equipped with a rotational shaft 33S housed within the cable housing 33H which suitably provides a variable speed drive power for powering applicator 1. The cable drive 33C is appropriately powered by an external variable speed DC motor 33M. The rotational speed of variable speed motor 33M is specifically tailored for operational use by each applicator 1, each of which may also be appropriately monitored and regulated by the PLC 40. When used without a PLC computer 40 control, the rotational brush speed of the hand-held applicator 1 may alternatively be manually regulated or automatically with multiple programmable rotational changes (typically three or more) which may be altered on-site by a triggering of a desired rotational speed. Instead of the PLC 40, the monitoring and control of the diverse rotational speeds may use circuit board chips or memory boards carried by the applicator 1 or a motor speed control box 120.

The ability to accurately control brush rotational speed becomes a significant factor in operating the brushes 20A, 20B & 27 under the optimal treatment conditions for any given type of treatment. It may be advantageous for certain treatments to operate within full range of a variable 0-1000 RPM 24 volt DC brushless motor 33M illustratively operational at a 600 RPM output for teat cleaning and at 800 RPM output or higher when drying the teats under a precise operational time intervals. Unlike conventional applicators, the variable speed features of this invention allows an on-site rotational speed adjustment (especially at control room level) at any desired rotational speed for the treatment zone 3. This allows for different sequenced rotational speeds to be applied for the various different stages of treatments. It is accordingly particularly well suited for computerized controlled operation. Thus, for example the washing cycle, the drying time, etc. for any particular cow or prescribed for the herd may be varied over a desired predetermined timed sequence along with any desired and adjustable rotational speed, all of which may be monitored and controlled by a PLC 40. The motor source 33M may also be effectively monitored to prevent applicator 1 damage as well as any possible injurious teat treatment to the milk producing animal. Sensor devices sensing motor excessive amperage input or output increases operatively connected to a PLC 40 may be utilized to monitor and immediately stop the brushing action and motor 33M via a computer 40 activated power stoppage (e.g. power source 33) of the rotating brushes 20A, 20B & 27 thus preventing any further damage and injury. Other variable speed power drive sources 33 such as pneumatically or hydraulically driven motors, internally housed variable electric speed motors etc. may also serve as a power source 33 to drive applicator 1. Such other power sources may be regulated by a PLC 40.

An illustrative drive cable 33S and gear assembly 34 may be a flex twist drive of max torque equal to 84 Dz. serving to drive a 12 teeth, 1.15 inch diameter drive gear 34A driven at 875-2100 RPM which in turn gears onto a bottom brush gear 34B (13 teeth, 1.5 inch diameter) driven at 780-1890 RPM and a right top brush speed gear 34C (21 teeth, 1.925 inch pitch diameter) driven at 500-1700 RPM driving right top brush shaft 25 and a mating left top brush shaft (of the same specifications) at the same counter-rotational speeds. The gear assembly 34 is completely encased and sealed within a compact gear box housing 35 equipped with a gear lubricant to provide a smooth, quiet and durable gear assembly 34 adapted for prolonged continuous operational use.

The prior art applicators typically relied upon unlubricated gears purportedly to be durable, but inherently plagued with persistent gear failure and stripped gears. The conventional exposure of unprotected gears to caustic treatment solution wastes readily led to faulty stripped gears, gummed gears and shafts all of which necessitating untimely, costly and time consuming repairs. The present applicators 1 rely upon a sealed gear housing 8 and gear assembly 34 provided with a sealed gear lubricant which significantly extends gear life and provides a gear assembly 34 essentially repair free. This provides a smooth operational lubricated gear system 34 which under prolonged and continuous use even under highly strenuous milking conditions. Harmful contaminants such as chemical solutions, sand, dirt, soil, etc. are sealed effectively against gear box penetration while the lubricants are effectively remain within the gear box.

The gear assembly 34 may appropriately be housed within a separating panel 9 fitted with a box accessing gear box cover 8 (e.g. a molded durable plastic) or alternatively a combination thereof fabricated from multiple molded housing sections equipped to be bolted or otherwise secured (e.g. snap fitted together). The gear box cover 8 and separating panel 9 are depicted as having bolt receiving apertures 35T positioned about the peripheral encasement margins for mounting the gear box cover 8 onto separating panel 9 so as to provide access to the gear assembly 34. The gear box housing section 8 may be of a molded plastic construction equipped to protectively house and support the gear assembly 34. Since the present applicator 1 is effectively sealed to prevent foreign matter from coming into the gear box 34 and internally sealed to keep the desired lubricant within the gear box assembly 34, the applicator 1 provides significantly longer gear use and a smoother lubricated operation than any of the currently available applicators. Should there be a need to access the gear assembly 34, the outer housing easy gear access encasement 8 is equipped so as to provide an easy procedure to expeditiously disassemble and reassemble for repairing any worn gears or bearings.

A separating panel 9 effectively serves as a liquid sealing barrier or as supportive barrier to separate the treating zone 3 serviced by brushes 20A, 20B & 27 and the sanitizing solutions from the drive or gear assembly 34. A separating partitioning panel 9 hermetically separates or partitions the brush housing or treating section 6 of the treatment zone 3 from a gear box and drive assembly 34. Although the separating panel 9 may be eliminated by a free standing and sealed gear box assembly 34, the separating panel 9 can also effectively serve to port or structurally support other various operative components of the applicator 1. The separating panel 9 may be provided with chemical solution conduits 29C which conduct a desired treatment agent to the treatment zone 3 while also affording the gear box assembly 34 protection from external contamination. The depicted separating panel or partitioning sealing bather 9 may serve as a conductive conduit 29C pathway leading to the treatment zone 3. There is also shown brush shaft ports 28A, 28B & 28C which allow for the coupling and uncoupling of gear drive shafts 26 and brush shafts 25 features of the invention. The separating panel 9 may also serve as a convenient mount and protective sealing wall for the sealed gear box housing 8. By an appropriate redesign and reconfiguration of the gear box housing 8, it is feasible to provide a separating panel 9 having an open teat exit similar to the teat forward entryway 5. This feature would eliminate the need of teat guide 6T.

With particular reference to FIGS. 3, 6 and 8, the treatment side of the partitioning panel 9 is shown as including liquid deflecting shields (prefixed by 28) molded or otherwise fabricated for mounting onto the brush side of the partitioning panel 9. The brush shaft shields 28 are depicted in FIGS. 6 and 8 as three projecting cylindrical or silo brush shaft housings 28A, 28B & 28C within which each of the brush shaft 25 O-ring retaining rims 25o are fitted with O-rings 25s adapted to interfacially engage onto the inner cylindrical surfaces of silos 28A, 28B & 28C to effectively seal the brush shaft ports against treatment solution penetration. In FIGS. 3, 6 and 8 depiction, the deflecting shielding silos are of molded construction with the deflecting shields 28A, 28B & 28C projecting outwardly. The brush housing silos 28A, 28B & 28C are shown to penetrate outwardly about the unbristled shaft portion of brush shafts 25 towards the treatment zone 3 which positioning helps ward off the liquid solution and wastes from entering the gear assembly 34 and splashing erratically off the rotating brushes 20A, 20B & 27. This shielding protects the applicator drive assembly 34 and gear shaft 26 as well as the operator from the highly corrosive treatment solutions.

The depicted unassembled applicator 1 of FIG. 6A features several attractive alternatives to the depicted applicators 1 fitted with the male shaft coupler 26M. The FIG. 6A applicator 1 features are operatively similar to the applicator 1 features as depicted by the disassembled view of FIG. 7. Although the depicted FIGS. 1, 2 and 6A applicator 1 only depicts a prewash switch 31, it may be easily upgraded to include multiple switches 31 for other treatment such as a post wash cycle for triggering by the on-site operator. Switches 31 are rearwardly located upon gear housing 6 at a convenient position for triggering the hand-held applicator 1 by the operator. Incoming electrical lines 33E, power drive cable 33C and chemical solution conduits 29C are protectively housed within the goose neck handle 38 which couples onto the gear assembly housing 34 via cable housing connecter 33HC. The sealed gear assembly 34 includes a single piece molded gear housing 8. The separating bather 9 for the gear assembly 34 is integrally molded part to the treatment zone housing 6. The FIG. 6A applicator 1 (as mentioned above) as features readily replaceable coupling and uncoupling brushes 20A, 20B & 27 embodying a different coupling design. The gear shaft 26 includes a gear shaft bushing 34BU which seats against the three forwardly positioned sealed roller bearings 34o bearing onto forward gear axle 26L forming a hermetic seal when the treating housing section 6 is drawn tightly onto the gearing assembly housing 8. The porting brush shaft ports 28A, 28B & 28C are thus effectively sealed against chemical solution penetration.

The partitioning panel 9 of the FIGS. 1, 2 and 6 applicator 1 comprises a molded part of the treatment zone housing 6. The partitioning panel 9 includes brush shaft porting recessed silos 28 for each brush shaft 25. Silo port gasket GS gasketing against each gear bushing 26Bu creates a highly effective gear assembly seal when the treatment housing 6 is bolted tightly onto the gear assembly housing 8. A main assembly gasket 34G wedged between the assembled treatment zone housing 6 and gear box housing 8 seals a lubricating oil within the gear box assembly 34.

The terminal circuit strip 31Z shown in FIG. 6A provides multiple electrically circuit switches 31 for forward switching to the PLC 40 to provide the desired PLC directed operative treatment conditions to the treatment zone 3 upon the triggering of the desired type of treatment by the operator. The goose neck assembly handle 38, treatment zone housing 6 and gear assembly housing 8 along with a main rear bolt fastening plate 34z are bolted together with nutted bolts BN via bolting aperture BA to provide an assembled applicator 1 as depicted by FIGS. 1 and 2. Upon closure of applicator encasement, the rear bearing retaining plate 34P with rear bearing retaining sockets 34Q seats the sealed roller bearings 34o onto the rear axle 26X. It may also be observed that each nutted bolt includes a bolt jacketing gasket BG to further protect the internal workings of the applicator 1. Except as indicated, the basic operational components of the FIGS. 1, 2 and 6A applicator 1 are similar in operational use embodying the important aspects of the invention. Other alternative versions of the applicator 1 operationally functioning in essentially the same manner to produce the comparable results may also be used herein.

The flexible cable drive 33C and the treatment agent solution supply 29 may be provided upon triggering signal by the milking operator transmitted to a master control center 40 which upon receipt of the triggering signal transmits a directive command signal to the applicator 1 for applying a desired predetermined treatment under the directive PLC 40 control. The system may include electrical lines 33E to receive and transmit signals to the PLC 40 and transmit the commands of the PLC 40 to the various operative components of the integrated system. The triggering and signaling by the applicator 1 and the PLC 40 may be conducted remotely using conventional remote sending and receiving units which upon receiving an appropriate or desired triggering indicia by the on-site milking operator activates the master control center or PLC 40. The master control center 40 upon receipt of the triggering signal transmits an electronic command for the precise conduct of the applicator 1 treatment except the manual manipulations conducted by the hand-held applicator 1. Such a set-up allows a herd manager or owner to control the treatment conditions and remotely and routinely follow the milking operation with a smart phone or any other suitable electronic means. Remote operation may include web services and virtual private networking.

The applicator 1 may include an internal power drive source such as a variable speed electric motor, a pneumatic or hydraulic drive motor for power which is less desirable because of added weight and bulk. Supplying the power drive 33S from an external power source such as a variable speed 24 volt DC brushless motor 33M however serves as a highly effective power source for the applicator 1. Besides reducing the weight, this also alleviates the need to service an internal power source while also providing an extremely durable, dependable, external variable power source 33M which may be monitored and controlled by the master control center 40.

FIG. 40 is a block diagram depicting the schematic arrangement of the applicator 1 with the power source 33 and the chemical solution source 29, and their relationship to the PLC 40. Each treatment is shown as being monitored and controlled by the PLC 40 for use by the applicator 1 within the treatment zone 3. The unique use of a PLC 40 to monitor and control the chemical solutions 29, the power source 33 and the use of the applicator 1 within high efficacy treatment zone 3 are factors which independently and collectively distinguish the current applicator 1 and its combined use from all others prior applicators in the treatment of milk producing animals. This feature when combined with the unique attributes of the applicator 1 to horizontally receive and manipulatively treat the teats in horizontal movements within the treating zone 3 provides significant technological and sanitation benefits to the milk producing industry. This results in greatly enhanced efficacy in individual cow herd monitoring and regulation, cleaning and sanitization (e.g. mastitis control) etc. heretofore not feasible by the prior art.

With reference to FIG. 41, the servicing of multiple applicators 1 with variable drive power and chemical solution dispensing terminal for each applicator 1 may be effectively drive by rotational power from a motor control box 120 adapted to serve two adjacently positioned applicators 1 and a chemical solution valve control box 130 (servicing up to four applicators 1 with each chemical conduits 29C leading separately to each applicator 1 teeing onto a separate drive cable 33C leading to the four applicators 1). Boxes 120 & 130 may be suspended from a trolley track (not shown) at the milking sites. The variable speed drive box 120 is operationally connected to an external power electrical source 33E which powers 24 DC volt variable speed motors 33M operated at a maximum of 10 amperage. Since it is desirable to individually control the operation of each applicator 1 to meet the individual requirements of each applicators 1, each applicator 1 may be suitable provided with an individualized 24 DC motor 33M powering separate drive cables 33C for driving the gear assemble 34 for each applicator 1. The variable speed control motor box 120 and the chemical solution valve control box 130 may include adjustable straps allowing the operator to adjust each at an appropriate height for on-site use at. As depicted by FIG. 41, the variable speed control box 120 may appropriately include inputting and outputting electrical wiring for operational use of the applicator 1 including power lines for powering a variable speed motor 33M with a flexible power cable 33C running from the variable speed box 120 to the applicator 1 for driving brushes 20A, 20B & 27 at a desired rotational speed along with those communicating electrical lines 33E operationally interconnected to the PLC 40. The chemical solution valve control box 130 may be fitted with electronically controlled positive pressure valves and chemical solution input and output conduits 29C in fluid communication with the chemical source or sources 29, and the electrical wiring or relays for the monitoring and control of the applicators 1 by the PLC 40. The appropriate chemical solution out-put lines may be combined together for each applicator in a common feed cable housed together with the power cable 33C. The variable speed box 120 includes the necessary operational switches for switching the motors 33M off or on as well as the DC power supply to vary the rotational speed of the rotating brushes 20A, 20B & 27.

A common chemical solution conduit 29C supplying chemical solutions from multiple chemical treatment sources 29 may provide the chemical servicing for each of the applicators 1. The single applicator 1 treatment conduit 29C deriving solutions from multiple sources may be appropriately combined in a single conduit along with the applicator flexible cable drive 33C and the communicating electrical wiring needed for the operational use of the applicator 1. Should it be desirable to limit the feed conduits 29C feeding onto the applicator 1 to a single feed conduit, a water and air pressure purging system may be effectively employed to purge residuals from the single line conduit 29C before another different chemical treating solution is introduced into the conduit 29C. By placing the variable speed motor 33M and the chemical source 29 regulating valves in their respective control boxes 120 & 130, multiple input chemical solution conduits 29C may be fed into chemical solution valve control box 130 with a single chemical solution conduit 29C leading therefrom to each applicator 1. The systems control boxes 120 & 130 allow each individual milking stations to individually apply the most appropriate treatment (e.g. brush speed and chemical solution requirements) to the treatment zone 3. The valve system within the chemical solution control box 130 may include electrically controlled valves at a terminating end of each of the multiple conduit lines 29C juncturing onto a common single chemical solution conduit 29C operatively communicating onto each of the applicators 1.

The PLC 40 is capable upon receipt of a triggering signal initiated by (e.g. an on-site operator) initiate and transmit and operational signal for a specific or precise treatment required by any specific cow presented at the milking station. These milking station treatments may involve pre-milking udder and teat washing, sanitation, teat stimulation, pre-milking, drying and such other commonly administered (e.g. post-milking treatment such as iodine treatment) milking treatment and other less common dairy herd treatments such as for hoof treatment, cleaning and applying insecticides to animal tail bones and backbones etc. Such uncommon applicator treatments are now feasible because of the open treatment zone 3 structure of brushes 20A, 20B & 27 are uniquely designed to provide an open top side entryway 4 and an open forwardly entryway 5. All of these treatments may be applied by each applicator 1 and if desired under the supervisory direction and control of the master control center 40 or alternatively under manual control by the milking operator.

FIGS. 25-29, depict several chemical solution sources 29 adaptable for use in the treatment zone 3 the preparation of which may appropriately managed under the control and monitoring of a master control center 40. Many of the monitoring, sensing and control systems and associated equipment disclosed by FIGS. 25-29 may also be directly implemented to those milking operations which start with premix chemical concentrate needing only aqueous dilution at the appropriate concentration to place the treating chemical solutions in a suitable form for the treatment conducted at the treatment zone 3. Thus, many of those monitoring control and sensing systems and the associated equipment as used to prepare chemical solutions using the raw chemical reactants may also be applied to the chemical solutions of a desired concentration prepared from a chemical concentrate premix. For example diluting the chemical concentrate to the appropriate chemical concentration, monitoring the concentration pressure and temperature, monitoring and controlling valving, chemical solution timed sequences generally applicable to chemical solution source supply in the operation monitoring and control systems of FIGS. 25-29 as can be applied to the preparation thereof. Accordingly, starting with the pre-wash chemical concentrate, those same systems disclosed in FIG. 25 may also be used to prepare a chemical solution at a proper concentration as well as the other important solution application conditions for the deliver thereof to the treatment zone 3 applies to the premix chemical concentration use.

Figure 25:
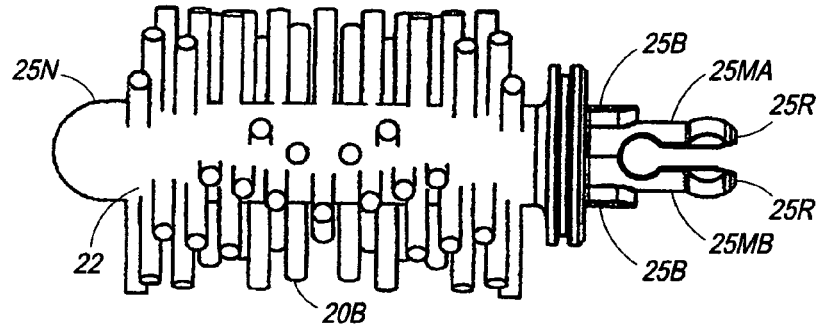
FIG. 25 is a side view of FIG. 24 showing the male coupler in the unlatched position.
Figure 26:
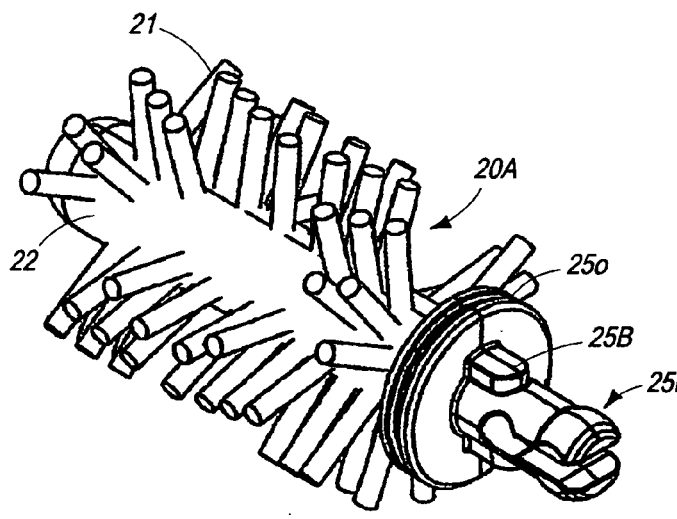
FIG. 26 is a frontal side view of FIG. 25.
Figure 27:
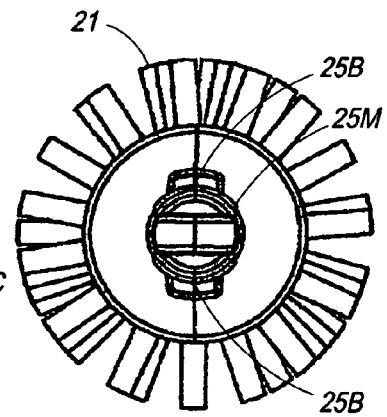
FIG. 27 is an end view of FIG. 26.

FIG. 25, depicts a flow sheet illustrating the equipment and conditions used in the preparation of the hypochlorite wash solution 29 at the milking operation for use by applicators 1. FIG. 26, similarly depicts the post dip solution preparation flow sheet while FIG. 27 discloses an equipment flow sheet for the preparation and control of a hoof dip for application by the applicator 1. Since the sanitizing halogens (e.g. chlorine and iodine) are reactive with water borne minerals, a water softener 50 serves to soften and demineralize the water supply. In each of the post dip and pre-wash preparations, a water pressure regulator 52 and water flow meter 53 in combination with an in-line manifold 54 are monitored and controlled by the master control center 40. Both the pre and post solution preparations are depicted as having an in-line tee adapter 55 splitting the softened water into a preheated hot water line passing through an in-line heater 56 which then admixes and tees onto the unheated water line at temperature control mixing valve 57 which is also monitored and controlled by the master control panel 40.

With respect to FIG. 25 it will be observed a regulated portion of the softened water splits at tee 55A with one softened water portion being preheated and another portion passing onto a patio brine unit 59 which is connected onto a sodium product feed source 61 for admixing in the brine unit 59. The patio brine 59 is then pumped onto chlorine sanitizer tank 63 equipped with a tank low sensor 65. An in-line chemical pump 67 pumps the chlorinated solution concentrate through a chemical flow meter 69 which meters the appropriate sanitizing concentrate for admixing with heated water at mixing tee 55M. Check valve 71 serves to prevent any back pressure of heated water from entering onto the chlorinated solutions concentrate line. With reference to FIG. 26, the preheated softened water system for the post dip solution is identical to that used in FIG. 25. The post concentrate tank 73 serves for admixing with the heated water at mixing tee 55M.

Within the dairy herd milking operations, there also exists a need to determine which chemical treatment should be provided, the chemical type and concentration of the particular chemical solutions to be applied, the temperature of chemical solutions as applied for the desired treatment, the rotational speed of the brushes, the duration of brush treatment and the particular type of brush to be used at the treatment site etc. In essence how these various treatments can be administered to each cow, the conditions existing at the milking site, the udder and teat conditions of each cow presented for milking and a host of other considerations can be uniquely monitored and controlled by a PLC 40. In a large milking dairy herd, it becomes virtually impossible for an on-site operator to know and manually apply the precise treatment required by each cow.

The present system affords a monitored and regulated system wherein the entire chemical treatment may be controlled, regulated and administered under predetermined operational conditions, instituted and controlled by the master control center 40. The master control center 40 may accordingly administer an appropriate amount of chlorine dioxide (e.g. $ClO_2$) such as in a precursor form of a halogen metal salt (e.g. a sodium chloride) and an acidic activator (e.g. citric acid) admixed or as a premix sanitizing concentrate (e.g. chlorine dioxide) diluted with the appropriate amount of water to provide the desired chemical solution concentration. The chemical precursor sources and the desired concentration may be suitably monitored by sensors communicating to the master control center 40 which monitors and activates the precursor sources to administer the appropriate level of precursors to the system and thereby to provide the desired chemical concentration. In the case of premixed concentrate for use as a prewash system of FIG. 25, the premixed concentrate may be placed in premix tank 63 with the water supply flowing from water softener 51 to its mixing juncture 55M thus mixing together the premixed concentrate and water together to provide the desired teat wash solution 29C in which the predetermined and precise chemical concentrations, solution temperature, solution psi, chemical solution valving, etc. to each applicator 1 may be precisely monitored and controlled in the same manner.

A plumbing system for delivering a hoof dip for treating animals hoofs as is depicted by FIG. 26 includes an air pressure source 81 leading onto a purging air regulating valve 83 which connects onto tee 85 supplying an incoming water supply passing through water flow meter 53 through hoof dip water check valve 87 onto the water and purging air tee 85. The pressured units communicates onto air or water and hoof dip tee 85 for in-line treatment with a port valve 83 which regulates the amount of hoof dip to be delivered. Similarly the hoof dip concentrate contained in tank 91 supply is provided with a chemical pump 67, a chemical concentration flow meter 69 and check valve 71 before it tees at tee 89.

As may be further observed from FIGS. 25 and 26, the chlorine wash solution sanitizing holding tank 63 and the post dip concentrate holding tank 73 are connected to an in-line pump 67, a chemical solution flow meter 69 (monitored and regulated by the PC 40) and a check valve 71 to assure the appropriate concentration for the wash and post dip are achieved at their respective inter-mixing at the final mixing tees 55M. The depicted systems of in FIG. 41 is adapted to service four or more applicators 1 operating off multiple chemical solution sources 29 provided at a desired predetermined monitored pressure and temperature all of which may be suitably controlled by a centralized personal computer 40. The cooling, plumbing and equipment sanitizing system depicted in FIGS. 27 and 29 may likewise be monitored and regulated with a personal computer 40 programmed to receive and transmit the necessary equipment and regulatory commands to provide desired aqueous treatment temperature.

The complex on-site chemical reaction systems as exemplified by FIGS. 25-29 may simplified by providing a sanitizing premix concentrate metered with the appropriate amount of demineralized water under computerized regulated valves and sensing devices adapted to provide a desired sanitizing solution 29 delivered in a condition suitable for use at the treatment zone 3. Accordingly, many of computerized monitoring and control features used in the preparation of the sanitizing chemical solutions 29 from raw materials are also equally applicable to a dairy milking operation starting with a sanitizing premix concentrate. Other desired chemical solution attributes may be appropriately delivered to the treatment zone 3 such as the chemical solution temperature, the chemical solution pressure, the chemical solution concentration, the treatment solution type, the spray application duration, etc. all of which may be monitored and controlled in the same manner as applied to the chemical solution preparation of FIGS. 25-29.

In applying a premix concentrate the supportive system may appropriately include one or more remote chemical solution sources (29) operatively associated with a chemical concentration premix and a water source for externally providing chemicals solutions at the appropriate concentration pressure and amounts to the treatment zone 3. One or more chemical sources (e.g. chemical mixing tanks for the various different types of chemicals as needed for the different type of treatments) regulated by the master control center 40 can be effectively administered and dispensed to a multiplicity of applicators 1. The wash solution may be conventionally provided at any desired concentration, any desired solution temperature and spray pressure. Any sanitizing concentrate premix may be diluted to the desired sanitizing concentration. The tap water source is passed through a water softener 51 to provide a demineralized water source. Sufficient softened water and precursors are mixed together to provide a desired chemical solution concentration. Metered amounts of premix concentration and softened water may conducted through an in-line heater 56 equipped with thermal sensors 57 for sensing the solution to temperature and chemical solution concentration. An in-line pressure sensing sensor 60 in combination with an in-line manifold 61 (heretofore unused by the prior art) maintains equalized pressures and chemical solution concentrations when applied at multiple milking stations fed by a common source. A monitored and regulated supply of aqueous sanitizing solution may be accordingly be delivered to each of the applicators 1 at a desired regulated pressure, appropriate temperature and concentrations for treatment at regulated rotational brush speeds all of which operations may be initiated upon by an operator triggering the desired applicator action by a milking operator at the milking station. The system appropriately includes an in-line heating element which insures the chemical solutions will be delivered to the treatment zone 3 at a proper or desired solution temperature for effective pre-milking treatment. As illustrated by FIG. 25, thermally controlled chemical solution application may be effectively accomplished by primarily providing an in-line heating of the main water source.

Unlike conventional hand-held applicators systems which are unable to successfully regulate the atomization or injection pressures at the milking site, the milking treatment system herein allows for at least a two fold increase in the number of applicators 1 which now may be effectively handled using a single chemical source line. Since existing systems are costly, the ability to handle multiple applications from a single supply system at constant pressure represents a substantial saving to the milk producers. The present applicator 1 system may appropriately include in-line pressure sensors 60 and a pressurized chemical source 29 uniquely passing through an in-line manifold 61 with multiple outlets to insure that a desired predetermined ejection pressure is administered by each applicator 1 at each multiple milking site.

The in-line manifold 61 may be appropriately positioned in an in-line monitored and controlled system to facilitate maintenance of a desired pressure as applied by each applicator 1 at each treatment zone 3. The prior art applicators were prone to widely variable pressured surges and sudden pressure drops when more than two applicators were operationally connected to a common chemical solution pressure source 29. In the absence of adequate injection pressure control, it is difficult (if not impossible) to administer a quantified amount of chemical solution as needed for effective selective teat treatment at each milking site. Imprecise chemical treatment pressures reflects adversely in the actual amount of chemicals applied in the chemical treatment, often leading to insufficient disinfecting levels and herd infection. This can create the precise problems which plagued conventional hand-held applicators leading to inadequate sanitation, herd bacterial contamination, sickness, milk production losses and an occasional costly dumping of contaminated milk.

As may also be observed from the Figures and the drawings, each applicator 1 may be appropriately driven by a variable power drive source 33 which may appropriately be driven by a suitable power source (e.g. a pneumatic or elective power source). The variable drive power source 33 may be powered by a variable speed motor 33M driven by flexible cables 33C operatively connected to the gear drive assembly 34 of the applicator 1 to rotationally drive brushes 20A, 20B & 27 at a desired and monitored rotational speed. The ability to provide a variable speed power drive source 33 allows each applicator 1 within the milking operation to adjust the rotational speed of the brushes 20A, 20B & 27 to fit the treatment for a particular animal or conditions of treatment. Under certain conditions, a higher rotational speed (e.g. excessively dirty teats, teat drying, etc.) may be most appropriate. Similarly, other treatments require a less strenuous brushing action. The rotational speed may be manually controlled as well as the other on-site operative conditions such as brushing time, type of treatment, etc. by the milking site. As indicated, the applicator 1 may be provided with multiple triggering indices 31 indicative of the particular type of treatment to be applied by the applicator 1 or programmed to the applicators 1 or by the master control center 40 as desirably to be applied at the treatment zone 3. This allows the milking manger via appropriate programming of the master control center 40 to monitor and control all aspects of the treatment conducted within the treatment zone 3.

The applicator 1 and PLC 40 system can also be effectively utilized to insure herd health and that any sick or infected cow may be timely identified and properly treated at the milking station. Dairy cows may be tagged with electronic chips (not shown) which are identifiable data based by the master control center 40 and appropriately programmed to identify each cow. This in turn allows the PLC 40 equipped with the appropriate tracking sensors to track the milking record and other important factors relating to each cow which may be stored and retrieved from the computer 40 database. Currently there does not exist any timely system to identify sickly cows when presented for milking. Often feed grains and other desirable cow feeds are fed to the cows at the milking station which presents an inducement even for sickly cows to pass through the milking station or healthy cows to attempt multiple passes. Identifying sickly cows under normal protocol is expensive and untimely. The normal procedure typically entails calling an often unavailable veterinarian which involves transit and examination time plus any other time delays such as blood test, laboratory testing, etc. The present applicator system 1 monitored and controlled by the master control center 40 allows an on-site operator to be preemptively be notified (e.g. on-site monitor) that a potentially sick cow has presented itself for milking. This allows the on-site operator to accordingly undertake the most appropriate course of action (e.g. not milk) for the identified sick cow. Certain data based factors which are relayed, programmed and processed by the master control center 40 can provide a warning signal that a sick cow had entered the milking site. Healthy cows eat substantially more forage than sick cows with each chew by the eating cow creating an identifiable ear twitch. By placement of a tracking identification tag or chip in each cow ear, a record of a number of cow chews and twitching may be transmitted to the computer 40 and computed by the database software to determine whether or not the presented cow is healthy and has been eating properly. A database record can thereby be effectively used to notify the milking station as to whether the eating habits of each cow are healthy or not. Such data may serve as an early forewarning allowing the dairy managers to undertake the preemptive steps to protect the sick cow as well as the milking herd. Also, unhealthy cows penned in free standing facilities are prone to lie down or rest more frequently than healthy cows. Such sensory data may also be appropriately transmitted to the computer 40 for analysis and databased storage. Thirdly, temperature sensors may be incorporated into the identification tags or chips whereby data may also be transmitted to the computer 40 and recorded in the data bank for future action. With these host of programmable data based features into the computer software 40, the applicator 1 as uniquely used herein at the milking station provides a highly effective management control tool allowing whatever action needs to be undertaken by the manager or on-site operator for any particular cow being presented for milking and the ability to undertake the proper treatment for that cow. To effectuate this purpose the applicator 1 may be equipped with a signaling or messaging menu or monitor instructing the on-site milking operator as to what action needs to be taken. This may involve treating the cow with antibiotics, seeking veterinary assistance or simply not milking the cow.

Because of the unique design of the applicator 1 and its forwardly and top side teat entryway to the treatment zone 3, the applicator 1 may also be used for treatments applied to other animal areas or parts generally inaccessible to treatment by conventional vertical dip hand-held applicators. The open treating zone structure of the applicator 1 lends itself to effective treatment with disinfectants, insecticides, etc. to various other animal body parts such as legs, backbone, teal and split or toed hoofs of animals.

In operational use of applicator 1, the on-site operator at the milking site will typically indicate by triggering the particular type of treatment to be initiated at the treatment zone 3. Upon receipt of a transmitted signal, the master control center 40 equipped with the appropriate sensing, monitoring, regulating, input and output signaling takes over the entire treatment to be conducted within the treatment zone 3, except that the operator of the hand-held applicator 1 must necessarily conduct the physical movement or manipulation (e.g. manual teat treating movements) to effectuate the manual treatment thereof. The master control center 40 equipped with the appropriate programmed software effectively replaces all of the subjective judgment with objective teat management standards as monitored and controlled by the programmed master control center 40.

Figure 28:
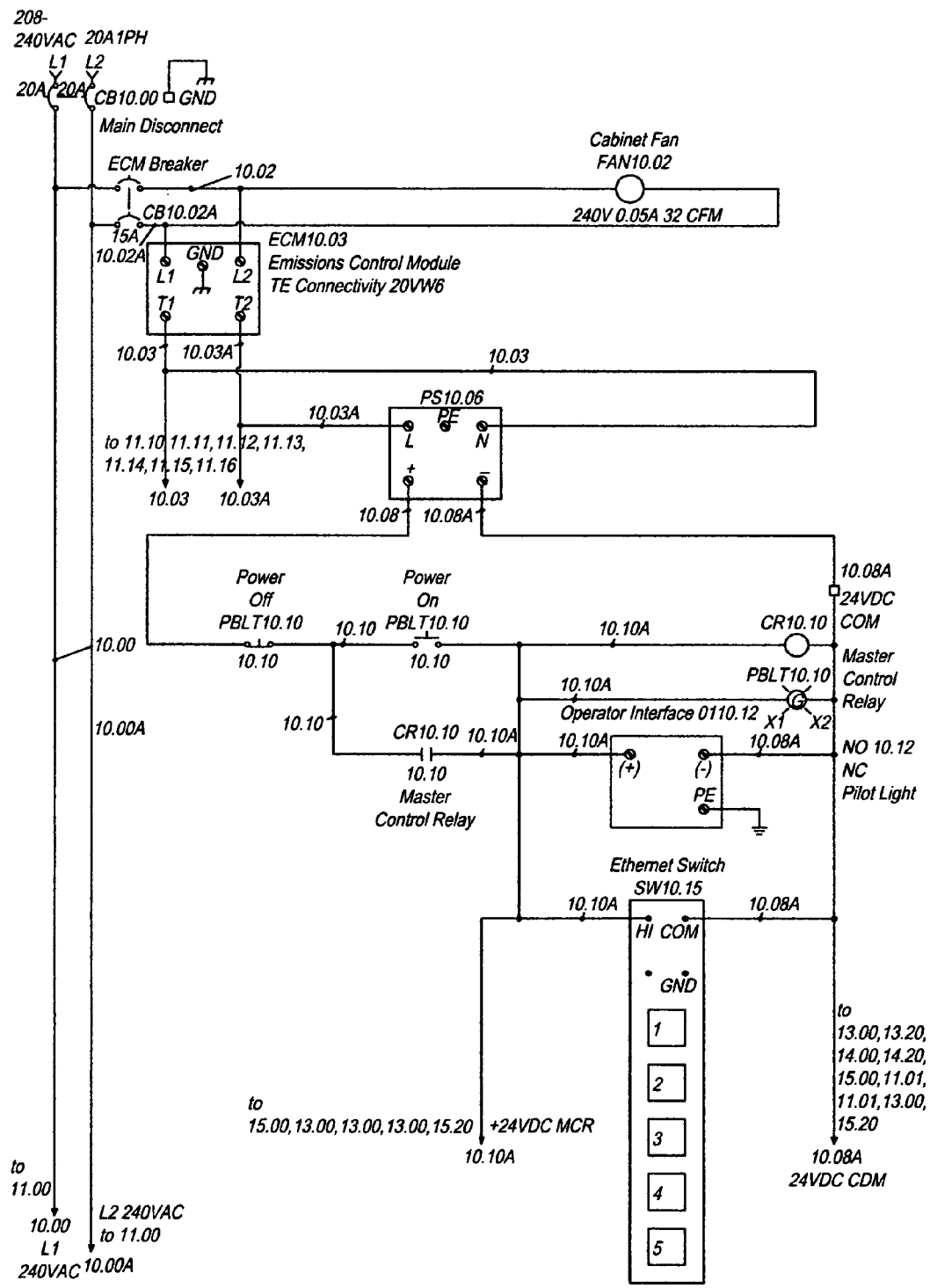
FIG. 28 is a schematic circuitry drawing depicting the power and start circuitry control for the system showing the incoming and outgoing transmissions of the circuitry.

FIGS. 28-34D inclusively depict the electronic circuitry for the overall interrelationship of a monitored and controlled applicator system (e.g. teat treatment) wherein a master control center essentially monitors and controls the entire operation upon commencement of the operation upon a triggering or switching of the applicator at the operational site. The depicted circuitry of FIGS. 28-34D inclusively provide a numerical indexing inclusive to those computerized operations listed under the 10.00, 11.00, 13.00, 14.00 15.00, 16.00 and 17.00 sequences as cross-referenced to their respective interconnection points as shown in the Figures. As may be observed the 10.00 series pertains to the power and start circuitry; the 11.00 series to heater, pump, field connection, brush control of brush number one; the 12.00 series to brush control (brushes 2, 3, 4); the 13.00 series to PLC input; the 14.00 series to PLC output; the 15.00 series to the PLC analog input/output; the 16.00 series to the PLC thermocouple, the 17.00 series to field terminations and the 18.00 series to the panel conversion wiring. With particularly reference to FIG. 28, the system is depicted as being designed for operational use using a low voltage and high amperage variable speed DC motor. As indicated by FIG. 28 circuitry 200-240 VAC power supply is converted to 24 volt variable speed DC motor with a 10 amperage max wherein the operationally variable speed of which controlled and monitored by a master control center 40 (e.g. PLC). Each brush rotating motor current (amps) is monitored by the master control 40. In the case of a brush motor overload, (e.g. obstruction in brushes) the motor rotation is halted and a fault lamp is illuminated. Brush operation can resume after the brush obstruction has been removed. The power supply 33 as illustrated by FIGS. 28-34, handles up to four applicators 1 each of which includes independent triggering or switching for the type of treatment (e.g. prewash, post dipping, etc.) with the master control 40 undertaking all of the operational application functions and conditions (e.g. chemical injections, brush speeds, duration, etc.) for each applicator 1 except for manual manipulation once the triggering mode has been initiated by switching of the applicator 1 indicated.

Figure 29:
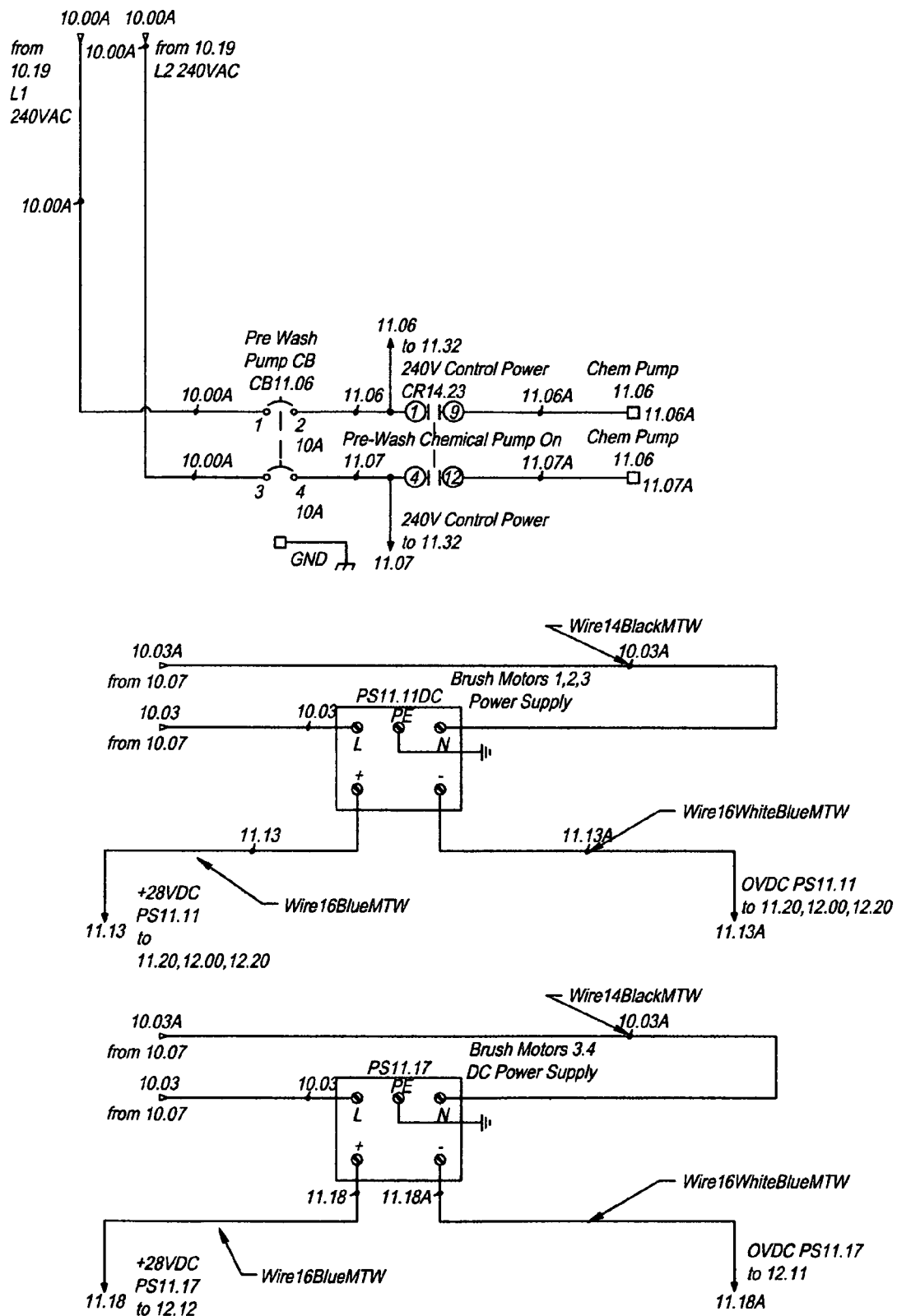
FIGS. 29 and 29A depict a schematic circuitry diagram showing in particular the treatment solution heater and pump control, field connection and brush control of the circuitry.
Figure 29A:
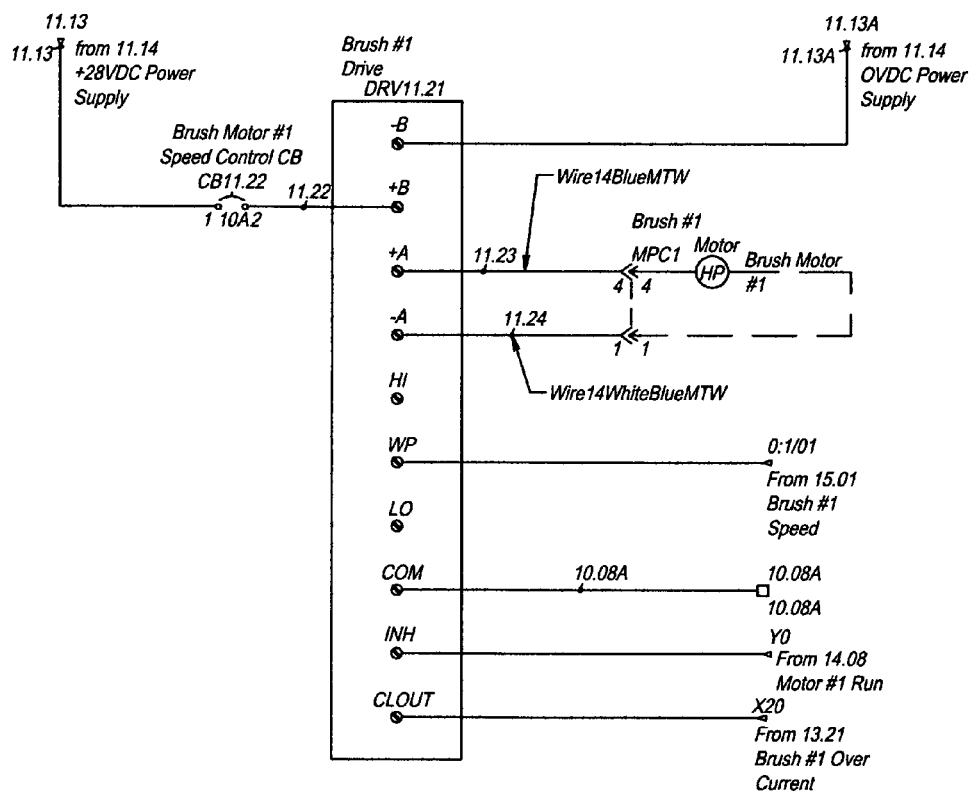
Figure 30:
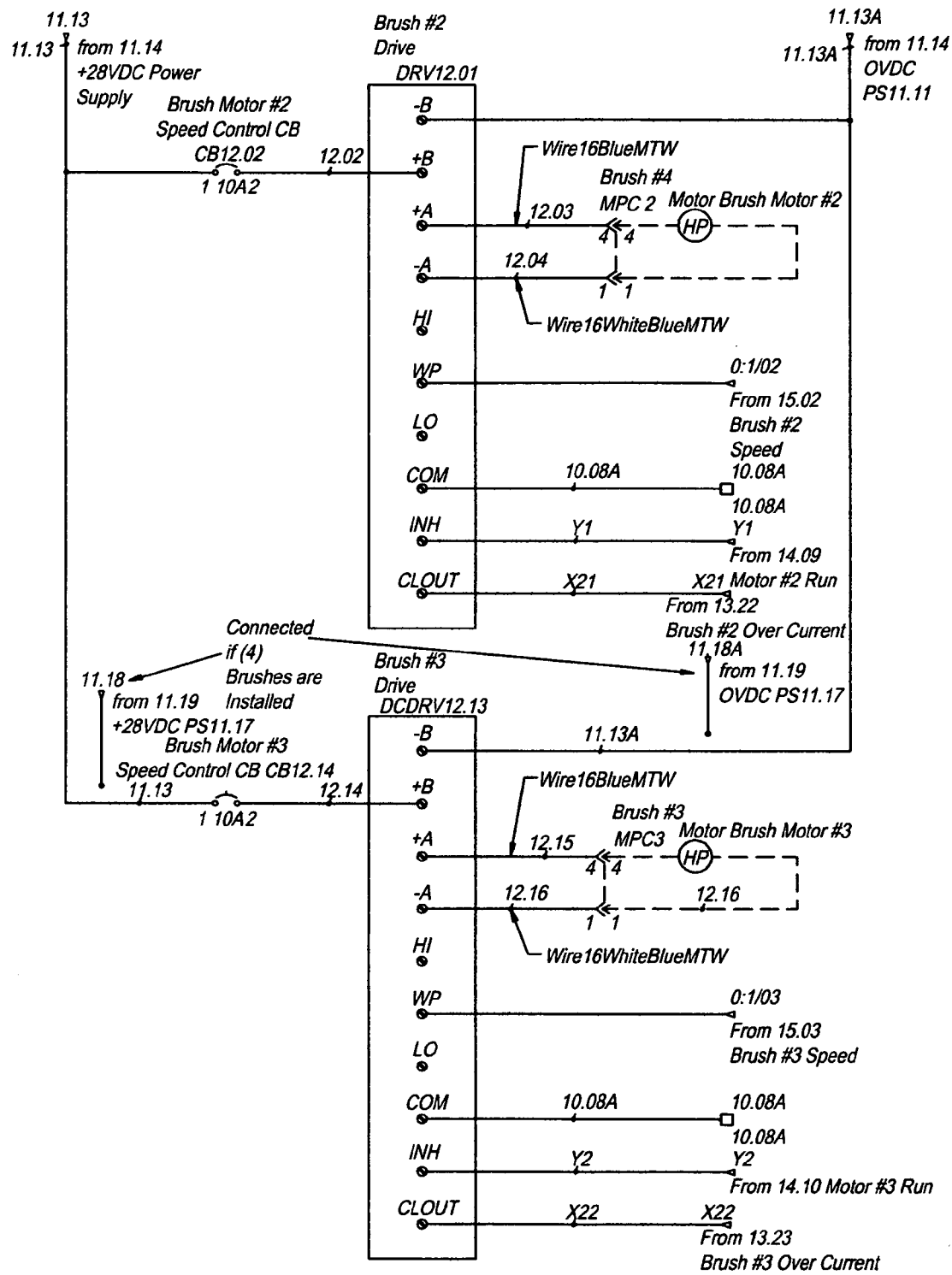
FIGS. 30 and 30A depict a schematic circuitry diagram showing in particular the monitoring and control of multiple applicators and milking sites of the circuitry.
Figure 30A:
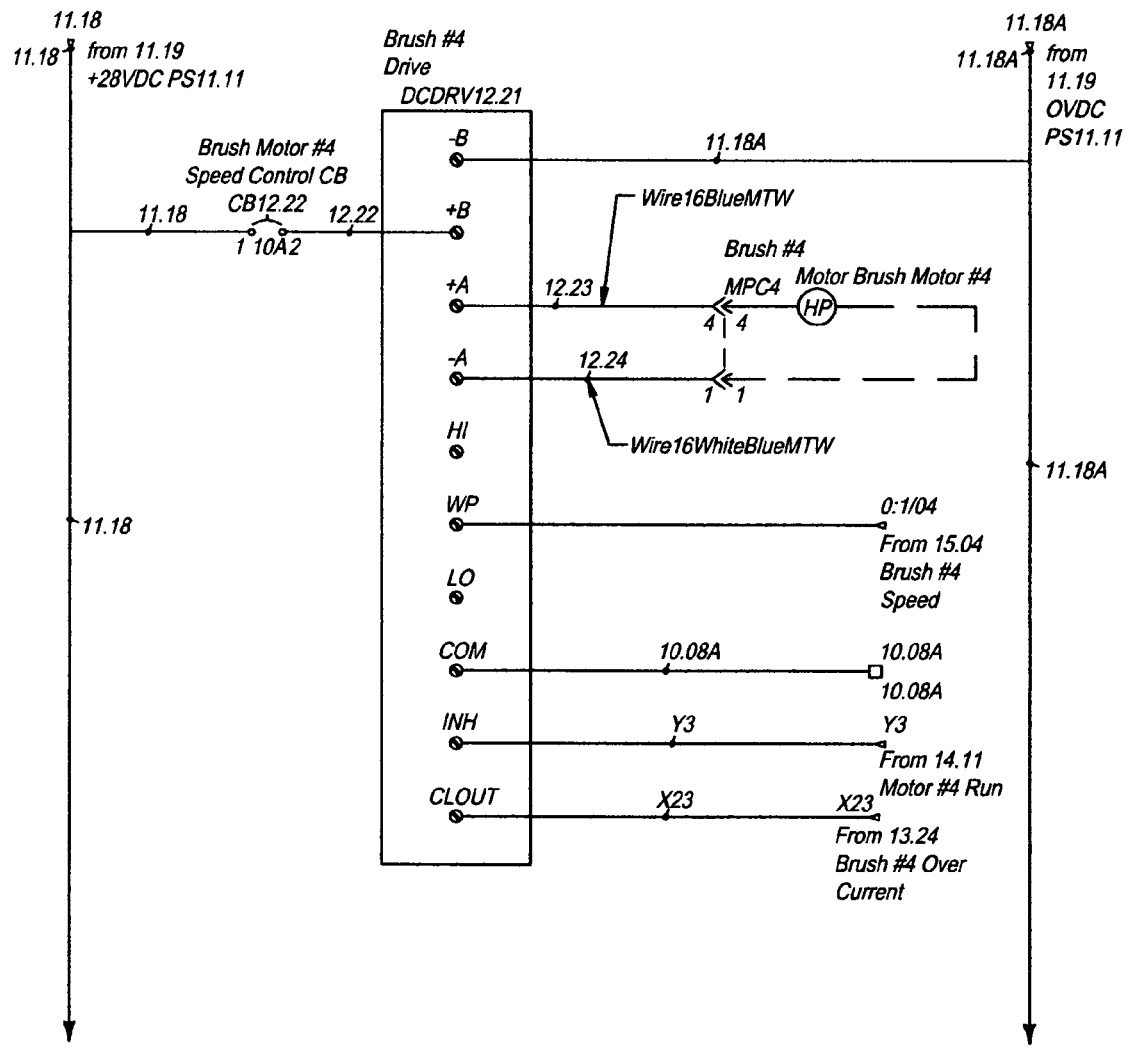

FIGS. 29 and 29A collectively depict the respective schematic circuitry depicting a pump control for the chemical solutions, power supply for brush motors 33M and brush number one speed control. FIGS. 30 and 30A collectively show a schematic drawing depicting the variable motor control of four independently driven brush motors 33M which may be served by a common drive source 33C (cable drive) or most appropriately are each individually driven by an a 24 DC variable speed electric motor equipped with a single cable drive 33C for driving each applicator 1 at each milking site.

Figure 31:
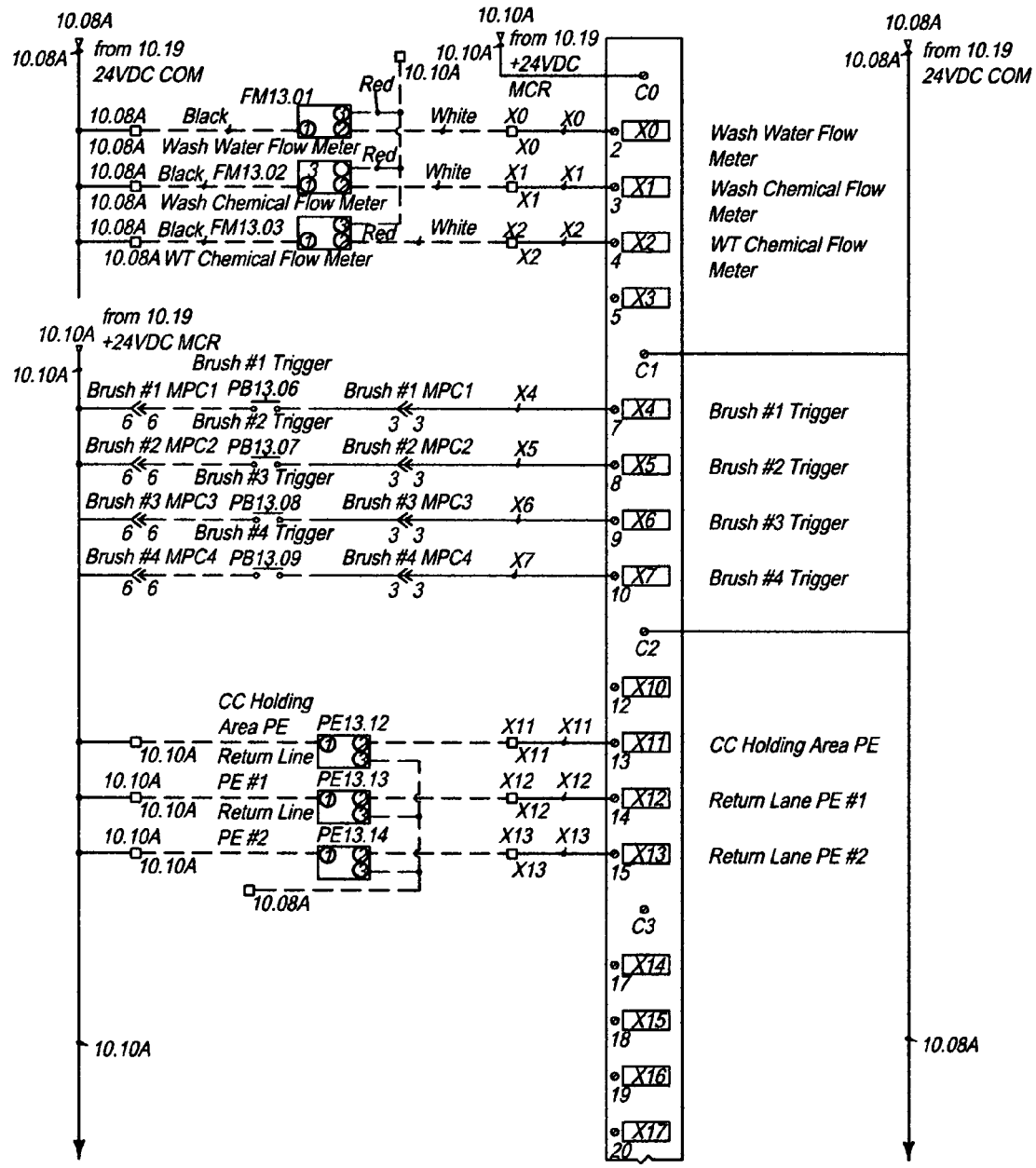
FIGS. 31 and 31A depict a schematic circuitry diagram showing in particular the transmitted inputs to a master control center of the circuitry.
Figure 31A:
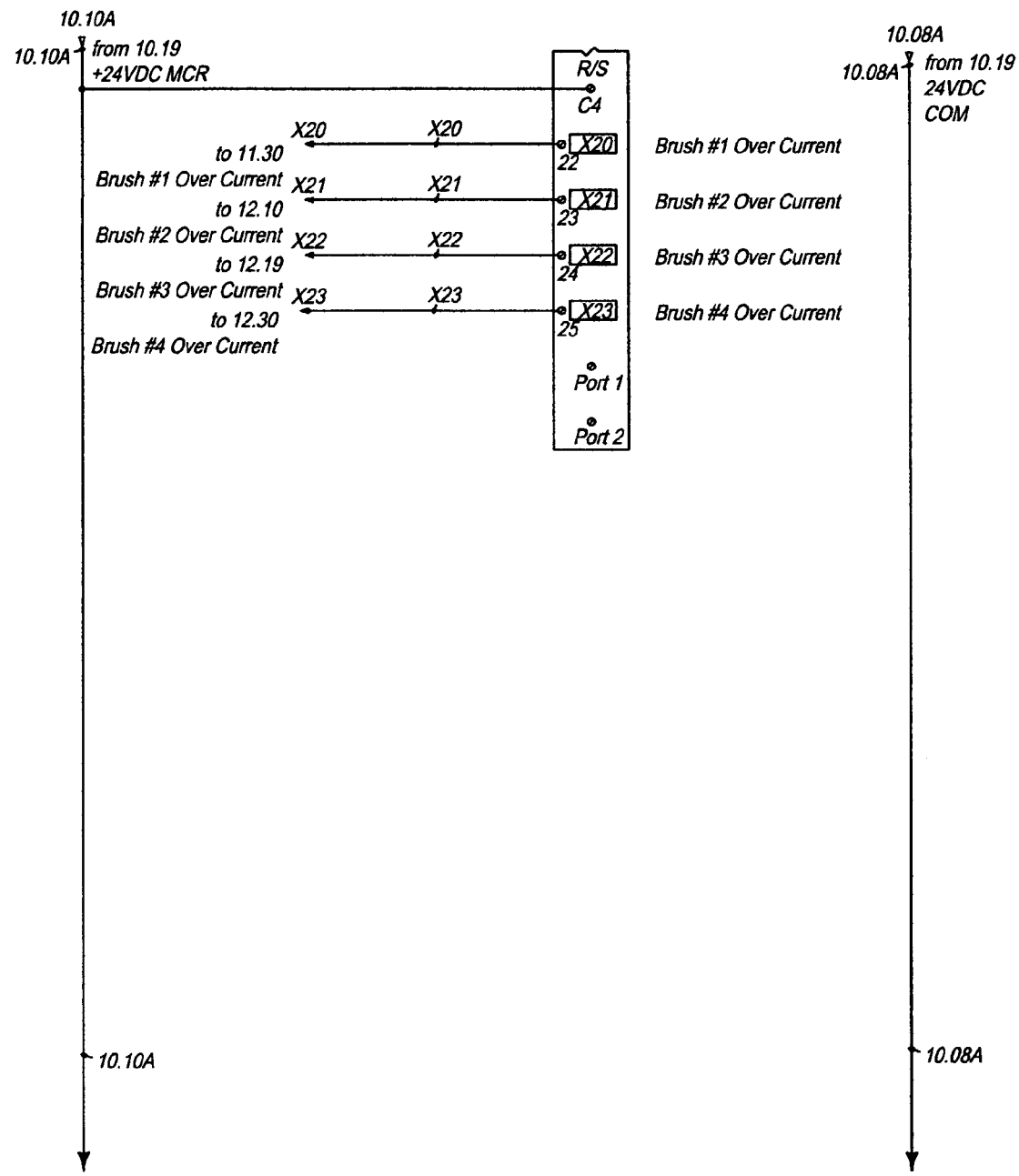
Figure 32:
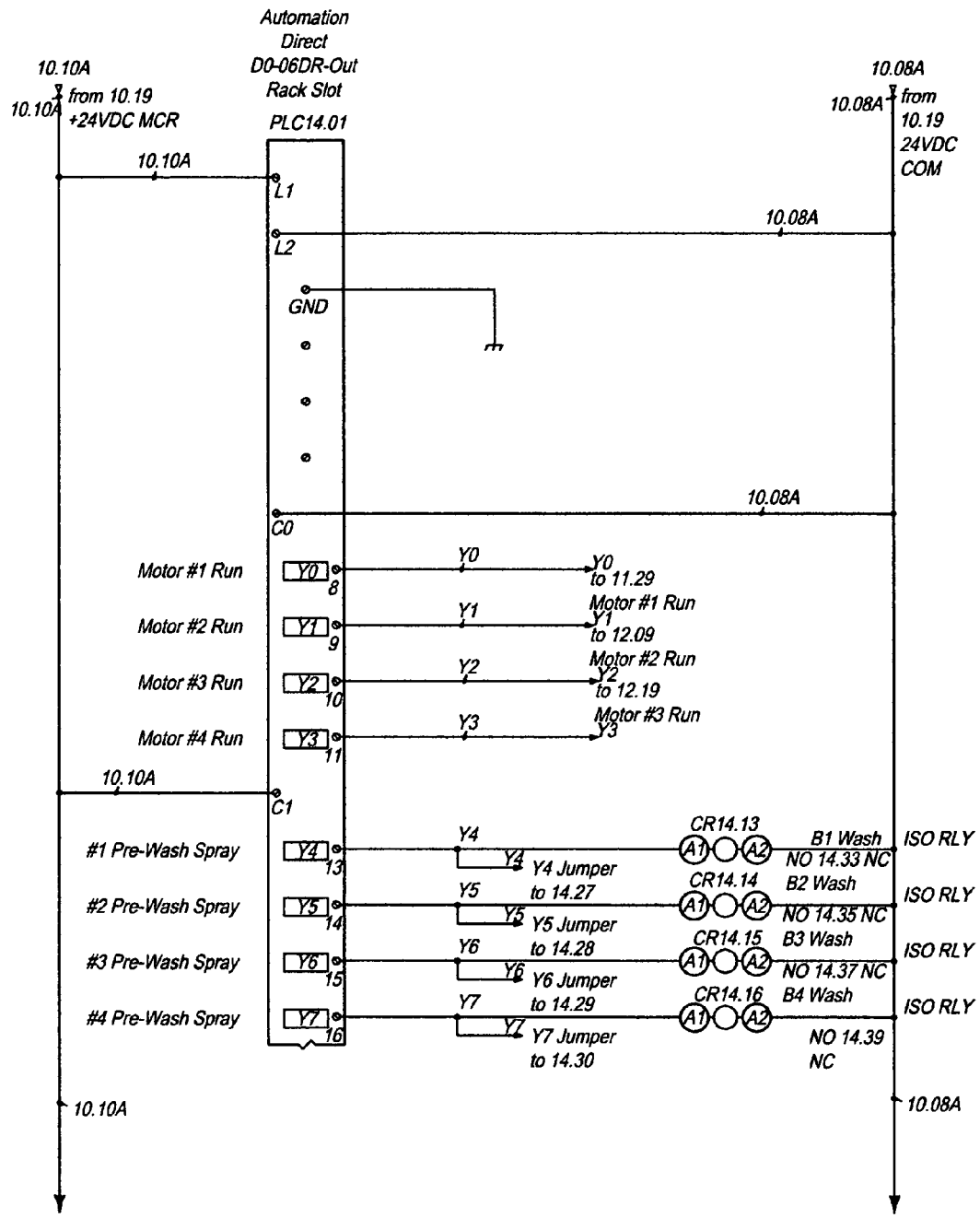
FIG. 32 and FIG. 32A depict a schematic circuitry diagram revealing in particular the commanding outputs of a master control center based upon transmitted inputs of the circuitry.
Figure 32A:
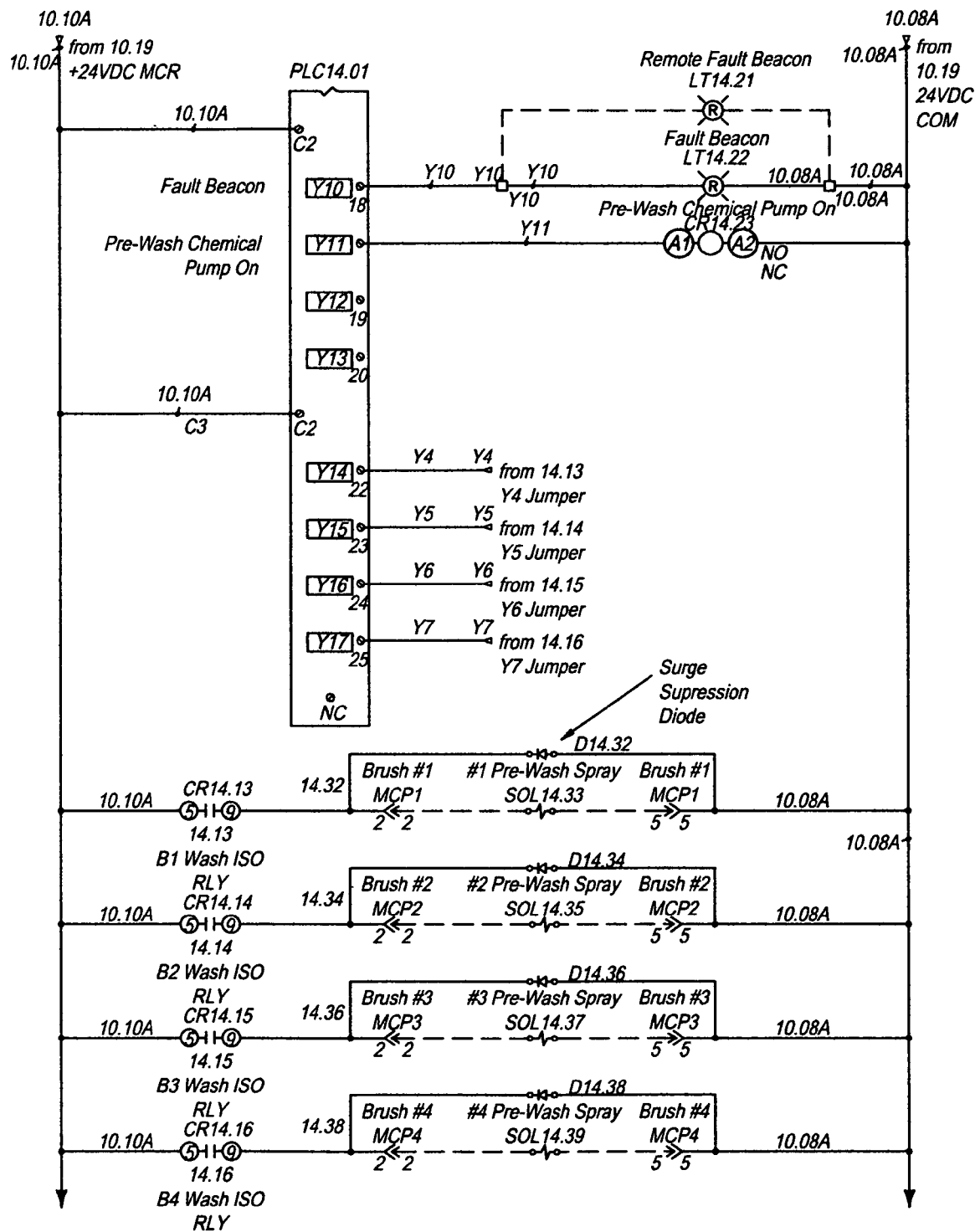
Figure 33:
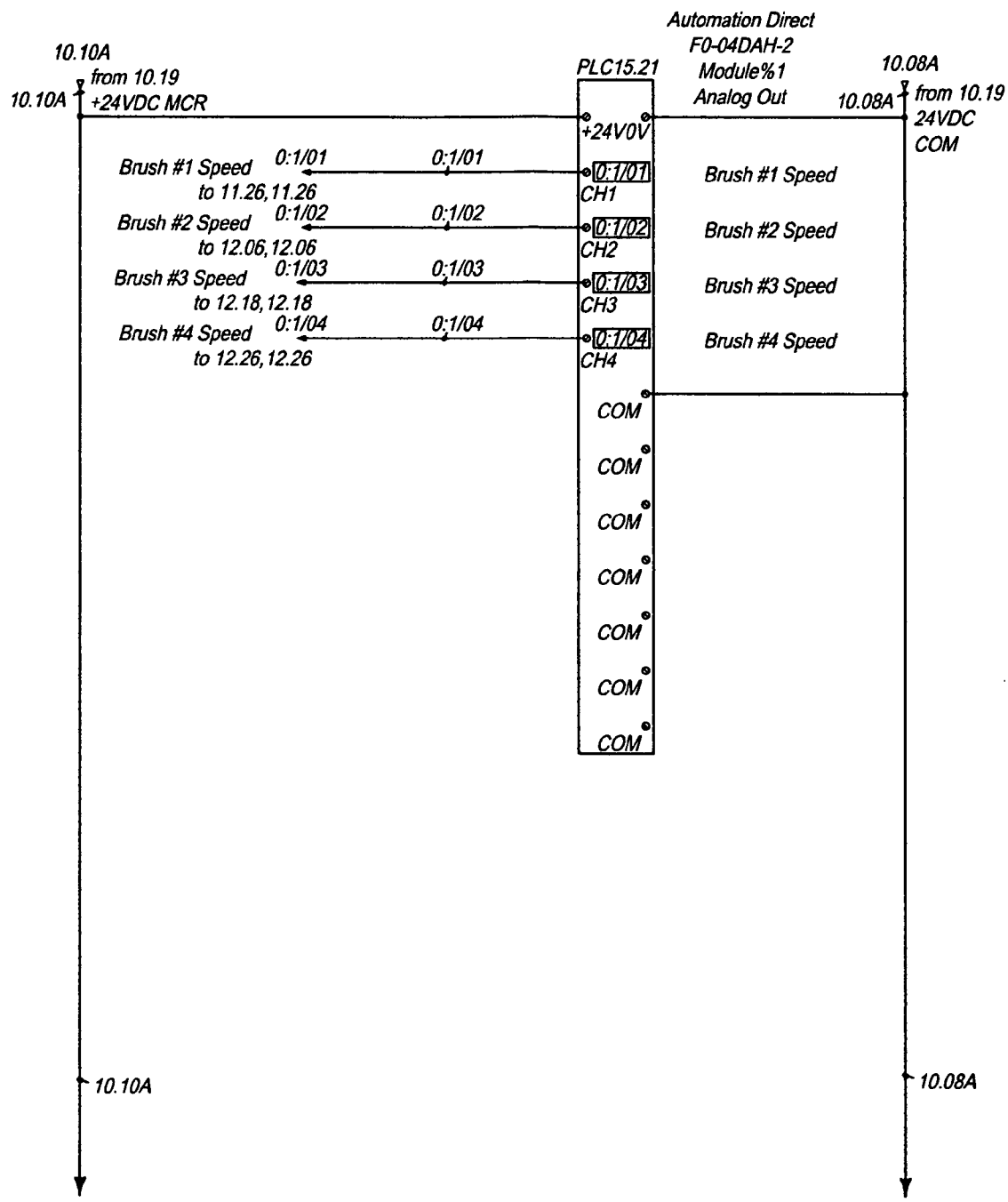
FIG. 33 is a schematic circuitry diagram revealing in particular the analog input and output for the master control center.
Figure 34:
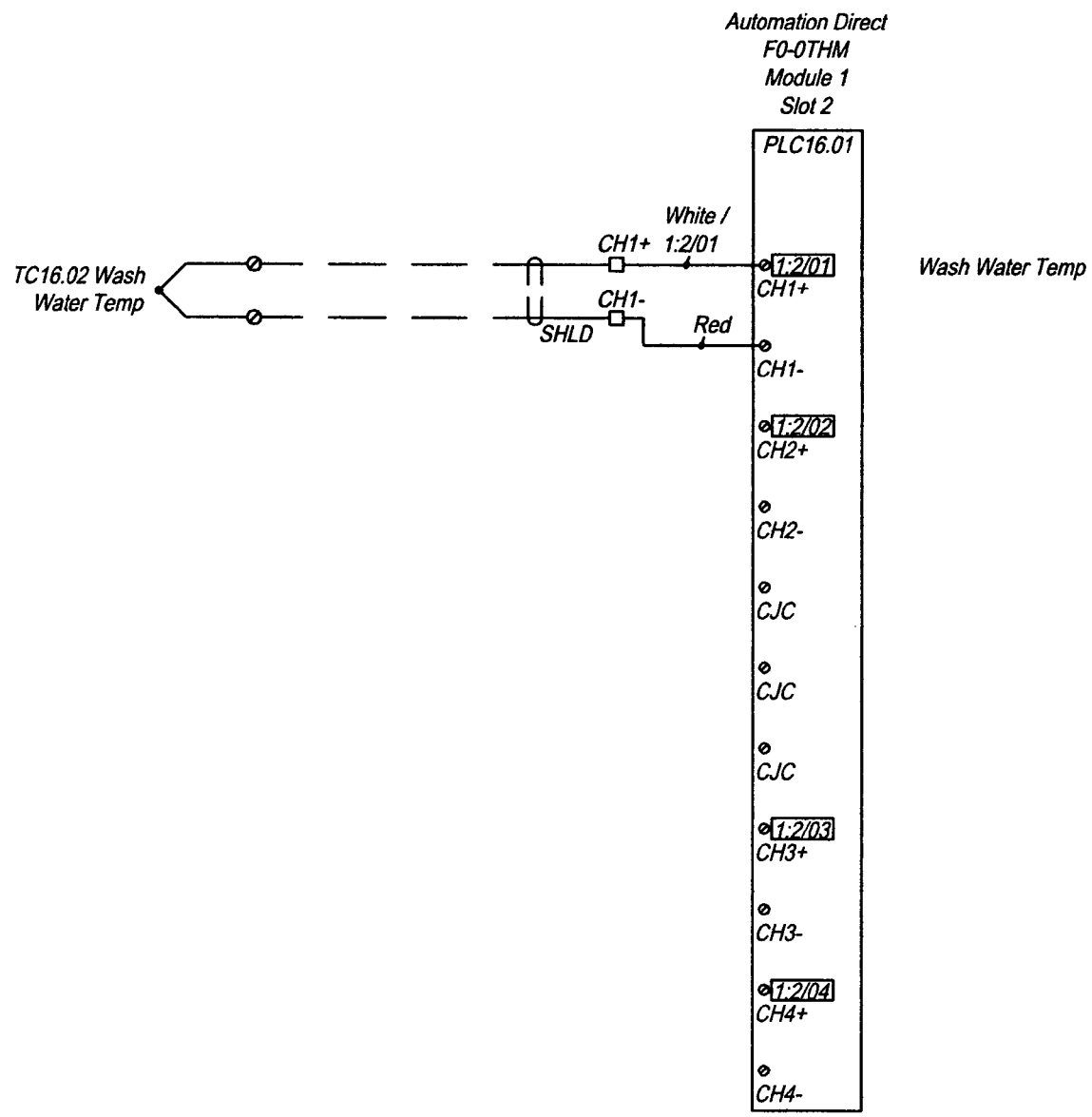
FIG. 34 is a schematic circuitry diagram depicting in particular the sensing, monitoring and control of treating agent solutions which may be monitored and controlled by an in-line or remotely operated master control center.
Figure 34D:
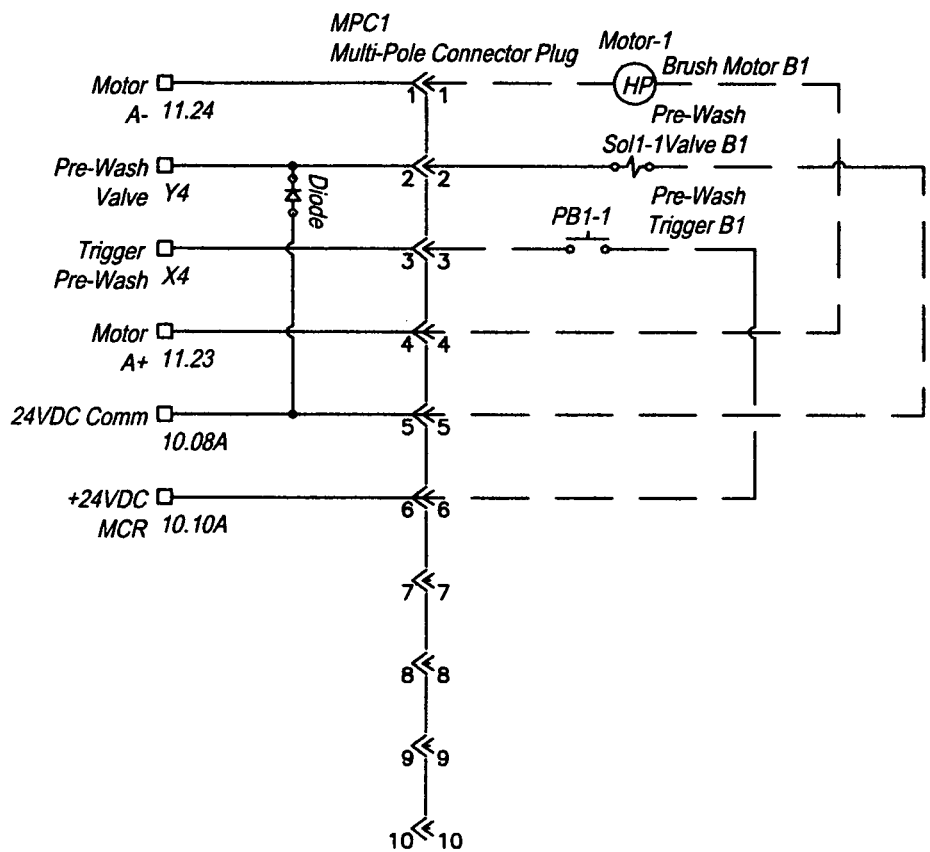
FIG. 34D depicts a schematic circuitry diagram equipped for multi-pole connector terminations for a teat brushing motor and a pre-wash system for the teat cleaning applicators of this invention with the accompanying multi-pole connector terminations table providing further indexed information as to the operational connections thereof.
Figure 35:
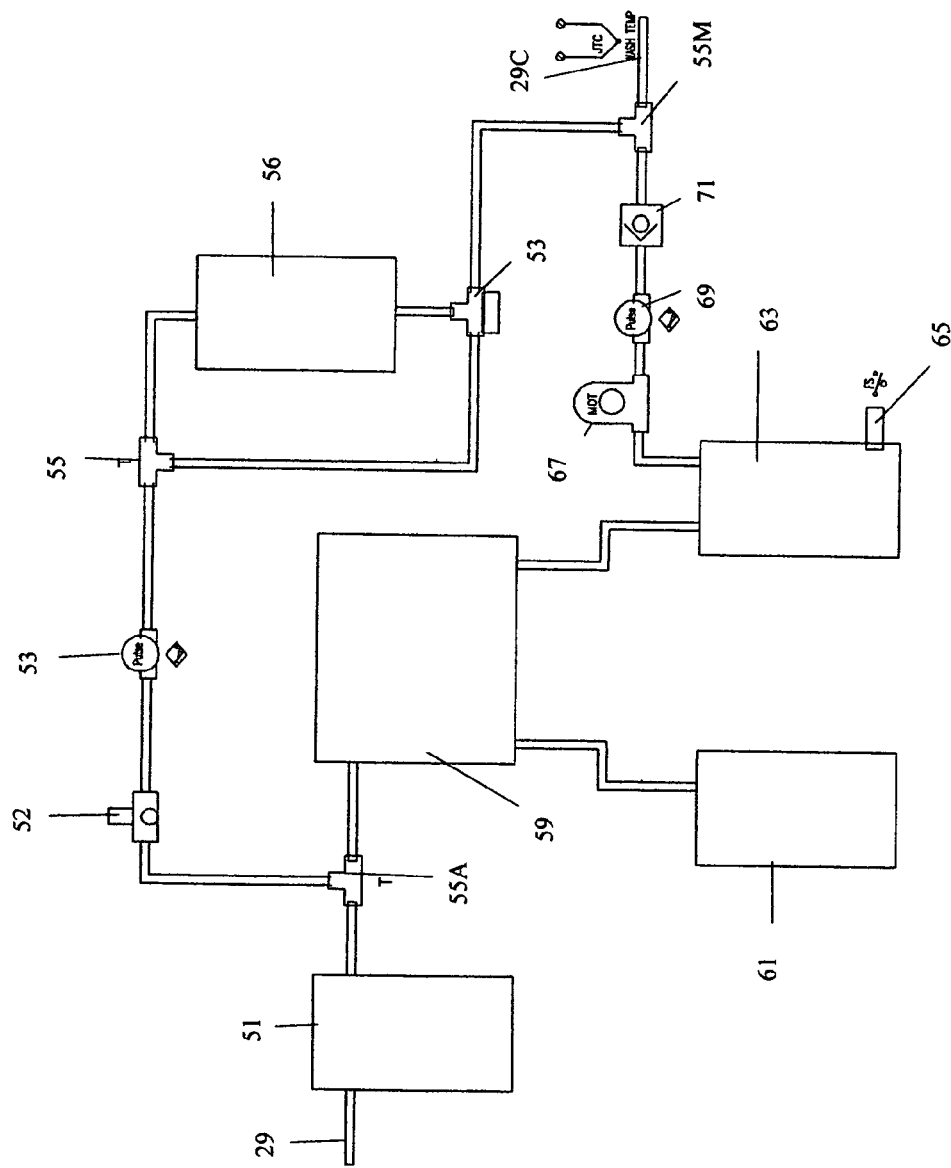
FIG. 35 depicts an equipment and wash solution preparation flow sheet monitored and controlled by a master control center to provide a teat wash solution at a desired concentration, purity, temperature and pressure for treatment by the applicator herein at an animal treatment zone.
Figure 36:
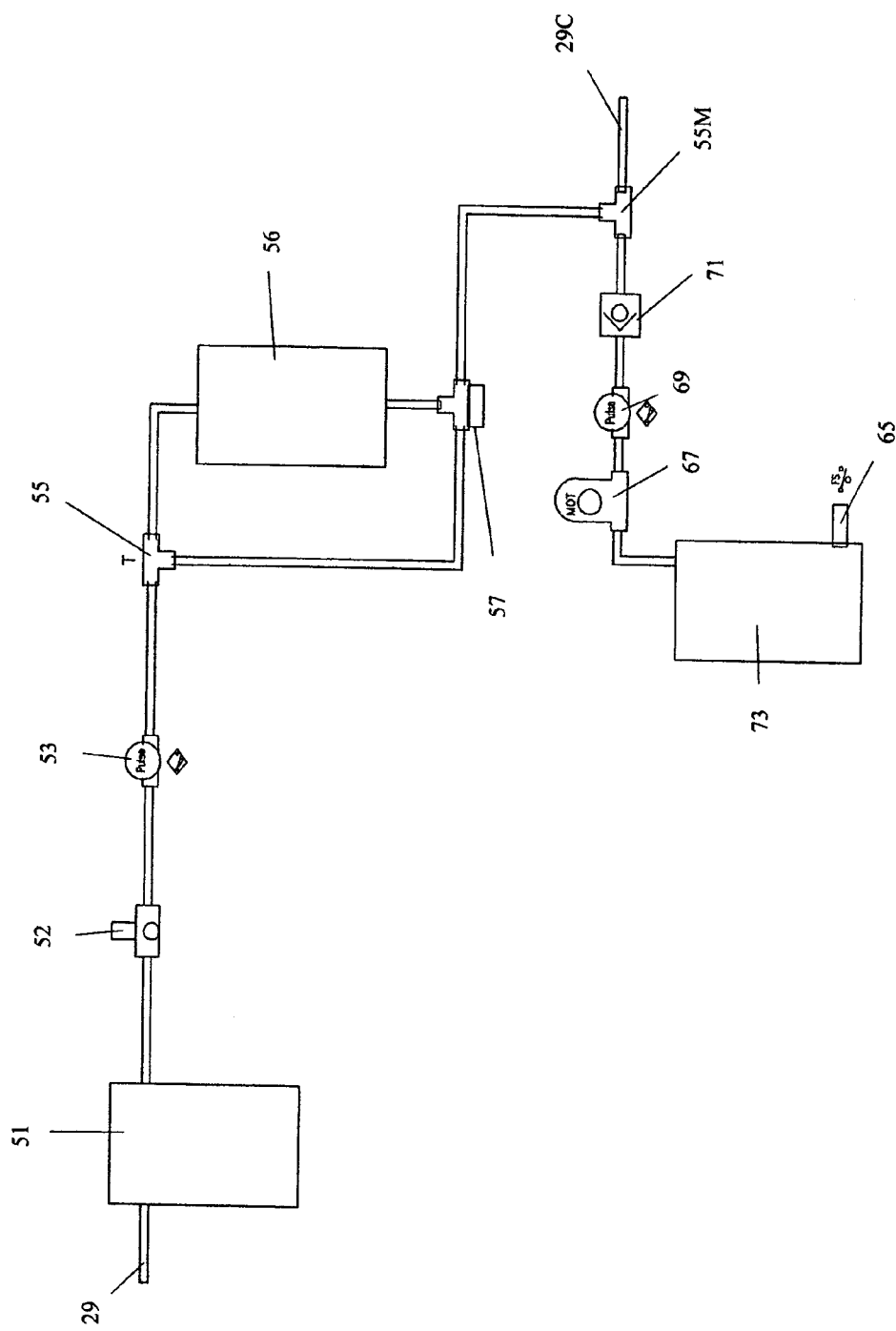
FIG. 36 depicts a flow sheet for the equipment in preparing a post dip teat solution monitored and controlled to provide a desired solution concentration, temperature, purity and pressure to the animal treating applicators.
Figure 37:
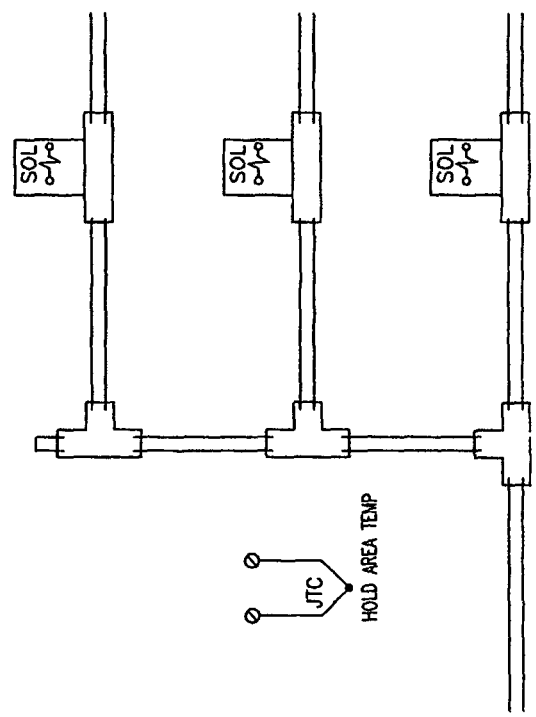
FIG. 37 discloses supplying water thermally controlled to multiple applicators.
Figure 38:
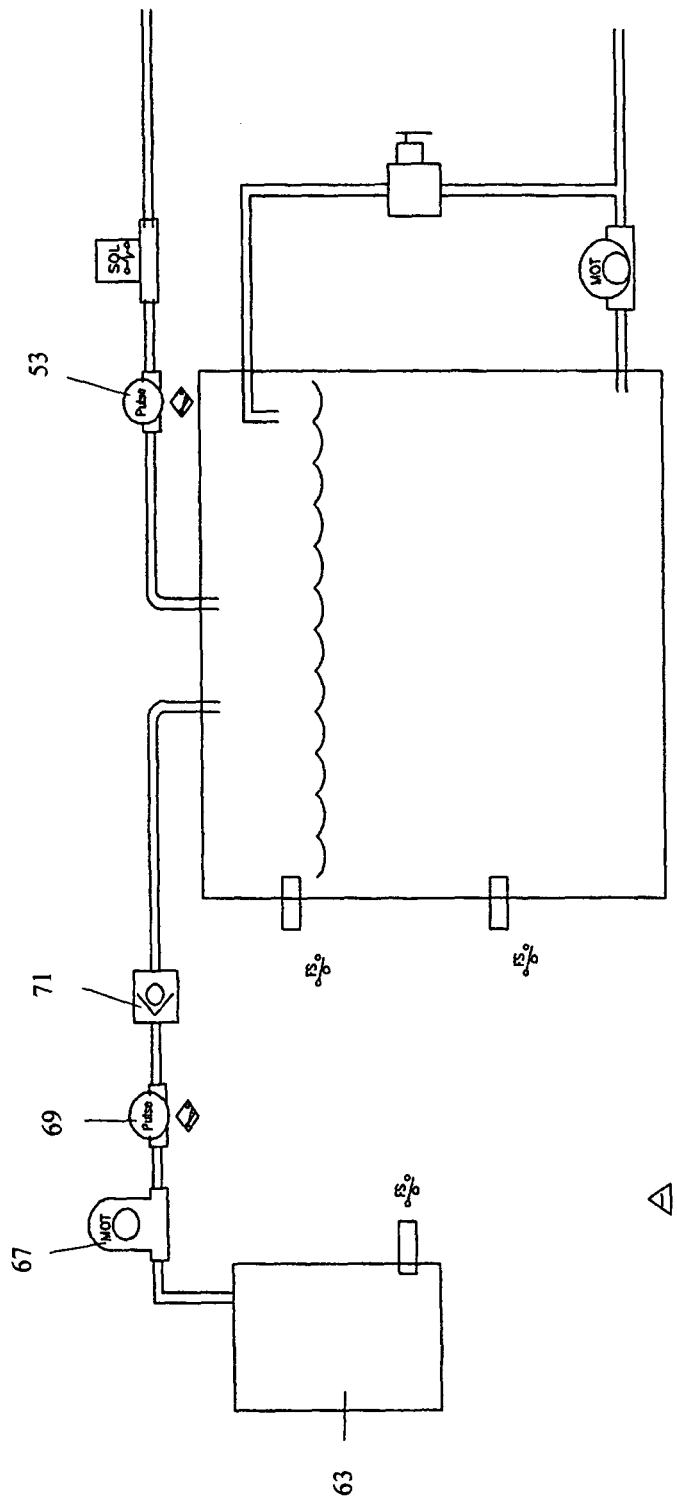
FIG. 38 similarly discloses an equipment, solution make-up and control flow sheet for the preparation and application of a hoof dip solution for treating animal hoofs.
Figure 39:
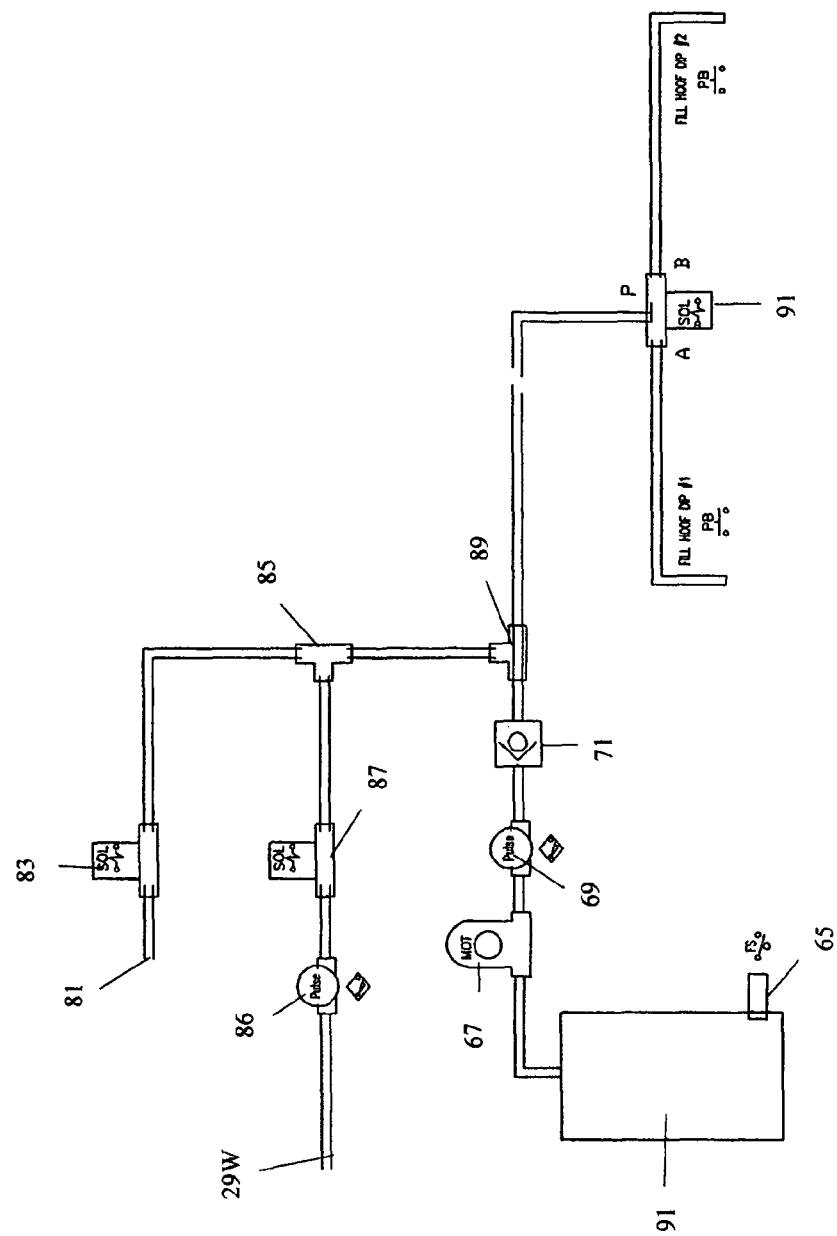
FIG. 39 discloses a flow sheet for the preparation of portable cow drinking water and water supply for a chlorine sanitize holding tank.

FIGS. 31 and 31A discloses a schematic depicting in particular the triggering of the teat scrubbing motors along with the monitoring of the teat wash and dry cycles, an overload motor power switch and electronic circuitry for the monitoring and control of the total wash water flow meter 53 of the chemical solution. The brush triggering circuitry for each of the four applicators 1 as shown in FIG. 31A includes a motor amperage sensor for each applicator 1 sensing a motor amperage overload (e.g. motor amperage spike) which may arise when a damaging obstruction (e.g. tail) becomes wedged between the brushes 20. The master control center 40 upon receiving a sudden power surge signal may then accordingly cut power or otherwise shut down the distressed on-site applicator 1.

FIGS. 32, 32A, 33 and 34 disclose electronic circuitry showing the interrelationship between the various operational systems conducted by the hand-held applicator 1 and the monitoring and control of these operational systems of the PLC 40.

The PLC 40 in combination with the appropriate in-line sensors 55 may be used to maintain proper mixing concentrations at the solution source 29C and application and concentration by the applicator 1 at the milking site. Signals relayed by the PLC 40 may indicate a fault at either location requiring corrective action at either the chemical solution mixing site or at the milking site. Thus, the 13.00 series markings of FIG. 32 reveals wash water flow metering 53 showing total chemical solution and flow and its interrelationship to the master control center 40 and application site. The $X_4$-$X_7$ and $X_{10}$-$X_{13}$ depicts the use of a triggering indicia 31 by an operator to relay to the master control center 40 the type of treatment to be administered by an applicator 1 at each of the milking stations. Depending upon the type of signal relayed to the master control center 40 (e.g. PLC), the PLC 40 will undertake to administer the precise conditions each operator needs to undertake for each cow as prescribed by the designated treatment type. Thus, the computer 40 undertakes prescribing the brush speeds and duration, chemical solution injections (e.g. time of injection, solution, concentration, injection pressure, solution temperature, etc.) drying cycle, teat massaging and post dip conditions all of which factors were typically left subjectively to the on-site operator to monitor and control.

As evident from the aforementioned and other features as a disclosed in our co-pending provisional application, the aforementioned invention provides numerous embodiments which independently and collectively represent a significant advance to the dairy milking art. These embodiments provide animal application treatments heretofore unfeasible with known applicators. The forwardly teat entryway 5 and treatment zone 3 represents a significant technological advance which results in unexpected sanitizing benefits to the art of teat pre- and post-milking art. Further unexpected advantages are accomplished by combining the forwardly teat entryway 5 with the horizontally positioned, counter-rotating brushes 20A, 20B & 27 which guide, thoroughly clean and sanitize the treated teats T in highly effective manner while significantly reducing fatigue prone on-site operator injuries. Adding significantly in its own right is the ability to spontaneously control the brush rotational speeds. In addition to the aforementioned attributes there exists a unique ability of a software programmed computer system 40 to monitor and control of those precise treatments which may be conducted at each milking site. Such embodiments allow the dairy milking industry to accomplish unexpected benefits heretofore impossible.

1 Applicator
40 Master Control Center (PLC)
3 Treatment Zone
4 Top Entryway
5 Forward Entryway
20 (20A & 20B) Upper Brushes
21 Tufts
23 Filaments
25 Brush Shaft
27 Lower Brush
10 Injection Port Outlet
29C Conduit
29E External Source
31 Triggering Member/switches
33 Power Drive Source
35 Gear Housing
T Teats
6 Brush Housing/section
6A & 6B Front and Back Sidewall
8 Drive housing section
9 Porting Panel
34 Gear box Assembly/Drive/Box
10A/10B Pre/Post Treatment ejection
6T Teat guide/ramp
38 Handle
6C Base panel support
22 Valleyed pathway/bed
25A Spring tap
25B Molded bar keys
26K Female key member/slot
25M Brush shaft ends/Male coupler
25MA/25MB Flexible appendages
25R Seating rib
26F Gear shaft coupler/Female coupler
26L Retaining lip
26 Gear drive shaft
26R Female rib
26L & 26X Shaft axles
26S Coupling slot
34A, 34B & 34C Gears
25P Plastic shaft section
25D Steel dowel pin
25N Nose cone
25o Seating rim
25s O-ring
26M Spring
25T Tuft mounting aperture
34U Journaled
28 Protective housing (external)
28A, 28B & 28C Brush shaft ports
29 Solution supply
34o Gear shaft bearings
33C Flexible cable/drive
33E Electrical lines
33S Rotational shaft
33H Cable housing
33M Speed motor
35T Bolted aperture
50 Water softener
54 In-line manifold
52 Water pressure regulator
53 Water flow meter
55 In-line tee adapter
56 In-line heater
57 Temperature control mixing valve
55A Water softener split
59 Brine unit
61 Sodium product one feed source
63 Chorine sanitizer tank
65 Tank low sensor
67 In-line chemical pump
69 Chemical flow meter
55M Heated water mixing tee
71 Check valve
73 Post concentrate tank
81 Air pressure source
83 Air regulated valve
85 Incoming water supply
87 Hoof dip water check valve
89 Tee
120 Speed drive box
120S & 130S Adjustable strap 91 Tank
130 Chemical dispensing box
120I Chemical input line
120$_{OP}$ Chemical output line
26S Coupling slot
25T Release tab
25L Latches
34W Adjustable bearing retaining washer
34GS Sealing gasket
34P Rear bearing retaining plate
34Q Bearing retaining socket
31Z Terminal strip
34Z Rear fastening plate
34G Main gear assembly gasket
BA Housing bolting apertures
BN Nut bolts

What is claimed is:

1. An applicator combination equipped to apply treatment a desired preprogrammed treatment within a treatment zone to teats of a milk producing bovine animal upon an initiating signal which commences the desired treatment, said combination comprising:
   A) an external treating agent source which introduces a desired treatment agent to the treatment zone,
   B) an applicator comprising:
      a) an applicator housing having an open horizontally facing entryway communicating onto a top opening which provides an open passageway sized to receive and horizontally treat at least one teat of the animal within the treatment zone,
      b) a pair of juxtapositional, counter-rotating upper roller brushes adjustable to a programmable rotational speed with each of the brushes having a cantilevered upper brush support and a horizontal positioning so as to allow entry of the at least one teat from the entryway and allow a horizontal movement thereof within the treatment zone,
      c) a horizontal aligned lower counter-rotating roller brush adjustable to the programmable rotational speed with said lower brush having a lower cantilevered brush support and a horizontal positioning beneath the upper brushes so as to provide a brushing action upon a teat tip of the at least one teat within the treatment zone,
      d) a adjustable power drive unit equipped with counter-rotating gears encased within the housing which serves to rotationally drive the upper brushes and the lower brush at the preprogrammed rotational speed,
      e) at least one treatment agent outlet communicating onto the treatment zone and operationally connected to the external treating agent source for introducing the treatment agent to the treatment zone,
      f) an initiating command signaling unit which transmits the initiating command signal indicative of desired preprogrammed treatment to be administered by the applicator unit within the treatment zone, and
   C) a preprogrammed master control center which upon receiving the initiating command signal operationally monitors and controls the desired preprogrammed treatment conducted within the treatment zone by the applicator unit.

2. The combination according to claim 1 wherein the applicator combination comprises a robotic controlled applicator unit equipped with a robotic member robotically carrying the applicator unit which upon penetration onto the treatment zone triggers the initiating command signal unit to transmit the initiating command signal to activate the master control center and thereby prescribe the desired preprogrammed treatment to be administered by the applicator unit within the treatment zone.

3. The combination according to claim 1 wherein the applicator unit is a hand-held applicator unit equipped with a handle so as to permit manual manipulation by an operator at a treatment site.

4. The combination according to claim 3 wherein the applicator unit includes a plurality of initiating command signal indicia corresponding to multiple treatments which upon a triggering action by the milking operator signals the preprogrammed master control center to relay an operational signal for a conductance of the desired preprogrammed treatment by the applicator unit within the treatment zone.

5. The combination according to claim 3 wherein the power drive unit includes a rearwardly positioned sealed gear encasement encasing the counter-rotating gears and a gear lubricant protectively sealed against external contamination and lubricant seepage from the encasement.

6. The combination according to claim 3 wherein the external treatment source includes an in-line heating unit equipped with a temperature sensor operationally connected to the preprogrammed master control center which serves to monitor and regulate the temperature of the treating agent introduced to the treatment zone.

7. The combination according to claim 3 wherein each of the gears includes a gear shaft for rotationally powering the upper brushes and the lower brush with each of said shafts journaling onto supportive gear bearings juxtapositioned at a leading side and a trailing side of each gear shaft so as thereto to provide a reinforcing support to each gear shafts and the respective upper brushes and the lower brush rotationally supported thereby.

8. The combination according to claim 7 wherein the adjustable power unit for driving the upper brushes and the lower brush includes an adjustable speed external motor.

9. The combination according to claim 1 wherein the upper brushes and the lower brush are each equipped with a latching and unlatching connecting brush shaft end each of which correspondingly mates onto a gear shaft coupling and decoupling end carried by each of the gears so as to allow for a decoupling and a coupling replacement of the brushes via the open passageway.

10. The combination according to claim 9 wherein the flight of brush tufts of the upper brushes of the applicator are diagonally positioned upon each of the upper brushes so as to form a valleyed pathway for channeling each teat therethrough for the treatment.

11. The combination according to claim 10 wherein each shaft of the upper brushes include a brush latching alignment member which positions each of the brush shafts for coupling onto each of the drive shafts so as to mate the valleyed pathway of each upper brush within the valleyed pathway of the other upper brush.

12. The combination according to claim 10 wherein the valleyed pathway provided by the upper brushes of the applicator is of a chevron design.

13. The combination according to claim 10 wherein the brush tufts of the paired upper brushes and the lower brush are rotationally spaced sufficiently apart from one another to prevent upon operational use an intermeshing of the brush tufts.

14. The combination according to claim 1 wherein the applicator unit includes at least one treatment conduit porting onto the upper brushes which serves to introduce the treatment agent to the treatment zone.

15. The combination according to claim 1 wherein the brush tufts of the applicator consist essentially of nylon filaments wherein the flight of the tufts form a tuft configuration to guide the teats inwardly within said valleyed pathway and the tufts of said upper brushes and said lower brush are operationally spaced sufficiently apart to prevent rotational contact.

16. The combination according to claim 1 wherein each of the upper brushes and the lower brush include a self-locking brush fitting at a brush shaft end for coupling each brush fitting to a corresponding coupling gear shaft-coupler.

17. The combination according to claim 1 wherein the applicator unit is a hand-held applicator unit having a programmable adjustable speed motor source which drives the upper brushes and the lower brush at a preprogrammed rotational speed and treatment time, and the master control center includes a preprogrammed program which monitors and regulates the predetermined rotational speed and treatment time of the upper brushes and the lower brush within the treatment zone.

18. The combination according to claim 17 wherein the preprogrammed program includes a solution temperature control unit and a treating agent pressure control unit preprogrammed by the master control center to monitor and regulate an application temperature and pressure of the treating agent.

19. The combination according to claim 18 wherein the applicator unit includes a plurality of initiating command signaling selections for a multiplicity of treatments which upon a selective triggering command signal by an on-site operator activates the master control center to relay an operational signal to the applicator unit to commence and administer the desired treatment to be conducted within the treatment zone.

20. The combination according to claim 17 wherein the external treatment source comprises a soft water source, a chemical treating agent concentrate source, a treatment agent solution mixer, an in-line temperature controller and an in-line pressure controller monitored and controlled by the preprogrammed master control center.

21. The applicator combination according to claim 1 wherein the external treating agent source includes an in-line heating unit and a temperature sensor operationally connected to the master control center programmed to monitor and regulate the temperature of the treating agent as provided to the treatment zone.

22. The applicator combination according to claim 1 wherein an the external treatment source delivers a treating agent solution to multiple applicators units at a constant pressure and the treatment source includes an in-line manifold monitored and controlled by the master control center which to maintains a delivery of an equalized predetermined and regulated in-line treating agent solution pressure to each of the multiple applicators.

23. A method for applying a desired treatment to teats of a milk producing bovine animal at a milking site, said method comprising:
A) providing:
 i) an applicator unit comprised of:
  a) an applicator having an open horizontally facing entryway communicating onto a top opening which provides an open passageway sized to receive and horizontally treat the teats of the animal within a treatment zone,
  b) a conduit which introduced a treatment agent to the treatment zone,
  c) a pair of juxtapositional, counter-rotating upper roller brushes adjustable to a programmable rotational speed and time period with each of said upper brushes having a cantilevered upper brush support and a horizontal positioning so as to horizontally receive the teats from the entryway and allow a horizontal movement of the teats within the treatment zone,
  d) a horizontal aligned lower counter-rotating roller brush adjustable to the programmable rotational speed and time interval with said lower brush having a lower cantilevered brush support and being positioned beneath the upper brushes so as to provide a brushing action upon teat ends of the teats within the treatment zone,
  e) an adjustable rotational power drive source for rotationally driving the upper brushes and the lower brush at the preprogrammed rotational speed and time period,
  f) an initiating command signaling unit which transmits an initiating command signal indicating a desired preprogrammed treatment to be administered by the applicator unit within the treatment zone;
 ii) a preprogrammed master control center which upon receiving the initiating command signal from the command initiating signal unit operationally monitors and controls the desired programmable treatment while transmitting operational signals controlling the desired treatment to be administered within the treatment zone by the applicator unit; and
 iii) a programmable external treating agent source communicating onto the conduit with said treating agent source being monitored and controlled by the preprogrammed master control center;
B) triggering the initiating command signal unit to transmit the initiating command signal to the preprogrammed master control center so as to activate the master control to transmit the operational signals to administer the desired treatment within the treatment zone; and
C) applying the desired treatment to the teats within the treatment zone while monitoring and controlling the desired preprogrammed treatment by the preprogrammed master control center.

24. The method according to claim 23 wherein the desired treatment within the treatment zone is conducted by a robotic unit monitored and controlled by the master control center.

25. The method according to claim 23 wherein the applicator unit includes a rearwardly positioned handle for operative manipulation by an on-site operator and the method includes the triggering of the initiating command signaling unit by the on-site operator indicating the desired preprogrammed treatment and thereafter manually manipulating the desired treatment to the teats under the control and monitoring by the preprogrammed master control center.

26. A teat treating applicator unit equipped to apply treatment to teats of a milk producing bovine animal, said applicator comprising:
A) a housing having a horizontally facing entryway communicating onto a top opening which collectively provide an open passageway sized to receive and treat a teat of the animal within a treatment zone,
B) a pair of juxtapositional, horizontally aligned, cantilevered counter-rotating upper roller brushes adjustable to a programmable rotational speed with each of the brushes being housed within the housing and each having a cantilevered upper brush support so as to receive the teat from the entryway and allow a horizontal movement of the teats within the treatment zone, C) a horizontal aligned lower counter-rotating roller brush adjustable to the programmable rotational speed within the housing with said lower brush having a lower cantilevered brush support and a positioning beneath the upper brushes so as to provide a brushing action upon a teat tip ends of the teats within the treatment zone, D) an adjustable power drive unit equipped with counter-rotating gears encased within the housing which rotationally driving the upper brushes and the lower brush at the adjustable programmable rotational speed, E) at least one treatment outlet communicating onto the treatment zone and operationally connected to an external treatment source for introducing a desired treatment agent to the treatment zone, and F) an initiating command signaling unit which serves to transmit an initiating command signal to a master control center indicating the desired treatment to be administered by the applicator unit within the treatment zone.

27. The applicator unit according to claim 26 wherein the applicator unit comprises a robotic controlled unit equipped with a robotic member carrying the applicator unit and sensors which upon penetration of the teats within the treatment zone triggers the initiating command signaling unit to transmit the initiating command signal and thereby activate the master control center to monitor and control the desired treatment to be administered by the applicator unit within the treatment zone.

28. The applicator unit according to claim 27 wherein the outlet includes at least one treatment conduit porting onto the upper brushes.

29. The applicator unit according to claim 26 wherein the applicator unit comprises a hand-held applicator equipped for manual manipulation by an on-site operator.

30. The hand-held applicator unit according to claim 29 wherein the initiating command signaling unit includes a plurality of treatment selections which upon triggering by the on-site operator signals the master control center to monitor and control the desired treatment to be conducted by the operator within the treatment zone.

31. The applicator unit according to claim 30 wherein the applicator unit includes three gear shafts each having a supportive bearing positioned at a leading side and a trailing side of each gear so as to provide additional structural support to the upper brushes and the lower brush supported thereby.

32. The applicator unit according to claim 29 wherein the pair of the upper roller brushes comprise a left rotating brush and a right rotating brush driven by counter-rotating brush shafts with the upper brush shafts and the lower brush shaft each being equipped with a latching and unlatching brush shaft ends which correspondingly mates onto a gear shaft coupling and decoupling ends so as to permit a latching thereto and an unlatching of the upper brushes and the lower brush therefrom.

33. The applicator according to claim 32 wherein the flight of brush tufts of the upper brushes are diagonally positioned upon each of the upper brushes so as to form a valleyed pathway for channeling each teat therethrough.

34. The applicator according to claim 33 wherein each shaft of the upper brushes include a brush latching alignment member which positions each of the brush shafts for coupling onto each of the drive shafts in a proper operational alignment so as to rotationally mate the valleyed pathway of each of the upper brush within the valleyed pathway of the other upper brush.

35. The applicator according to claim 33 wherein a valleyed pathway of a chevron design is provided by the upper brushes.

36. The applicator according to claim 32 wherein the pair of upper brushes and the lower brush are spaced sufficiently apart from one another so as to prevent an operational contact therebetween.

37. The applicator unit according to claim 36 wherein each of the upper brushes and the lower brush include a self-locking and unlocking brush fitting at a brush shaft end and the gears are fitted with gear shafts having interlocking a gear shaft ends which matingly couple and decouple onto the brush fitting.

38. The applicator unit according to claim 24 wherein the housing includes a rearward sealed gear encasement protectively housing a gear lubricant and a the gears against external contamination and leakage of lubricant from the encasement.

39. The applicator unit according to claim 26 wherein upper brushes and the lower brush include brush tufts consisting essentially of nylon filaments aligned so as to permit a horizontal movement of the teats through the treatment zone with said tufts being operationally spaced sufficiently apart to prevent an intermeshing brush contact between the upper brushes and the lower brush.

40. The applicator unit according to claim 26 wherein the adjustable power drive unit is an adjustable external speed motor and the housing includes a rearward sealed gear encasement which encases the gears driving said gear shafts and a gear lubricant.

* * * * *